United States Patent
Chai et al.

(10) Patent No.: US 10,015,702 B2
(45) Date of Patent: Jul. 3, 2018

(54) HANDOVER PROCESSING METHOD AND BASE STATION

(71) Applicant: Huawei Technologies Co., Ltd., Shenzhen (CN)

(72) Inventors: Li Chai, Beijing (CN); Bo Lin, Beijing (CN); Jie Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/435,020

(22) Filed: Feb. 16, 2017

(65) Prior Publication Data

US 2017/0164245 A1 Jun. 8, 2017

Related U.S. Application Data

(63) Continuation of application No. 14/615,145, filed on Feb. 5, 2015, now Pat. No. 9,596,624, which is a (Continued)

(51) Int. Cl.
*H04W 36/00* (2009.01)
*H04W 36/08* (2009.01)
*H04W 36/18* (2009.01)

(52) U.S. Cl.
CPC ....... *H04W 36/0055* (2013.01); *H04W 36/08* (2013.01); *H04W 36/18* (2013.01)

(58) Field of Classification Search
CPC .. H04W 36/0055; H04W 36/08; H04W 36/18
See application file for complete search history.

(56) References Cited

U.S. PATENT DOCUMENTS

| 8,885,597 B2 | 11/2014 | Koyanagi |
| 2005/0096051 A1* | 5/2005 | Lee ............... H04W 36/0055 455/438 |

(Continued)

FOREIGN PATENT DOCUMENTS

| CN | 101483892 A | 7/2009 |
| CN | 101534533 A | 9/2009 |

(Continued)

OTHER PUBLICATIONS

"Handover for Carrier Aggregation," 3GPP TSG RAN WG2 Meeting #66bis, Los Angeles, USA, R2-093722, 3rd Generation Partnership Project, Valbonne, France, (Jun. 29-Jul. 3, 2009).

(Continued)

*Primary Examiner* — Khai M Nguyen
(74) *Attorney, Agent, or Firm* — Leydig, Voit & Mayer, Ltd.

(57) ABSTRACT

The application provides a handover processing method and a base station. The method includes: receiving a handover request message sent by a source base station or a core network node; sending a first message, according to the handover request message, to a second target base station to notify the second target base station that a handover of part or all of a service of a user equipment to the second target base station is to be performed; and sending a handover request acknowledge message to the source base station or the core network node to notify the source base station or the core network node to hand over the user equipment to at least one target cell of the first target base station and/or at least one target cell of the second target base station. The present application realizes a multi-cell handover.

39 Claims, 10 Drawing Sheets

Related U.S. Application Data continuation of application No. PCT/CN2012/079779, filed on Aug. 7, 2012.

(56) References Cited

U.S. PATENT DOCUMENTS

| | | | |
|---|---|---|---|
| 2005/0197124 A1* | 9/2005 | Kang | H04W 36/30 455/439 |
| 2009/0129342 A1* | 5/2009 | Hwang | H04W 36/0022 370/331 |
| 2009/0245204 A1 | 10/2009 | Voyer et al. | |
| 2009/0318155 A1 | 12/2009 | Fukuzawa et al. | |
| 2010/0167744 A1 | 7/2010 | Grob-Lipski | |
| 2010/0178920 A1 | 7/2010 | Kitazoe | |
| 2010/0260097 A1 | 10/2010 | Ulupinar | |
| 2010/0260109 A1 | 10/2010 | Ulupinar | |
| 2011/0002304 A1* | 1/2011 | Lee | H04W 36/02 370/331 |
| 2011/0149905 A1 | 6/2011 | Kim | |
| 2011/0159874 A1 | 6/2011 | Ninagawa | |
| 2011/0170422 A1 | 7/2011 | Hu et al. | |
| 2011/0200014 A1 | 8/2011 | Lee | |
| 2011/0263258 A1 | 10/2011 | Soliman et al. | |
| 2011/0281581 A1* | 11/2011 | Brandt | H04W 36/08 455/427 |
| 2012/0014357 A1 | 1/2012 | Jung et al. | |
| 2012/0044836 A1 | 2/2012 | Sivavakeesar et al. | |
| 2012/0157156 A1 | 6/2012 | Han et al. | |
| 2012/0264417 A1 | 10/2012 | Gao et al. | |
| 2013/0003648 A1* | 1/2013 | Hahn | H04W 36/0005 370/315 |
| 2014/0023045 A1* | 1/2014 | Li | H04W 36/0055 370/331 |
| 2014/0087731 A1 | 3/2014 | Zhang | |
| 2014/0242992 A1 | 8/2014 | Kennedy | |
| 2014/0254554 A1 | 9/2014 | Liu | |
| 2015/0146688 A1* | 5/2015 | Yasuda | H04W 36/0055 370/331 |

FOREIGN PATENT DOCUMENTS

| | | |
|---|---|---|
| CN | 102026165 A | 4/2011 |
| CN | 102118817 A | 7/2011 |
| CN | 102316540 A | 1/2012 |
| EP | 1986454 A1 | 10/2008 |
| EP | 2306769 A1 | 4/2011 |
| EP | 2343947 A1 | 7/2011 |
| EP | 2704485 A1 | 3/2014 |
| JP | 2009246965 A | 10/2009 |
| JP | 2010004295 A | 1/2010 |
| JP | 2014007499 A | 1/2014 |
| JP | 2013534792 A | 9/2015 |
| WO | 2011159215 A1 | 12/2011 |

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications," IEEE Computer Society, IEEE Std 802.11-2012, Institute of Electrical and Electronics Engineers, New York, New York, (Mar. 29, 2012).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.2.0, pp. 1-201, 3rd Generation Partnership Project, Valbonne, France, (Jun. 2012).

"3rd Generation Partnership Project; Technical Specification Group Radio Access Network; Evolved Universal Terrestrial Radio Access (E-UTRA); Radio Resource Control (RRC); Protocol specification (Release 11)," 3GPP TS 36.331 V11.0.0, pp. 1-302, 3rd Generation Partnership Project, Valbonne, France, (Jun. 2012).

"3rd Generation Partnership Project; Technical Specification Group Radio Access Network; Evolved Universal Terrestrial Radio Access Network (E-UTRAN); X2 application protocol (X2AP) (Release 11)," 3GPP TS 36.423 V11.1.0, pp. 1-302, 3rd Generation Partnership Project, Valbonne, France, (Jun. 2012).

* cited by examiner

HANDOVER PROCESSING METHOD AND BASE STATION

CROSS-REFERENCE TO RELATED APPLICATIONS

This application is a continuation of U.S. patent application Ser. No. 14/615,145, filed on Feb. 5, 2015, which is a continuation of International Application No. PCT/CN2012/079779, filed on Aug. 7, 2012. All of the aforementioned applications are hereby incorporated by reference in their entireties.

TECHNICAL FIELD

The present invention relates to a field of communication, and particularly relates to a handover processing method and a base station.

BACKGROUND

In prior art, when a base station, which serves a user equipment (user equipment, UE for short), is not suitable for servicing it, the UE will be handed over to another base station. In the prior art, the process is achieved by a following manner.

A source base station (for example, an evolved NodeB (evolved NodeB, eNB for short)) sends a handover request (Handover Request) message to a target eNB.

If the handover is accepted, the target eNB points out, in a handover request acknowledge (Handover Request ACK) message, a tunnel endpoint (GPRS (general packet radio service, General Packet Radio Service) tunneling protocol (GPRS Tunneling Protocol, GTP for short) Tunnel Endpoint) where forwarding data is expected to be received. The GTP tunnel endpoint includes a transport layer address (Transport Layer Address) and a GTP TEID (Tunnel Endpoint Identifier, Tunnel Endpoint ID).

After receiving the Handover Request ACK message, a soruce eNB indicates that the UE hands over from the soruce eNB to the target eNB.

The inventor found that, in the prior art, a handover flow can merely hand over a UE from one cell to another cell, and a handover could not performed when there exists more than one source cell or target cell.

SUMMARY

In view of this, the application provides a handover processing solution to solve a problem in the prior art that a handover could not be performed when there exists more than one source cell or target cell.

In one aspect, a handover processing method is provided, including: receiving, by a first target base station, a handover request message sent by a source base station or a core network node; sending, by the first target base station, a first message, according to the handover request message, to a second target base station to notify the second target base station that a handover of part or all of a service of a user equipment to the second target base station is to be performed; and sending, by the first target base station, a handover request acknowledge message to the source base station or the core network node, wherein the handover request acknowledge message is used for notifying the source base station or the core network node to hand over the user equipment to at least one target cell of the first target base station and/or at least one target cell of the second target base station.

In a first possible implementation manner of a first aspect, the sending, by the first target base station, a first message, according to the handover request message, to the second target base station, includes:
determining, by the first target base station, that the handover of the part or all of the service of the user equipment to a target cell of the second target base station is to be performed according to a measurement report of the user equipment and/or radio access bear RAB information of the user equipment in the handover request message; or
determining, by the first target base station, that the handover of part or all of the service of the user equipment to the second target base station is to be performed according to information of a target cell of the second target base station in the handover request message; and
sending, by the first target base station, the first message to the second target base station.

In combination with the first aspect or the first possible implementation manner of the first aspect, in a second possible implementation manner, the handover request message includes at least one of followings: information of at least one target cell of the second target base station, measurement report information of the user equipment, context information of the user equipment and information of a service of the user equipment, wherein the information of the service includes RAB information of the service.

In combination with the first aspect, the first possible implementation manner of the first aspect, or the second possible implementation manner of the first aspect, in a third possible implementation manner, the first message includes: information of at least one service of the user equipment, wherein the information of the service includes RAB information of the service and/or configuration information of a radio bear RB.

In combination with the first aspect, the first possible implementation manner of the first aspect, the second possible implementation manner of the first aspect, or the third possible implementation manner of the first aspect, in a fourth possible implementation manner, the information of the service further includes at least one of followings: configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information, code domain information and space domain information; the split indication information includes data split information based on an RB or data split information based on a packet.

In combination with the first aspect, the first possible implementation manner of the first aspect, the second possible implementation manner of the first aspect, the third possible implementation manner of the first aspect, or the fourth possible implementation manner of the first aspect, in a fifth possible implementation manner, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

In combination with the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the configuration information of the RB includes: configuration information of a packet data convergence protocol PDCP layer, a radio link control RLC layer, a medium access control MAC layer and a physical layer; or configuration information of an RLC layer, an MAC layer and a physical layer.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner, after the sending, by the first target base station, the first message to the second target base station, the method further includes: receiving, by the first target base station, a second message sent by the second target base station, wherein the second message is used for indicating information regarding whether the handover of the part or all of the service of the user equipment to the second target base station is accepted by the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner, the second message includes at least one of followings: an identifier of the user equipment, first information and indication information, wherein the indication information includes at least one of followings: indication information of refusing the handover of the part or all of the service of the user equipment to the second target base station, indication information of accepting the handover of the part or all of the service of the user equipment to the second target base station, and indication information of modifying the first message; the first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, or the eighth possible implementation manner of the first aspect, in a ninth possible implementation manner, the second message further includes at least one of followings:

fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station, wherein the second type of GTP tunnel endpoint information is used for establishing a transmission bearer for data forwarding between the second target base station and the source base station; and third type of GTP tunnel endpoint information corresponding to an identifier of an RAB accepted by the second target base station, wherein the third type of GTP tunnel endpoint information is used for requesting a core network node to convert a GTP tunnel endpoint.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, or the ninth possible implementation manner of the first aspect, in a tenth possible implementation manner, the handover request acknowledge message includes at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, or the tenth possible implementation manner of the first aspect, in an eleventh possible implementation manner, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, or the eleventh possible implementation manner of the first aspect, in a twelfth possible implementation manner, the configuration information of the RB includes at least one of followings: configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, or the twelfth possible implementation manner of the first aspect, in a thirteenth possible implementation manner, the configuration information of the radio resource corresponding to the RB includes at least one of followings: a physical cell identifier, a logic cell identifier, a virtual cell identifier, frequency information, carrier information, radio resource block information, subcarrier information, sub-frame information, time slot information, time domain information, code domain information and space domain information.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, or the thirteenth possible implementation manner of the first aspect, in a fourteenth possible implementation manner, the sending, by the first target base station, the handover request acknowledge message to the source base station or the core network node includes:

sending, by the first target base station, the handover request acknowledge message to the source base station to trigger the source base station to send a handover command message to the user equipment, so as to enable the user equipment to establish connections with the first target base station and the second target base station; or sending, by the first target base station, the handover request acknowledge message to the core network node to trigger the core network node to send a handover request reply message to the source base station, thereby triggering the source base station to send a handover command message to the user equipment, so as to enable the user equipment to establish connection with the first target base station and the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, or the fourteenth possible implementation manner of the first aspect, in a fifteenth possible implementation manner, after the sending, by the first target base station, the handover request reply message to the source base station or the core network node, the method further includes: receiving, by the first target base station, a radio resource control RRC connection reconfiguration completion message sent by the user equipment, and establishing a connection with the user equipment.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, or the fifteenth possible implementation manner of the first aspect, in a sixteenth possible implementation manner, after the receiving, by the first target base station, a radio resource control RRC connection reconfiguration completion message sent by the user equipment, the method further includes: sending, by the first target base station, a handover indication message of the user equipment to the second target base station, for indicating that the second target base station starts to use a resource configured to the user equipment.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, or the sixteenth possible implementation manner of the first aspect, in a seventeenth possible implementation manner, after the sending, by the first target base station, the handover indication message of the user equipment to the second target base station, the method further includes: receiving, by the first target base station, a handover indication reply message of the user equipment sent by the second target base station, wherein the cut-over indication reply message of the user equipment includes the third type of GTP tunnel endpoint information corresponding to an identifier of an RAB accepted by the second target base station, wherein the third type of GTP tunnel endpoint information is used for requesting the core network node to switch a GTP tunnel endpoint.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, the sixteenth possible implementation manner of the first aspect, or the seventeenth possible implementation manner of the first aspect, in an eighteenth possible implementation manner, after the receiving, by the first target base station, the RRC connection reconfiguration completion message sent by the user equipment, the method further includes: sending, by the first target base station, a path switch request message to the core network node to request to hand over a service corresponding to the user equipment in the core network node to the first target base station and/or the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, the sixteenth possible implementation manner of the first aspect, the seventeenth possible implementation manner of the first aspect, or the eighteenth possible implementation manner of the first aspect, in a nineteenth possible implementation manner, the sending, by the first target base station, a handover request acknowledge message to the source base station or the core network node, includes: sending, by the first target base station, the handover request acknowledge message to the source base station or the core network node to trigger the source base station to send data and/or signaling of the user equipment in the source base station to the first target base station and/or the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, the sixteenth possible implementation manner of the first aspect, the seventeenth possible implementation manner of the first aspect, the eighteenth possible implementation manner of the first aspect, or the nineteenth possible implementation manner of the first aspect, in a twentieth possible implementation manner, the first target base station receives the data and/or signaling of the user equipment sent by the source base station, and sends corresponding part of the second target base station in the data and/or signaling of the user equipment to the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, the sixteenth possible implementation manner of the first aspect, the seventeenth possible implementation manner of the first aspect, the eighteenth possible implementation manner of the first aspect, the nineteenth possible implementation manner of the first aspect, or the twentieth possible implementation manner, in a twenty-first possible implementation manner, the triggering the source base station to send the data and/or signaling of the user equipment in the source base station to the first target base station and/or the second target base station, includes: triggering the source base station to send corresponding part of the first target base station in the data and/or signaling of the user equipment to the first target base station, and send the part corresponding to the second target base station in the data and/or signaling of the user equipment to the second target base station.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, the sixteenth possible implementation manner of the first aspect, the seventeenth possible implementation manner of the first aspect, the eighteenth possible implementation manner of the first aspect, the nineteenth possible implementation manner of the first aspect, the twentieth possible implementation manner, or the twenty-first possible implementation manner, in a twenty-second possible implementation manner, the data and/or signaling of the user equipment includes at least one of followings: data of a service corresponding to the user equipment, which has been sent without receiving a reply ACK, data of a service corresponding to the user equipment, of which a response of non-acknowledgement NACK is received, data of service data unit SDU, serial number SN status transfer information and an end marker packet.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, the sixteenth possible implementation manner of the first aspect, the seventeenth possible implementation manner of the first aspect, the eighteenth possible implementation manner of the first aspect, the nineteenth possible implementation manner of the first aspect, the twentieth possible implementation manner, the twenty-first possible implementation manner, or the twenty-second possible implementation manner, in a twenty-third possible implementation manner, the end marker packet is used for triggering the first target base station and/or the second target base station to receive data sent by a serving gateway in sequence.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect, the twelfth possible implementation manner of the first aspect, the thirteenth possible implementation manner of the first aspect, the fourteenth possible implementation manner of the first aspect, the fifteenth possible implementation manner of the first aspect, the sixteenth possible implementation manner of the first aspect, the seventeenth possible implementation manner of the first aspect, the eighteenth possible implementation manner of the first aspect, the nineteenth possible implementation manner of the first aspect, the twentieth possible implementation manner, the twenty-first possible implementation manner, the twenty-second possible implementation manner, or the twenty-third possible implementation manner, in a twenty-fourth possible implementation manner, the receiving, by the first target base station, the handover request message sent by the source base station includes: receiving, by the first target base station, the handover request message, which comes from the source base station, forwarded by the core network node.

In a second aspect, a handover processing method is provided, including: sending, by a first source base station, a handover request message to a target base station, to make a request for a handover of a user equipment from the first source base station and a second source base station to the target base station; receiving, by the first source base station, a handover request acknowledge message sent by the target base station; and sending, by the first source base station, a handover command message to the user equipment, to notify the user equipment to hand over from the first source base station and the second source base station to the target base station.

In a first possible implementation manner of the second aspect, before the sending, by a first source base station, a handover request message to a target base station, the method further includes: sending, by the first source base station, a handover initiation request message to the second source base station, to make a request for a handover of the user equipment from the second source base station to the target base station; and receiving, by the first source base station, a handover initiation response message from the second source base station, and generating the handover request message according to the handover initiation response message.

In combination with the second aspect, or the first possible implementation manner of the second aspect, in a second possible implementation manner, before the sending, by a first source base station, a handover request message to a target base station, the method further includes: sending, by the first source base station, a handover initiation request message to the second source base station through a local gateway; and receiving, by the first source base station, the handover request message from the local gateway, wherein the handover request message is generated by the local gateway according to a handover initiation response message from the second source base station.

In combination with the second aspect, the first possible implementation manner of the second aspect, or the second possible implementation manner of the second aspect, in a third possible implementation manner, after the receiving, by the first source base station, the handover request acknowledge message sent by the target base station, the method further includes: sending, by the first source base station, a handover execution notification message to the second source base station, for notifying the second source base station to start exexuting a handover operation.

In combination with the second aspect, the first possible implementation manner of the second aspect, the second possible implementation manner of the second aspect, or the third possible implementation manner of the second aspect, in a fourth possible implementation manner, after the sending, by the first source base station, the handover execution notification message to the second source base station, the method further includes: receiving, by the first source base station, a handover execution notification response message sent by the second source base station, wherein the handover execution notification response message includes: SN status transfer information corresponding to at least one RAB served by the second source base station, and/or a data packet, in need of forwarding, and corresponding to at least one RAB served by the second source base station.

In combination with the second aspect, the first possible implementation manner of the second aspect, the second possible implementation manner of the second aspect, the third possible implementation manner of the second aspect, or the fourth possible implementation manner of the second aspect, in a fifth possible implementation manner, the receiving, by the first source base station, a handover request acknowledge message sent by the target base station includes: receiving, by the first source base station, the handover request acknowledge message sent by the target base station for triggering the first source base station and/or the second source base station to send data and/or signaling of the user equipment to the target base station.

In combination with the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, the triggering the first source base station and/or the second source base station to send the data and/or signaling of the user equipment to the target base station, includes:

triggering the first source base station to send data and/or signaling of the user equipment in the first target base station and the second target base station to the target base station; or triggering the first source base station to send data and/or signaling of the user equipment in the first source base station to the target base station, and triggering the second source base station to send data and/or signaling of the user equipment in the second source base station to the target base station.

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner, the data and/or signaling of the user equipment includes: data of a service corresponding to the user equipment, which has been sent without receiving a reply ACK, data of a service corresponding to the user equipment with a NACK received, SDU data, serial number SN status transfer information and an end marker packet.

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, or the seventh possible implementation manner of the second aspect, in an eighth possible implementation manner, before the sending, by the first source base station, the end marker packet to the target base station, the method further includes: receiving, by the first source base station, the end marker packet sent by an S-GW.

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, or the eighth possible implementation manner of the second aspect, in a ninth possible implementation manner, the sending, by the first source base station, the handover request message to the target base station, includes: sending, by the first source base station, the handover request message to the target base station through a local gateway.

In a third aspect, a handover processing method is provided, including: sending, by a source base station, a handover request message to a first target base station; receiving, by the source base station, a handover request ackowledge message sent by the first target base station, wherein the handover request ackowledge message is used for notifying the source base station to hand over the user equipment to at least one target cell of the first target base station and/or at least one target cell of a second target base station; and sending, by the source base station, a handover command message to the user equipment, to indicate the user equipment to hand over to the first target base station and the second target base station.

In the first possible implementation manner of the third aspect, the handover request message includes at least one of followings: information of at least one target cell of the second target base station, measurement report information of the user equipment, context information of the user equipment and information of a service of the user equipment, wherein the information of the service includes RAB information of the service.

In combination with the third aspect, or the first possible implementation manner of the third aspect, in the second possible implementation manner, the information of the service further includes at least one of followings:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information, code domain information and space domain information; the split indication information includes data split information based on an RB or data split information based on a packet.

In combination with the third aspect, the first possible implementation manner of the third aspect, or the second possible implementation manner of the third aspect, in a third possible implementation manner, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

In combination with the third aspect, the first possible implementation manner of the third aspect, the second possible implementation manner of the third aspect, or the third possible implementation manner of the third aspect, in a fourth possible implementation manner, the handover request acknowledge message includes at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

In combination with the third aspect, the first possible implementation manner of the third aspect, the second possible implementation manner of the third aspect, the third possible implementation manner of the third aspect, or the fourth possible implementation manner of the third aspect, in a fifth possible implementation manner, the first transparent container configuration includes at least one of followings:

configuration information of at least one RB, and information of a cell of the first target base station and/or the second target base station;

wherein the RB is an RB corresponding to at least one RAB accepted by the first target base station and/or the second target base station.

In combination with the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner, the configuration information of the RB includes at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, or the sixth possible implementation manner of the third aspect, in a seventh possible implementation manner, the configuration information of the radio resource of the RB includes at least one of followings: a physical cell identifier, a logic cell identifier, a virtual cell identifier, frequency information, carrier information, radio resource block information, subcarrier information, sub-frame information, time slot information, time domain information, code domain information and space domain information.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, or the seventh possible implementation manner of the third aspect, in an eighth possible implementation manner, the receiving, by the source base station, the handover request acknowledge message sent by the first target base station, includes: receiving, by the source base station, the handover request acknowledge message from the first target base station, which is forwarded by a core network element.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, or the eighth possible implementation manner of the third aspect, in a ninth possible implementation manner, after the receiving, by the source base station, the handover request acknowledge message sent by the first target base station, the method further includes: sending, by the source base station, data and/or signaling of the user equipment to the first target base station and/or the second target base station.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, or the ninth possible implementation manner of the third aspect, in a tenth possible implementation manner, after the sending, by the source base station, the handover command message to the user equipment, the method further includes: sending, by the source base station, data and/or signaling of the user equipment to the first target base station and/or the second target base station.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, or the tenth possible implementation manner of the third aspect, in an eleventh possible implementation manner, the sending, by the source base station, the data and/or signaling of the user equipment to the first target base station and/or the second target base station includes:

sending, by the source base station, the data and/or signaling of the user equipment to the first target base station, for enabling the first target base station to send corresponding part of the second target base station in the data and/or signaling of the user equipment to the second target base station; or sending, by the source base station, corresponding part of the first target base station in the data and/or signaling of the user equipment to the first target base station, and sending corresponding part of the second target base station in the data and/or signaling of the user equipment to the second target base station.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, the tenth possible implementation manner of the third aspect, or the eleventh possible implementation manner of the third aspect, in a twelfth possible implementation manner, the data and/or signaling of the user equipment comprises at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, the tenth possible implementation manner of the third aspect, the eleventh possible implementation manner of the third aspect, or the twelfth possible implementation manner of the third aspect, in a thirteenth possible implementation manner, the end marker packet is used for triggering the first target base station and/or the second target base station to receive data sent by a serving gateway in sequence.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect, the eighth possible implementation manner of the third aspect, the ninth possible implementation manner of the third aspect, the tenth possible implementation manner of the third aspect, the eleventh possible implementation manner of the third aspect, the twelfth possible implementation manner of the third aspect, or the thirteenth possible implementation manner of the third aspect, in a fourteenth possible implementation manner, the sending, by a source base station, the handover request message to a first target base station, includes: sending, by the source base station, the handover request message to the first target base station through a core network node.

In a fourth aspect, a handover processing method is provided, including: receiving, by a target base station, a handover request message sent by a first source base station, wherein the handover request message is used for making a request for a handover of a user equipment from the first source base station and a second source base station to the target base station; and sending, by the target base station, a handover request acknowledge message to the first source base station, wherein the handover request acknowledge message is used for indicating that the target base station accepts the handover of the user equipment from the first source base station and the second source base station to the target base station.

In a first possible implementation manner of the fourth aspect, after the sending, by the target base station, the handover request acknowledge message to the first source base station, the method further includes: receiving, by the target base station, data and/or signaling of the user equipment sent by the first source base station and/or the second source base station.

In combination with the fourth aspect, or the first possible implementation manner of the fourth aspect, in a second possible implementation manner, the receiving, by the target base station, data and/or signaling of the user equipment sent by the first source base station and/or the second source base station includes:

receiving, by the target base station, the data and/or signaling of the user equipment sent by the first source base station, and/or receiving the data and/or signaling of the user equipment sent by the second source base station; or receiving, by the target base station, the data and/or signaling of the user equipment corresponding to the first source base station and/or the second source base station, sent by the first source base station.

In combination with the fourth aspect, the first possible implementation manner of the fourth aspect, or the second possible implementation manner of the fourth aspect, in a third possible implementation manner, the data and/or signaling of the user equipment comprises at least one of followings: data of a service corresponding to the user equipment, which has been sent without receiving a reply ACK, data of a service corresponding to the user equipment with a NACK received, SDU data, serial number SN status transfer information and an end marker packet.

In combination with the fourth aspect, the first possible implementation manner of the fourth aspect, the second possible implementation manner of the fourth aspect, or the third possible implementation manner of the fourth aspect, in a fourth possible implementation manner, the receiving, by a target base station, the handover request message sent by a first source base station comprises: receiving, by the target base station, the handover request message, which comes from the first source base station, forwarded by a local gateway.

In combination with the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner, after the sending, by the target base station, the handover request acknowledge message to the first source base station, the method further includes: receiving, by the target base station, a radio resource control RRC connection reconfiguration completion message sent by the user equipment, and establishing a connection with the user equipment.

In a fifth aspect, a base station is provided, the base station is a first target base station, the first target base station includes: a receiving unit, configured to receive a handover request message sent by a source base station or a core network node; a sending unit, configured to send, according to the handover request message, a first message to a second target base station to notify the second target base station that a handover of part or all of a service of a user equipment to the second target base station is to be performed, wherein the sending unit is further configured to send a handover request acknowledge message to the source base station or the core network node, wherein the handover request acknowledge message is used for notifying the source base station or the core network node to hand over the user equipment to at least one target cell of the first target base station and/or at least one target cell of the second target base station.

In a first possible implementation manner of the fifth aspect, the sending unit is configured to realize the sending, according to the handover request message, the first message to the second target base station in a following manner: determining, according to a measurement report of the user equipment and/or radio access bear RAB information of the user equipment in the handover request message, that the handover of the part or all of the service of the user equipment to a target cell of the second target base station; or determining, according to information of a target cell of the second target base station in the handover request message, that the handover of the part or all of the service of the user equipment to the second target base station; and sending the first message to the second target base station.

In combination with the fifth aspect or the first possible implementation manner of the fifth aspect, in a second possible implementation manner, the handover request message includes at least one of followings: information of at least one target cell of the second target base station, measurement report information of the user equipment, context information of the user equipment and information of a service of the user equipment, wherein the information of the service includes RAB information of the service.

In combination with the fifth aspect, the first possible implementation manner of the fifth aspect, or the second possible implementation manner of the fifth aspect, in a third possible implementation manner, the first message includes: information of at least one service of the user equipment, wherein the information of the service includes RAB information of the service and/or configuration information of a radio bear RB.

In combination with the fifth aspect, the first possible implementation manner of the fifth aspect, the second possible implementation manner of the fifth aspect, or the third possible implementation manner of the fifth aspect, in a fourth possible implementation manner, the information of the service further includes at least one of followings:

configuration coordination information of a radio resource of an RB, an identifier of an RB, an identifier of a radio access bear RAB, split indication information and GTP tunnel endpoint information;

wherein the configuration coordination information of the radio resource of the RB includes at least one of followings: a physical cell identifier, a logic cell identifier, a virtual cell identifier, frequency information, carrier information, radio resource block information, subcarrier information, subframe information, time domain information, code domain information and space domain information; the split indication information includes data split information based on an RB or data split information based on a packet.

In combination with the fifth aspect, the first possible implementation manner of the fifth aspect, the second possible implementation manner of the fifth aspect, the third possible implementation manner of the fifth aspect, or the fourth possible implementation manner of the fifth aspect, in a fifth possible implementation manner, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, in a sixth possible implementation manner, the configuration information of the RB includes: configuration information of a packet data convergence protocol PDCP layer, a radio link control RLC layer, a medium access control MAC layer and a physical layer; or configuration information of an RLC layer, an MAC layer and a physical layer.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, or the sixth possible implementation manner of the fifth aspect, in a seventh possible implementation manner, the receiving unit is further configured to receive a second message sent by the second target base station after the first target base station sends the first message to the second target base station, wherein the second message is used for indicating information regarding whether the handover of the part or all of the service of the user equipment to the second target base station is accepted by the second base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, or the seventh possible implementation manner of the fifth aspect, in an eighth possible implementation manner, the second message comprises at least one of followings: an identifier of the user equipment, first information and indication information, wherein the indication information includes at least one of followings: indication information of refusing the handover of the part or all of the service of the user equipment to the second target base station, indication information of accepting the handover of the part or all of the service of the user equipment to the second target base station, and indication information of modifying the first message; the first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, or the eighth possible implementation manner of the fifth aspect, in a ninth possible implementation manner, the second message further includes at least one of followings:

fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station, wherein the second type of GTP tunnel endpoint information is used for establishing a transmission bearer for data forwarding between the second target base station and the source base station; and third type of GTP tunnel endpoint information corresponding to an identifier of an RAB accepted by the second target base station, wherein the third type of GTP tunnel endpoint information is used for requesting a core network node to convert a GTP tunnel endpoint.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, or the ninth possible implementation manner of the fifth aspect, in a tenth possible implementation manner, the handover request acknowledge message includes at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, or the tenth possible implementation manner of the fifth aspect, in an eleventh possible implementation manner, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, or the eleventh possible implementation manner of the fifth aspect, in a twelfth possible implementation manner, the configuration information of the RB includes at least one of followings: configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, or the twelfth possible implementation manner of the fifth aspect, in s thirteenth possible implementation manner, the configuration information of the radio resource corresponding to the RB includes at least one of followings: a physical cell identifier, a logic cell identifier, a virtual cell identifier, frequency information, carrier information, radio resource block information, subcarrier information, sub-frame information, time slot information, time domain information, code domain information and space domain information.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, or the thirteenth possible implementation manner of the fifth aspect, in a fourteenth possible implementation manner, the sending unit is configured to realize the sending the handover request acknowledge message to the source base station or the core network node in a following manner:

sending the handover request acknowledge message to the source base station to trigger the source base station to send a handover command message to the user equipment, so as to enable the user equipment to establish connections with the first target base station and the second target base station; or sending the handover request acknowledge message to the core network node to trigger the core network node to send the handover request acknowledge message to the source base station, thereby triggering the source base station to send a handover command message to the user equipment, so as to enable the user equipment to establish connections with the first target base station and the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, or the fourteenth possible implementation manner of the fifth aspect, in a fifteenth possible implementation manner, the receiving unit is further configured to receive a radio resource control RRC connection reconfiguration completion message sent by the user equipment, and control the first target base station to establish a connection with the user equipment.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, or the fifteenth possible implementation manner of the fifth aspect, in a sixteenth possible implementation manner, the sending unit is further configured to send, after the first target base station receives the RRC connection reconfiguration completion message sent by the user equipment, a handover indication message of the user equipment to the second target base station, for indicating that the second target base station starts to use a resource configured to the user equipment.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, or the sixteenth possible implementation manner of the fifth aspect, in a seventeenth possible implementation manner, the receiving unit is further configured to receive, after the first target base station sends the handover indication message of the user equipment to the second target base station, a handover indication reply message of the user equipment sent by the second target base station, wherein the handover indication reply message of the user equipment comprises: third type of GTP tunnel endpoint information corresponding to an identifier of an RAB accepted by the second target base station, wherein the third type of GTP tunnel endpoint information is used for requesting the core network node to switch a GTP tunnel endpoint.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, the sixteenth possible implementation manner of the fifth aspect, or the seventeenth possible implementation manner of the fifth aspect, in an eighteenth possible implementation manner, the sending unit is further configured to send, after the first target base station receives the RRC connection reconfiguration completion message sent by the user equipment, a path switch request message to the core network node to request to hand over a service corresponding to the user equipment in the core network node to the first target base station and/or the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, the sixteenth possible implementation manner of the fifth aspect, the seventeenth possible implementation manner of the fifth aspect, or the eighteenth possible implementation manner of the fifth aspect, in a nineteenth possible implementation manner, the sending unit is configured to realize the sending the handover request acknowledge message to the source base station or the core network node in a following manner: sending the handover request acknowledge message to the source base station or the core network node to trigger the source base station to send data and/or signaling of the user equipment in the source base station to the first target base station and/or the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, the sixteenth possible implementation manner of the fifth aspect, the seventeenth possible implementation manner of the fifth aspect, the eighteenth possible implementation manner of the fifth aspect, or the nineteenth possible implementation manner of the fifth aspect, in a twentieth possible implementation manner, the receiving unit is further configured to receive the data and/or signaling of the user equipment sent by the source base station; and the sending unit is further configured to send corresponding part of the second target base station in the data and/or signaling of the user equipment to the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, the sixteenth possible implementation manner of the fifth aspect, the seventeenth possible implementation manner of the fifth aspect, the eighteenth possible implementation manner of the fifth aspect, the nineteenth possible implementation manner of the fifth aspect, or the twentieth possible implementation manner, in a twenty-first possible implementation manner, the triggering the source base station to send the data and/or signaling of the user equipment in the source base station to the first target base station and/or the second target base station, comprises: triggering the source base station to send corresponding part of the first target base station in the data and/or signaling of the user equipment to the first target base station, and to send corresponding part of the second target base station in the data and/or signaling of the user equipment to the second target base station.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, the sixteenth possible implementation manner of the fifth aspect, the seventeenth possible implementation manner of the fifth aspect, the eighteenth possible implementation manner of the fifth aspect, the nineteenth possible implementation manner of the fifth aspect, the twentieth possible implementation manner, or the twenty-first possible implementation manner, in a twenty-second possible implementation manner, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, the sixteenth possible implementation manner of the fifth aspect, the seventeenth possible implementation manner of the fifth aspect, the eighteenth possible implementation manner of the fifth aspect, the nineteenth possible implementation manner of the fifth aspect, the twentieth possible implementation manner, the twenty-first possible implementation manner, or the twenty-second possible implementation manner, in a twenty-third possible implementation manner, the end marker packet is used for triggering the first target base station and/or the second target base station to receive data sent by a serving gateway in sequence.

In combination with the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, the seventh possible implementation manner of the fifth aspect, the eighth possible implementation manner of the fifth aspect, the ninth possible implementation manner of the fifth aspect, the tenth possible implementation manner of the fifth aspect, the eleventh possible implementation manner of the fifth aspect, the twelfth possible implementation manner of the fifth aspect, the thirteenth possible implementation manner of the fifth aspect, the fourteenth possible implementation manner of the fifth aspect, the fifteenth possible implementation manner of the fifth aspect, the sixteenth possible implementation manner of the fifth aspect, the seventeenth possible implementation manner of the fifth aspect, the eighteenth possible implementation manner of the fifth aspect, the nineteenth possible implementation manner of the fifth aspect, the twentieth possible implementation manner, the twenty-first possible implementation manner, the twenty-second possible implementation manner, or the twenty-third possible implementation manner, in a twenty-fourth possible implementation manner, the receiving unit is configured to realize the receiving the handover request message sent by the source base station in a following manner: receiving the handover request message, which comes from the source base station, forwarded by the core network node.

In a sixth aspect, a base station is provided, the base station is a first source base station, the source base station includes: a sending unit, configured to send a handover request message to a target base station, to make a request for a handover of a user equipment from the first source base station and a second source base station to the target base station; and a receiving unit, configured to receive a handover request acknowledge message sent by the target base station, wherein the sending unit is further configured to send a handover command message to the user equipment, and notify the user equipment to hand over from the first source base station and the second source base station to the target base station.

In a first possible implementation manner of the sixth aspect, the sending unit is further configured to send, before the first source base station sends the handover request message to the target base station, a handover initiation request message to the second source base station, to make a request for a handover of the user equipment from the second source base station to the target base station; and the receiving unit is further configured to receive a handover initiation response message from the second source base station, and generating the handover request message according to the handover initiation response message.

In combination with the sixth aspect, or the first possible implementation manner of the sixth aspect, in a second possible implementation manner, the sending unit is further configured to send, before the first source base station sends the handover request message to the target base station, a handover initiation request message to the second source base station through a local gateway; and the receiving unit is further configured to receive the handover request message from the local gateway, wherein the handover request message is generated by the local gateway according to a handover initiation response message from the second source base station.

In combination with the sixth aspect, the first possible implementation manner of the sixth aspect, or the second possible implementation manner of the sixth aspect, in a third possible implementation manner, the sending unit is further configured to send, after the first source base station receives the handover request acknowledge message sent by the target base station, a handover execution notification message to the second source base station, for notifying the second source base station to start executing a handover operation.

In combination with the sixth aspect, the first possible implementation manner of the sixth aspect, the second possible implementation manner of the sixth aspect, or the third possible implementation manner of the sixth aspect, in a fourth possible implementation manner, the receiving unit is further configured to receive a handover execution notification response message sent by the second source base station, wherein the handover execution notification response message comprises: SN status transfer information corresponding to at least one RAB served by the second source base station, and/or a data packet, in need of forwarding, corresponding to at least one RAB served by the second source base station.

In combination with the sixth aspect, the first possible implementation manner of the sixth aspect, the second possible implementation manner of the sixth aspect, the third possible implementation manner of the sixth aspect, or the fourth possible implementation manner of the sixth aspect, in a fifth possible implementation manner, the receiving unit is further configured to receive the handover request acknowledge message sent by the target base station for triggering the first source base station and/or the second source base station to send data and/or signaling of the user equipment to the target base station.

In combination with the sixth aspect, the first possible implementation manner of the sixth aspect, the second possible implementation manner of the sixth aspect, the third possible implementation manner of the sixth aspect, the fourth possible implementation manner of the sixth aspect, or the fifth possible implementation manner of the sixth aspect, in a sixth possible implementation manner, the triggering the first source base station and/or the second source base station to send the data and/or signaling of the user equipment to the target base station includes:

triggering the first source base station to send data and/or signaling of the user equipment in the first target base station and the second target base station to the target base station; or triggering the first source base station to send the data and/or signaling of the user equipment in the first source base station to the target base station, and triggering the second source base station to send data and/or signaling of the user equipment in the second source base station to the target base station.

In combination with the sixth aspect, the first possible implementation manner of the sixth aspect, the second possible implementation manner of the sixth aspect, the third possible implementation manner of the sixth aspect, the fourth possible implementation manner of the sixth aspect, the fifth possible implementation manner of the sixth aspect, or the sixth possible implementation manner of the sixth aspect, in a seventh possible implementation manner, the data and/or signaling of the user equipment comprise(s) at least one of followings: data of a service corresponding to the user equipment which has been sent without receiving a reply ACK, data of the service corresponding to the user equipment with a NACK received, SDU data, serial number SN status transfer information and an end marker packet.

In combination with the sixth aspect, the first possible implementation manner of the sixth aspect, the second possible implementation manner of the sixth aspect, the third possible implementation manner of the sixth aspect, the fourth possible implementation manner of the sixth aspect, the fifth possible implementation manner of the sixth aspect, the sixth possible implementation manner of the sixth aspect, or the seventh possible implementation manner of the sixth aspect, in an eighth possible implementation manner, the receiving unit is further configured to receive, before the first source base station sends the end marker packet to the target base station, the end marker packet sent by an S-GW.

In combination with the sixth aspect, the first possible implementation manner of the sixth aspect, the second possible implementation manner of the sixth aspect, the third possible implementation manner of the sixth aspect, the fourth possible implementation manner of the sixth aspect, the fifth possible implementation manner of the sixth aspect, the sixth possible implementation manner of the sixth aspect, the seventh possible implementation manner of the sixth aspect, or the eighth possible implementation manner of the sixth aspect, in a ninth possible implementation manner, the sending unit is further configured to send the handover request message to the target base station through a local gateway.

In a seventh aspect, a base station is provided, the base station is a source base station, the source base station includes: a sending unit, configured to send a handover request message to a first target base station; and a receiving unit, configured to receive a handover request ackowledge message sent by the first target base station, wherein the handover request ackowledge message is used for notifying the source base station to hand over the user equipment to at least one target cell of the first target base station and/or at least one target cell of the second target base station, wherein the sending unit is further configured to send a handover command message to the user equipment, to indicate the user equipment to hand over to the first target base station and the second target base station.

In a first possible implementation manner of the seventh aspect, the handover request message includes at least one of followings: information of at least one target cell of the second target base station, measurement report information of the user equipment, context information of the user equipment and information of a service of the user equipment, wherein the information of the service includes RAB information of the service.

In combination with the seventh aspect, or the first possible implementation manner of the seventh aspect, in a second possible implementation manner, the information of the service further includes at least one of followings:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, subframe information, time domain information, code domain information and space domain information; the split indication information includes data split information based on an RB or data split information based on a packet.

In combination with the seventh aspect, the first possible implementation manner of the seventh aspect, or the second possible implementation manner of the seventh aspect, in a third possible implementation manner, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

In combination with the seventh aspect, the first possible implementation manner of the seventh aspect, the second possible implementation manner of the seventh aspect, or the third possible implementation manner of the seventh aspect, in a fourth possible implementation manner, the handover request acknowledge message includes at least one of followings: an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; the second type of GTP tunnel endpoint information is used for establishing a transmission bearer for data forwarding between the second target base station and the source base station.

In combination with the seventh aspect, the first possible implementation manner of the seventh aspect, the second possible implementation manner of the seventh aspect, the third possible implementation manner of the seventh aspect, or the fourth possible implementation manner of the seventh aspect, in a fifth possible implementation manner, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

In combination with the seventh aspect, the first possible implementation manner of the seventh aspect, the second possible implementation manner of the seventh aspect, the third possible implementation manner of the seventh aspect, the fourth possible implementation manner of the seventh aspect, or the fifth possible implementation manner of the seventh aspect, in a sixth possible implementation manner, the configuration information of the RB includes at least one of followings: configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, or the sixth possible implementation manner of the seventh aspect, in a seventh possible implementation manner, the configuration information of the radio resource of the RB includes at least one of followings: a physical cell identifier, a logic cell identifier, a virtual cell identifier, frequency information, carrier information, radio resource block information, subcarrier information, sub-frame information, time slot information, time domain information, code domain information and space domain information.

In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, or the seventh possible implementation manner of the seventh aspect, in an eighth possible implementation manner, wherein the receiving unit is configured to realize the receiving the handover request acknowledge message sent by the first target base station in a following manner: receiving the handover request acknowledge message from the first target base station, which is forwarded by a core network element In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, or the eighth possible implementation manner of the seventh aspect, in a ninth possible implementation manner, the sending unit is configured to send, after the source base station receives the handover request acknowledge message sent by the first target base station, data and/or signaling of the user equipment to the first target base station and/or the second target base station.

In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, the eighth possible implementation manner of the seventh aspect, or the ninth possible implementation manner of the seventh aspect, in a tenth possible implementation manner, the sending unit is configured to send, after the source base station sends the handover command message to the user equipment, data and/or signaling of the user equipment to the first target base station and/or the second target base station.

In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, the eighth possible implementation manner of the seventh aspect, the ninth possible implementation manner of the seventh aspect, or the tenth possible implementation manner of the seventh aspect, in an eleventh possible implementation manner, the sending unit is configured to realize the sending the data and/or signaling of the user equipment to the first target base station and/or the second target base station in a following manner:

sending the data and/or signaling of the user equipment to the first target base station, for enabling the first target base station to send corresponding part of the second target base station in the data and/or signaling of the user equipment to the second target base station; or sending corresponding part of the first target base station in the data and/or signaling of the user equipment to the first target base station, and sending corresponding part of the second target base station in the data and/or signaling of the user equipment to the second target base station.

In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, the eighth possible implementation manner of the seventh aspect, the ninth possible implementation manner of the seventh aspect, the tenth possible implementation manner of the seventh aspect, or the eleventh possible implementation manner of the seventh aspect, in a twelfth possible implementation manner, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, the eighth possible implementation manner of the seventh aspect, the ninth possible implementation manner of the seventh aspect, the tenth possible implementation manner of the seventh aspect, the eleventh possible implementation manner of the seventh aspect, or the twelfth possible implementation manner of the seventh aspect, in a thirteenth possible implementation manner, the end marker packet is used for triggering the first target base station and/or the second target base station to receive data sent by a serving gateway in sequence.

In combination with the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, the seventh possible implementation manner of the seventh aspect, the eighth possible implementation manner of the seventh aspect, the ninth possible implementation manner of the seventh aspect, the tenth possible implementation manner of the seventh aspect, the eleventh possible implementation manner of the seventh aspect, the twelfth possible implementation manner of the seventh aspect, or the thirteenth possible implementation manner of the seventh aspect, in a fourteenth possible implementation manner, the sending unit is configured to realize the sending the handover request message to the first target base station in a following manner: sending the handover request message to the first target base station through a core network node.

In an eighth aspect, a base station is provided, the base station is a target base station, the target base station includes: a receiving unit, configured to receive a handover request message sent by a first source base station, wherein the handover request message is used for making a request for a handover of a user equipment from the first source base station and a second source base station to the target base station; and a sending unit, configured to send a handover request acknowledge message to the first source base station, wherein the handover request acknowledge message is used for indicating that the handover of the user equipment from the first source base station and the second source base station to the target base station is accepted.

In a first possible implementation manner of the eighth aspect, the sending unit is further configured to receive, after the target base station sends the handover request acknowledge message to the first source base station, data and/or signaling of the user equipment sent by the first source base station and/or the second source base station.

In combination with the eighth aspect, or the first possible implementation manner of the eighth aspect, in a second possible implementation manner, the receiving unit is configured to realize that the target base station to receives the data and/or signaling of the user equipment sent by the first source base station and/or the second source base station in a following manner:

receiving the data and/or signaling of the user equipment sent by the first source base station, and/or receiving the data and/or signaling of the user equipment sent by the second source base station; or receiving the data and/or signaling of the user equipment corresponding to the first source base station and/or the second source base station, sent by the first source base station.

In combination with the eighth aspect, the first possible implementation manner of the eighth aspect, or the second possible implementation manner of the eighth aspect, in a third possible implementation manner, the data and/or signaling of the user equipment comprises at least one of followings: data of a service corresponding to the user equipment, which has been sent without receiving a reply ACK, data of a service corresponding to the user equipment with a NACK received, SDU data, serial number SN status transfer information and an end marker packet.

In combination with the eighth aspect, the first possible implementation manner of the eighth aspect, the second possible implementation manner of the eighth aspect, or the third possible implementation manner of the eighth aspect, in a fourth possible implementation manner, the receiving unit is configured to realize the receiving the handover request message sent by the first source base station in a following manner: receiving the handover request message, which comes from the first source base station, forwarded by a local gateway.

In combination with the eighth aspect, the first possible implementation manner of the eighth aspect, the second possible implementation manner of the eighth aspect, the third possible implementation manner of the eighth aspect, or the fourth possible implementation manner of the eighth aspect, in a fifth possible implementation manner, the receiving unit is further configured to receive, after the target base station sends the handover request acknowledge message to the first source base station, a radio resource control RRC connection reconfiguration completion message sent by the user equipment, and control the target base station to establish connection with the user equipment.

In a ninth aspect, a base station is provided, the base station is a first target base station, the first target base station includes: a receiver, configured to receive a handover request message sent by a source base station or a core network node; and a transmitter, configured to send, according to the handover request message, a first message to a second target base station to notify the second target base station that a handover of part or all of a service of a user equipment to the second target base station is to be performed, wherein the transmitter is further configured to send a handover request acknowledge message to the source base station or the core network node, wherein the handover request acknowledge message is used for notifying the source base station or the core network node to hand over the user equipment to at least one target cell of the first target base station and/or at least one target cell of the second target base station.

In a first possible implementation manner of the ninth aspect, the first target base station further includes: a processor, wherein the processor is configured to determine, according to a measurement report of the user equipment and/or radio access bear RAB information of the user equipment in the handover request message, that the handover of the part or all of the service of the user equipment to a target cell of the second target base station; or determine, according to information of a target cell of the second target base station in the handover request message, that the handover of the part or all of a service of the user equipment to the second target base station; and the transmitter is further configured to send the first message to the second target base station.

In combination with the ninth aspect or the first possible implementation manner of the ninth aspect, in a second possible implementation manner, the handover request message includes at least one of followings: information of at least one target cell of the second target base station, measurement report information of the user equipment, context information of the user equipment and information of a service of the user equipment, wherein the information of the service includes RAB information of the service.

In combination with the ninth aspect, the first possible implementation manner of the ninth aspect, or the second possible implementation manner of the ninth aspect, in a third possible implementation manner, the first message includes information of at least one service of the user equipment, wherein the information of the service includes RAB information of the service and/or configuration information of a radio bear RB.

In combination with the ninth aspect, the first possible implementation manner of the ninth aspect, the second possible implementation manner of the ninth aspect, or the third possible implementation manner of the ninth aspect, in a fourth possible implementation manner, the information of the service further includes at least one of followings: configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information, code domain information and space domain information; the split indication information includes data split information based on an RB or data split information based on a packet.

In combination with the ninth aspect, the first possible implementation manner of the ninth aspect, the second possible implementation manner of the ninth aspect, the third possible implementation manner of the ninth aspect, or the fourth possible implementation manner of the ninth aspect, in a fifth possible implementation manner, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, or the fifth possible implementation manner of the ninth aspect, in a sixth possible implementation manner, the configuration information of the RB includes: configuration information of a packet data convergence protocol PDCP layer, a radio link control RLC layer, a medium access control MAC layer and a physical layer; or configuration information of an RLC layer, an MAC layer and a physical layer.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, or the sixth possible implementation manner of the ninth aspect, in a seventh possible implementation manner, the receiver is further configured to receive a second message sent by the second target base station after the first target base station sends the first message to the second target base station, wherein the second message is used for indicating information regarding whether the handover of the part or all of the service of the user equipment to the second target base station is accepted by the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, or the seventh possible implementation manner of the ninth aspect, in an eighth possible implementation manner, the second message comprises at least one of followings: an identifier of the user equipment, first information and indication information, wherein the indication information includes at least one of followings: indication information of refusing the handover of the part or all of the service of the user equipment to the second target base station, indication information of accepting the handover of the part or all of the service of the user equipment to the second target base station, and indication information of modifying the first message; the first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, or the eighth possible implementation manner of the ninth aspect, in a ninth possible implementation manner, the second message further includes at least one of followings:

fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station, wherein the second type of GTP tunnel endpoint information is used for establishing a transmission bearer for data forwarding between the second target base station and the source base station; and third type of GTP tunnel endpoint information corresponding to an identifier of an RAB accepted by the second target base station, wherein the third type of GTP tunnel endpoint information is used for requesting a core network node to convert a GTP tunnel endpoint.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, or the ninth possible implementation manner of the ninth aspect, in a tenth possible implementation manner, the handover request reply message includes at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation of at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, or the tenth possible implementation manner of the ninth aspect, in an eleventh possible implementation manner, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, or the eleventh possible implementation manner of the ninth aspect, in a twelfth possible implementation manner, the configuration information of the RB includes at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, or the twelfth possible implementation manner of the ninth aspect, in a thirteenth possible implementation manner, the configuration information of the radio resource corresponding to the RB includes at least one of followings: a physical cell identifier, a logic cell identifier, a virtual cell identifier, frequency information, carrier information, radio resource block information, sub-carrier information, sub-frame information, time slot information, time domain information, code domain information and space domain information.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, or the thirteenth possible implementation manner of the ninth aspect, in a fourteenth possible implementation manner, the transmitter is configured to realize the sending the handover request acknowledge message to the source base station or the core network node in a following manner:

sending the handover request acknowledge message to the source base station to trigger the source base station to send a handover command message to the user equipment, so as to enable the user equipment to establish connection with the first target base station and the second target base station; or sending the handover request acknowledge message to the core network node to trigger the core network node to send the handover request acknowledge message to the source base station, thereby triggering the source base station to send the handover command message to the user equipment, so as to enable the user equipment to establish connections with the first target base station and the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, or the fourteenth possible implementation manner of the ninth aspect, in a fifteenth possible implementation manner, the receiver is further configured to receive a radio resource control RRC connection reconfiguration completion message sent by the user equipment;

the first target base station further comprises: a processor, wherein the processor is configured to establish a connection between the first target base station and the user equipment after the first target base station receives the radio resource control RRC connection reconfiguration completion message sent by the user equipment.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, or the fifteenth possible implementation manner of the ninth aspect, in a sixteenth possible implementation manner, the transmitter is further configured to send, after the first target base station receives the RRC connection reconfiguration completion message sent by the user equipment, a handover indication message of the user equipment to the second target base station, for indicating that the second target base station to starts use a resource configured to the user equipment.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, or the sixteenth possible implementation manner of the ninth aspect, in a seventeenth possible implementation manner, the receiver is further configured to receive, after the first target base station sends the handover indication message of the user equipment to the second target base station, a handover indication reply message of the user equipment sent by the second target base station, wherein the handover indication reply message of the user equipment comprises: third type of GTP tunnel endpoint information corresponding to an identifier of an RAB accepted by the second target base station, wherein the third type of GTP tunnel endpoint information is used for requesting the core network node to switch a GTP tunnel endpoint.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, the sixteenth possible implementation manner of the ninth aspect, or the seventeenth possible implementation manner of the ninth aspect, in an eighteenth possible implementation manner, the transmitter is further configured to send, after the first target base station receives the RRC connection reconfiguration completion message sent by the user equipment, a path switch request message to the core network node to request to hand over a service corresponding to the user equipment in the core network node to the first target base station and/or the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, the sixteenth possible implementation manner of the ninth aspect, the seventeenth possible implementation manner of the ninth aspect, or the eighteenth possible implementation manner of the ninth aspect, in a nineteenth possible implementation manner, the transmitter is configured to realize the sending the handover request acknowledge message to the source base station or the core network node in a following manner: sending the handover request acknowledge message to the source base station or the core network node to trigger the source base station to send data and/or signaling of the user equipment in the source base station to the first target base station and/or the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, the sixteenth possible implementation manner of the ninth aspect, the seventeenth possible implementation manner of the ninth aspect, the eighteenth possible implementation manner of the ninth aspect, or the nineteenth possible implementation manner of the ninth aspect, in a twentieth possible implementation manner, the receiver is further configured to receive the data and/or signaling of the user equipment sent by the source base station; and the transmitter is further configured to send corresponding part of the second target base station in the data and/or signaling of the user equipment to the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, the sixteenth possible implementation manner of the ninth aspect, the seventeenth possible implementation manner of the ninth aspect, the eighteenth possible implementation manner of the ninth aspect, the nineteenth possible implementation manner of the ninth aspect, or the twentieth possible implementation manner, in a twenty-first possible implementation manner, the triggering the source base station to send the data and/or signaling of the user equipment in the source base station to the first target base station and/or the second target base station, includes: triggering the source base station to send corresponding part of the first target base station in the data and/or signaling of the user equipment to the first target base station, and to send corresponding part of the second target base station in the data and/or signaling of the user equipment to the second target base station.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, the sixteenth possible implementation manner of the ninth aspect, the seventeenth possible implementation manner of the ninth aspect, the eighteenth possible implementation manner of the ninth aspect, the nineteenth possible implementation manner of the ninth aspect, the twentieth possible implementation manner, or the twenty-first possible implementation manner, in a twenty-second possible implementation manner, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN state transfer information and an end marker packet.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, the sixteenth possible implementation manner of the ninth aspect, the seventeenth possible implementation manner of the ninth aspect, the eighteenth possible implementation manner of the ninth aspect, the nineteenth possible implementation manner of the ninth aspect, the twentieth possible implementation manner, the twenty-first possible implementation manner, or the twenty-second possible implementation manner, in a twenty-third possible implementation manner, the end marker packet is used for triggering the first target base station and/or the second target base station to receive data sent by a serving gateway in sequence.

In combination with the ninth aspect, the first possible implementation manner of the ninth aspect, the second possible implementation manner of the ninth aspect, the third possible implementation manner of the ninth aspect, the fourth possible implementation manner of the ninth aspect, the fifth possible implementation manner of the ninth aspect, the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, the eleventh possible implementation manner of the ninth aspect, the twelfth possible implementation manner of the ninth aspect, the thirteenth possible implementation manner of the ninth aspect, the fourteenth possible implementation manner of the ninth aspect, the fifteenth possible implementation manner of the ninth aspect, the sixteenth possible implementation manner of the ninth aspect, the seventeenth possible implementation manner of the ninth aspect, the eighteenth possible implementation manner of the ninth aspect, the nineteenth possible implementation manner of the ninth aspect, the twentieth possible implementation manner, the twenty-first possible implementation manner, the twenty-second possible implementation manner, or the twenty-third possible implementation manner, in a twenty-fourth possible implementation manner, the receiver is configured to realize the receiving the handover request message sent by the source base station in a following manner: receiving the handover request message, which comes from the source base station, forwarded by the core network node.

In a tenth aspect, a base station is provided, the base station is a first source base station, the source base station includes: a transmitter, configured to send a handover request message to a target base station, to make a request for a handover of a user equipment from the first source base station and a second source base station to the target base station; and a receiver, configured to receive a handover request acknowledge message sent by the target base station, wherein the transmitter is further configured to send a handover command message to the user equipment, and notify the user equipment to hand over from the first source base station and the second source base station to the target base station.

In a first possible implementation manner of the tenth aspect, the transmitter is further configured to send, before the first source base station sends the handover request message to the target base station, a handover initiation request message to the second source base station, to make a request for a handover of the user equipment from the second source base station to the target base station; and the receiver is further configured to receive a handover initiation response message from the second source base station, and generating the handover request message according to the handover initiation response message.

In combination with the tenth aspect, or the first possible implementation manner of the tenth aspect, in a second possible implementation manner, the transmitter is further configured to send, before the first source base station sends the handover request message to the target base station, a handover initiation request message to the second source base station through a local gateway; and the receiver is further configured to receive the handover request message from the local gateway, wherein the handover request message is generated by the local gateway according to a handover initiation response message from the second source base station.

In combination with the tenth aspect, the first possible implementation manner of the tenth aspect, or the second possible implementation manner of the tenth aspect, in a third possible implementation manner, the transmitter is further configured to send, after the first source base station receives the handover request acknowledge message sent by the target base station, a handover execution notification message to the second source base station, for notifying the second source base station to start executing a handover operation.

In combination with the tenth aspect, the first possible implementation manner of the tenth aspect, the second possible implementation manner of the tenth aspect, or the third possible implementation manner of the tenth aspect, in a fourth possible implementation manner, the receiver is further configured to receive a handover execution notification response message sent by the second source base station, wherein the handover execution notification response message comprises: SN status transfer information corresponding to at least one RAB served by the second source base station, and/or a data packet, in need of forwarding, corresponding to at least one RAB served by the second source base station.

In combination with the tenth aspect, the first possible implementation manner of the tenth aspect, the second possible implementation manner of the tenth aspect, the third possible implementation manner of the tenth aspect, or the fourth possible implementation manner of the tenth aspect, in a fifth possible implementation manner, the receiver is further configured to receive the handover request acknowledge message sent by the target base station for triggering the first source base station and/or the second source base station to send data and/or signaling of the user equipment to the target base station.

In combination with the tenth aspect, the first possible implementation manner of the tenth aspect, the second possible implementation manner of the tenth aspect, the third possible implementation manner of the tenth aspect, the fourth possible implementation manner of the tenth aspect, or the fifth possible implementation manner of the tenth aspect, in a sixth possible implementation manner, the triggering the first source base station and/or the second source base station to send the data and/or signaling of the user equipment to the target base station comprises:

triggering the first source base station to send data and/or signaling of the user equipment in the first target base station and the second target base station to the target base station; or triggering the first source base station to send the data and/or signaling of the user equipment in the first source base station to the target base station, and triggering the second source base station to send the data and/or signaling of the user equipment in the second source base station to the target base station.

In combination with the tenth aspect, the first possible implementation manner of the tenth aspect, the second possible implementation manner of the tenth aspect, the third possible implementation manner of the tenth aspect, the fourth possible implementation manner of the tenth aspect, the fifth possible implementation manner of the tenth aspect, or the sixth possible implementation manner of the tenth aspect, in a seventh possible implementation manner, the data and/or signaling of the user equipment comprises at least one of followings: data of a service corresponding to the user equipment which has been sent without receiving a reply ACK, data of the service corresponding to the user equipment with a NACK received, SDU data, serial number SN status transfer information and an end marker packet.

In combination with the tenth aspect, the first possible implementation manner of the tenth aspect, the second possible implementation manner of the tenth aspect, the third possible implementation manner of the tenth aspect, the fourth possible implementation manner of the tenth aspect, the fifth possible implementation manner of the tenth aspect, the sixth possible implementation manner of the tenth aspect, or the seventh possible implementation manner of the tenth aspect, in an eighth possible implementation manner, the receiver is further configured to receive, before the first source base station sends the end marker packet to the target base station, the end marker packet sent by an S-GW.

In combination with the tenth aspect, the first possible implementation manner of the tenth aspect, the second possible implementation manner of the tenth aspect, the third possible implementation manner of the tenth aspect, the fourth possible implementation manner of the tenth aspect, the fifth possible implementation manner of the tenth aspect, the sixth possible implementation manner of the tenth aspect, the seventh possible implementation manner of the tenth aspect, or the eighth possible implementation manner of the tenth aspect, in a ninth possible implementation manner, the transmitter is further configured to send the handover request message to the target base station through a local gateway.

In an eleventh aspect, a base station is provided, the base station is a source base station, the source base station includes: a transmitter, configured to send a handover request message to a first target base station; a receiver, configured to receive a handover request acknowledge message sent by the first target base station, wherein the handover request acknowledge message is used for notifying the source base station to hand over the user equipment to at least one target cell of the first target base station and/or at least one target cell of a second target base station, wherein the transmitter is further configured to send a handover command message to the user equipment, and indicate the user equipment to hand over to the first target base station and the second target base station.

In a first possible implementation manner of the eleventh aspect, the handover request message includes at least one of followings: information of at least one target cell of the second target base station, measurement report information of the user equipment, context information of the user equipment and information of a service of the user equipment, wherein the information of the service includes RAB information of the service.

In combination with the eleventh aspect, or the first possible implementation manner of the eleventh aspect, in a second possible implementation manner, the information of the service further includes at least one of following:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, subframe information, time domain information, code domain information and space domain information; the split indication information includes data split information based on an RB or data split information based on a packet.

In combination with the eleventh aspect, the first possible implementation manner of the eleventh aspect, or the second possible implementation manner of the eleventh aspect, in a third possible implementation manner, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

In combination with the eleventh aspect, the first possible implementation manner of the eleventh aspect, the second possible implementation manner of the eleventh aspect, or the third possible implementation manner of the eleventh aspect, in a fourth possible implementation manner, the handover request reply message includes at least one of the following items:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between of at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

In combination with the eleventh aspect, the first possible implementation manner of the eleventh aspect, the second possible implementation manner of the eleventh aspect, the third possible implementation manner of the eleventh aspect, or the fourth possible implementation manner of the eleventh aspect, in a fifth possible implementation manner, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, or the fifth possible implementation manner of the eleventh aspect, in a sixth possible implementation manner, the configuration information of the RB includes at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, or the sixth possible implementation manner of the eleventh aspect, in a seventh possible implementation manner, the configuration information of the radio resource of the RB includes at least one of followings: a physical cell identifier, a logic cell identifier, a virtual cell identifier, frequency information, carrier information, radio resource block information, subcarrier information, subframe information, time slot information, time domain information, code domain information and space domain information.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, the sixth possible implementation manner of the eleventh aspect, or the seventh possible implementation manner of the eleventh aspect, in an eighth possible implementation manner, the receiver is configured to realize the receiving the handover request acknowledge message sent by the first target base station in a following manner: receiving the handover request acknowledge message from the first target base station, which is forwarded by a core network element.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, the sixth possible implementation manner of the eleventh aspect, the seventh possible implementation manner of the eleventh aspect, or the eighth possible implementation manner of the eleventh aspect, in a ninth possible implementation manner, wherein the transmitter is configured to send, after the source base station receives the handover request acknowledge message sent by the first target base station, data and/or signaling of the user equipment to the first target base station and/or the second target base station.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, the sixth possible implementation manner of the eleventh aspect, the seventh possible implementation manner of the eleventh aspect, the eighth possible implementation manner of the eleventh aspect, or the ninth possible implementation manner of the eleventh aspect, in a tenth possible implementation manner, the transmitter is configured to send, after the source base station sends the handover command message to the user equipment, data and/or signaling of the user equipment to the first target base station and/or the second target base station.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, the sixth possible implementation manner of the eleventh aspect, the seventh possible implementation manner of the eleventh aspect, the eighth possible implementation manner of the eleventh aspect, the ninth possible implementation manner of the eleventh aspect, or the tenth possible implementation manner of the eleventh aspect, in an eleventh possible implementation manner, the transmitter is configured to realize the sending the data and/or signaling of the user equipment to the first target base station and/or the second target base station in a following manner:

sending the data and/or signaling of the user equipment to the first target base station, for enabling the first target base station to send corresponding part of the second target base station in the data and/or signaling of the user equipment to the second target base station; or sending corresponding part of the first target base station in the data and/or signaling of the user equipment to the first target base station, and sending corresponding part of the second target base station in the data and/or signaling of the user equipment to the second target base station.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, the sixth possible implementation manner of the eleventh aspect, the seventh possible implementation manner of the eleventh aspect, the eighth possible implementation manner of the eleventh aspect, the ninth possible implementation manner of the eleventh aspect, the tenth possible implementation manner of the eleventh aspect, or the eleventh possible implementation manner of the eleventh aspect, in a twelfth possible implementation manner, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, the sixth possible implementation manner of the eleventh aspect, the seventh possible implementation manner of the eleventh aspect, the eighth possible implementation manner of the eleventh aspect, the ninth possible implementation manner of the eleventh aspect, the tenth possible implementation manner of the eleventh aspect, the eleventh possible implementation manner of the eleventh aspect, or the twelfth possible implementation manner of the eleventh aspect, in a thirteenth possible implementation manner, the end marker packet is used for triggering the first target base station and/or the second target base station to receive data sent by a serving gateway in sequence.

In combination with the eleventh aspect, the first possible implementation manner of the eleventh aspect, the second possible implementation manner of the eleventh aspect, the third possible implementation manner of the eleventh aspect, the fourth possible implementation manner of the eleventh aspect, the fifth possible implementation manner of the eleventh aspect, the sixth possible implementation manner of the eleventh aspect, the seventh possible implementation manner of the eleventh aspect, the eighth possible implementation manner of the eleventh aspect, the ninth possible implementation manner of the eleventh aspect, the tenth possible implementation manner of the eleventh aspect, the eleventh possible implementation manner of the eleventh aspect, the twelfth possible implementation manner of the eleventh aspect, or the thirteenth possible implementation manner of the eleventh aspect, in a fourteenth possible implementation manner, the transmitter is configured to realize the sending the handover request message to the first target base station in a following manner: sending the handover request message to the first target base station through a core network node.

In a twelfth aspect, a base station is provided, the base station is a target base station, the target base station includes: a receiver, configured to receive a handover request message sent by a first source base station, wherein the handover request message is used for making a request for a handover of a user equipment from the first source base station and a second source base station to the target base station; and a transmitter, configured to send a handover request acknowledge message to the first source base station, wherein the handover request acknowledge message is used for indicating that the handover of the user equipment from the first source base station and the second source base station to the target base station is accepted.

In a first possible implementation manner of the twelfth aspect, the transmitter is further configured to receive, after the target base station sends the handover request acknowledge message to the first source base station, data and/or signaling of the user equipment sent by the first source base station and/or the second source base station.

In combination with the twelfth aspect, or the first possible implementation manner of the twelfth aspect, in a second possible implementation manner, the receiver is configured to realize that the target base station to receives the data and/or signaling of the user equipment sent by the first source base station and/or the second source base station in a following manner:

receiving the data and/or signaling of the user equipment sent by the first source base station, and/or receiving the data and/or signaling of the user equipment sent by the second source base station; or receiving the data and/or signaling of the user equipment corresponding to the first source base station and/or the second source base station, sent by the first source base station.

In combination with the twelfth aspect, the first possible implementation manner of the twelfth aspect, or the second possible implementation manner of the twelfth aspect, in a third possible implementation manner, the data and/or signaling of the user equipment comprise(s) at least one of followings: data of a service corresponding to the user equipment which has been sent without receiving a reply ACK, data of a service corresponding to the user equipment with a NACK received, SDU data, serial number SN status transfer information and an end marker packet.

In combination with the twelfth aspect, the first possible implementation manner of the twelfth aspect, the second possible implementation manner of the twelfth aspect, or the third possible implementation manner of the twelfth aspect, in a fourth possible implementation manner, the receiver is configured to realize the receiving the handover request message sent by the firsft source base station in a following manner: receiving the handover request message, which comes from the first source base station, forwarded by a local gateway.

In combination with the twelfth aspect, the first possible implementation manner of the twelfth aspect, the second possible implementation manner of the twelfth aspect, the third possible implementation manner of the twelfth aspect, or the fourth possible implementation manner of the twelfth aspect, in a fifth possible implementation manner, after the target base station sends the handover request reply message to the first source base station, the receiver is further configured to receive, after the target base station sends the handover request acknowledge message to the first source base station, a radio resource control RRC connection reconfiguration completion message sent by the user equipment, and control the target base station to establish connection with the user equipment.

By means of an above-mentioned solution, after receiving a handover request message, a first target base station notifies a second target base station to hand over a user equipment thereon, and sends a handover request acknowledge message to the source base station, for notifying the source base station of handing over the user equipment to the first target base station and the second target base station, so that the handover can be achieved when there exists a target cell.

DESCRIPTION OF EMBODIMENTS

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of other embodiments, obtained by those of ordinary skills in the art based on the embodiments of the present invention without any creative effort, fall into the protection scope of the present invention.

A network node (for example, a base station) in this application, which is not limited herein, may be a base station provided with an integral resource management module. It may also a baseband processing module and a radio frequency unit, a remote radio head (Remote Radio Head, RRH for short), a radio remote unit (Radio Remote unit, RRU) and an antenna. It may also be a relay.

Embodiment 1

The embodiment provides a handover processing method. The method may be applied to a handover without a loss of data under a multi-cell split scenario, for example, it is used for a handover of a UE from a source base station to multiple target base stations.

Figure 1:
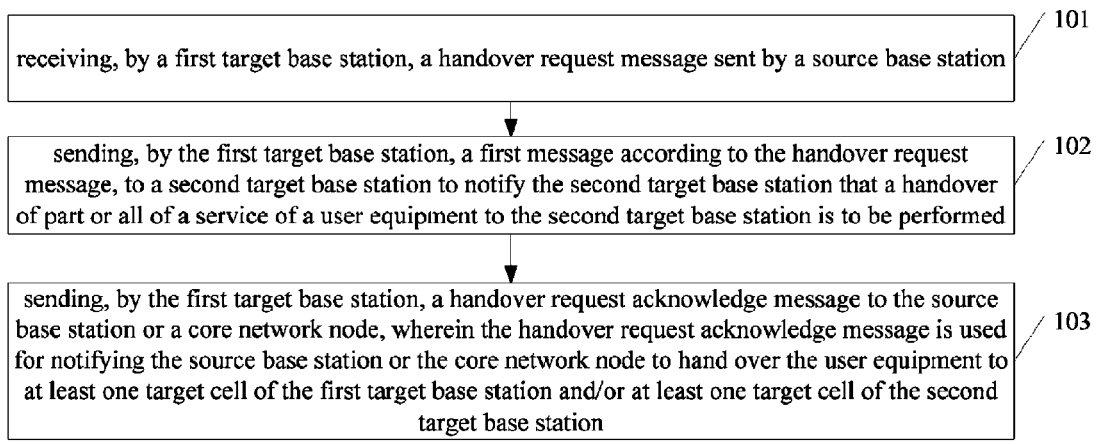
FIG. 1 is a flowchart of a handover processing method according to embodiment 1 of the present invention.

FIG. 1 is a flowchart of a handover processing method according to embodiment 1 of the present invention. As shown in FIG. 1, the method includes:

step 101, receiving, by a first target base station, a handover request message sent by a source base station;

step 102, sending, by the first target base station, a first message according to the handover request message, to a second target base station to notify the second target base station that a handover of part or all of a service of a user equipment to the second target base station is to be performed; and step 103, sending, by the first target base station, a handover request acknowledge message to the source base station or a core network node, wherein the handover request acknowledge message is used for notifying the source base station or the core network node to hand over the user equipment to at least one target cell of the first target base station and/or at least one target cell of the second target base station.

In the solution, the first target base station determines, according to the handover request message, that the UE may also be handed over to the second target base station, notifies the second target base station, and feeds back the handover request acknowledge message to the source base station, for enabling the source base station to hand over the user equipment to the first target base station and the second target base station, so that the handover of the UE from one source base station to multiple target base stations is enabled, a normal handover operation without a loss of data under a multi-cell split scenario is achieved, and the supporting problem that the handover without the loss of data under the multi-cell split scenario could not be supported in the prior art that is solved.

Preferably, the user equipment hands over all services to the second target base station, and the first target base station provides a signaling service for the user equipment.

Preferably, the sending, by the first target base station, a first message, according to the handover request message, to a second target base station, may include following implementation manners.

First manner: the first target base station determines, according to a measurement report of the user equipment and/or radio access bear RAB information of the user equipment in the handover request message, that the handover of the part or all of the service of the user equipment to the second target base station. Then the first target base station sends the first message to the second target base station to notify the second target base station of the handover to be implemented.

Second manner: the source base station determines, according to information of a target cell of the second target base station in the handover request message, that the handover of the part or all of the service of the user equipment to the second target base station. The source base station carries information of the second target base station in the handover request message. Then the first target base station sends, according to the information of the second target base station in the handover request message, the first message to the second target base station.

In the embodiment of the present invention, after the user equipment is handed over to the first target base station and the second target base station, the first target base station and the second target base station may simultaneously provide a data service for the user equipment, or the first target base station provides a signaling service for the user equipment, and the second target base station provides a data service for the user equipment.

Preferably, the handover request message includes at least one of followings: information of at least one target cell of the second target base station, measurement report information of the user equipment, context information of the user equipment and information of a service of the user equipment, wherein the information of the service includes RAB information of the service.

The first message may include information of at least one service of the user equipment, wherein the information of the service includes RAB information of the service and/or configuration information of a radio bear RB.

The information of the service further includes at least one of followings:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, subframe information, time domain information, code domain information and space domain information; the split indication information includes data split information based on an RB or data split information based on a packet, wherein the frequency domain information may include but not limited to position information of a physical resource block, the space domain information may include but not limited to wave beam information, flow information and spatial encoding matrix information, and the code domain information may include but not limited to an address code, a scrambling code and a sequence initializing code, wherein the GTP tunnel endpoint information may include a transport layer address (Transport Layer Address) and a GTP TEID.

Preferably, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

Preferably, the configuration information of the RB includes:

a packet data convergence protocol PDCP layer, a radio link control RLC layer, a medium access control MAC layer and configuration information of a physical layer; or configuration information of an RLC layer, an MAC layer and a physical layer.

In an implementation manner of the embodiment of the present invention, after the first target base station sends the first message to the second target base station, the method further includes:

the first target base station receives a second message sent by the second target base station, for indicating information regarding whether the handover of the part or all of the service of the user equipment to the second target base station is accepted by the second target base station. In the embodiment, the second target base station will feed back information regarding whether the handover is accepted, thereby the handover is performed more effectively. It should be noted that, the step is an optional step, and the first target base station may also command the second target base station to perform the handover directly, without obtaining an agreement of the second target base station.

Preferably, the second message includes at least one of followings:

an identifier of the user equipment, first information and indication information, wherein the indication information includes at least one of followings: indication information of refusing the handover of the part or all of the service of the user equipment to the second target base station, indication information of accepting the handover of the part or all of the service of the user equipment to the second target base station, and indication information of modifying the first message.

The first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

The second message may further include at least one of followings:

fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station, wherein the second type of GTP tunnel endpoint information is used for establishing a transmission bearer for data forwarding between the second target base station and the source base station; and third type of GTP tunnel endpoint information corresponding to an identifier of an RAB accepted by the second target base station, wherein the third type of GTP tunnel endpoint information is used for requesting a core network node to convert a GTP tunnel endpoint.

Preferably, the handover request acknowledge message includes at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

Preferably, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

The configuration information of the RB includes at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

Preferably, the configuration information of the radio resource corresponding to the RB includes at least one of followings:

a physical cell identifier, a logic cell identifier, a virtual cell identifier, frequency information, carrier information, radio resource block information, subcarrier information, sub-frame information, time slot information, time domain information, code domain information and space domain information.

The first message may include an identifier of the user equipment and information of part or all of a service. After receiving the first message, the second target base station may know that the part or all of the service of the user equipment will be handed over to the second target base station, wherein the frequency domain information may include but not limited to position information of a physical resource block, the space domain information may include but not limited to wave beam information, flow information and spatial encoding matrix information, and the code domain information may include but not limited to an address code, a scrambling code and a sequence initializing code.

Preferably, the first target base station determine whether the second target base station accepts the handover of the part or all of the service of the user equipment to the second target base station may be realized in one of following manners.

The first target base station determines, according to the first message and the identifier of the user equipment in the second message, whether the second target base station accepts the handover of the part or all of the service of the user equipment to the second target base station, wherein the first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected of the second target base station, and an identifier of an RAB corresponding to an RB whose resource configuration is rejected by the second target base station.

The first target base station determines, according to the indication information, the first information and the identifier of the user equipment in the second message, whether the second target base station accepts the handover of the part or all of the service of the user equipment to the second target base station, wherein the first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station. The indication information includes at least one of followings: indication information of information refusing the handover of the part of or all of the service of the user equipment to the second target base station, indication information of accepting the handover of the part or all of the service of the user equipment to the second target base station, and indication information of modifying the first message.

The information of the service accepted by the second target base station may include at least one of followings: an identifier of an RB accepted by the second target base station, configuration information of an RB accepted by the second target base station, an identifier of an RAB corresponding to an RB accepted by the second target base station, an identifier of the RB whose resource configuration is rejected by the second target base station, and an identifier of an RAB corresponding to an RB whose resource configuration is rejected by the second target base station.

Preferably, the handover request acknowledge message may trigger the source base station or the core network node to send the handover command message to the user equipment, and then, the user equipment establishes connections with the first target base station and the second target base station.

After sending the handover command message, the user equipment sends information to the first target base station and the second target base station, and the information includes an unordered packet data convergence protocol service data unit PDCP SDU in a reordering buffer region in a PDCP entity in a protocol stack of the user equipment corresponding to the source base station.

In another preferable implementation manner of the embodiment of the present invention, after the first target base station sends the handover request acknowledge message to the source base station or the core network node, the first target base station receives a radio resource control RRC connection reconfiguration completion message sent by the user equipment, and establishes a connection with the user equipment (for example, establishing a signaling connection).

Preferably, after the first target base station receives the radio resource control RRC connection reconfiguration completion message sent by the user equipment, the first target base station sends a handover indication message of the user equipment to the second target base station, and the message may indicate that the second target base station to establish a data connection with the user equipment and an S-GW. The message may be a command message for instructing the second target base station to establish a data connection with the user equipment and the S-GW, and it may also be a request message for requesting the second target base station to establish a data connection with the user equipment and the S-GW. When the handover indication message is a request message, the first target base station may also receive a handover indication reply message of the user equipment sent by the second target base station, and establish a transmission bearer between the second target base station and the serving gateway S-GW according to first general packet radio service tunneling protocol GTP tunnel endpoint information of the second target base station, in order to establish the data connection between the second target base station and the S-GW.

After the first target base station sends the handover indication message of the user equipment to the second target base station, the first target base station sends a path switch request message to the core network node to request to hand over a service corresponding to the user equipment in the core network node to the first target base station and/or the second target base station. After receiving the path switch request message, the core network node may terminate the communication with the source base station, and establish a communication with the first target base station and/or the second target base station.

Preferably, the first target base station sending the handover request acknowledge message to the source base station or the core network node may trigger the source base station to send data and/or signaling of the local user equipment to the first target base station and the second target base station. Before the handedover to the first target base station and the second target base station, the user equipment has communicated with the source base station, and some data of the user equipment has already existed in the source base station. after the handedover to the first target base station and/or the second target base station, the user equipment may not send received data, which is acknowledged by the source base station, to the target base station, resulting in data loss in the target base station. In the embodiment, the source base station sends the data of the user equipment therein to the first target base station and/or the second target base station, thereby achieving a handover without a loss of data.

Before triggering the source base station to send the data and/or signaling of the user equipment in the source base station to the first target base station and the second target base station, a corresponding transmission bearer may be established, and the establishment manner may include:

the first target base station receiving third GTP tunnel endpoint information sent by the second target base station, and establishes a transmission bearer from the first target base station to the second target base station according to the third GTP tunnel endpoint information; and the first target base station sending fourth GTP tunnel endpoint information and fifth GTP tunnel endpoint information to the source base station, wherein the fourth GTP tunnel endpoint information is used by the source base station for establishing a transmission bearer from the source base station to the first target base station, and the fifth GTP tunnel endpoint information is used for the source base station establishing a transmission bearer from the source base station to the first target base station for relaying data of the second target base station.

Preferably, the first target base station receives the data and/or signaling of the user equipment sent by the source base station, and sends corresponding part of the second target base station in the data and/or signaling of the user equipment to the second target base station.

Preferably, before triggering the source base station to send the data and/or signaling of the user equipment in the source base station to the first target base station and the second target base station, the method further includes:

receiving, by the first target base station, sixth GTP tunnel endpoint information sent by the second target base station; and sending, by the first target base station, the sixth GTP tunnel endpoint information and seventh tunnel endpoint information to the source base station, wherein the sixth GTP tunnel endpoint information is used for the source base station establishing a transmission bearer from the source base station to the second target base station, and the seventh GTP tunnel endpoint information is used for the source base station establishing a transmission bearer from the source base station to the first target base station.

Preferably, the triggering the source base station to send the data and/or signaling of the user equipment in the source base station to the first target base station and the second target base station, may include: triggering the source base station to send corresponding part of the first target base station in the data and/or signaling of the user equipment to the first target base station, and send corresponding part to the second target base station in the data and/or signaling of the user equipment to the second target base station.

Preferably, the data and/or signaling of the user equipment includes at least one of followings: data of a service corresponding to the user equipment, which has been sent without receiving a reply ACK, data of a service corresponding to the user equipment, of which a response of non-acknowledgement NACK is received, data of service data unit SDU, serial number SN status transfer information and an end marker packet.

The end marker packet may be used for triggering the first target base station and/or the second target base station to receive data sent by the serving gateway in sequence.

Preferably, the receiving, by a first target base station, a handover request message sent by a source base station includes: receiving, by the first target base station, the handover request message, which comes from the source base station, forwarded by the core network node.

The embodiment provides a technology of a handover without a loss of data under a multi-cell split scenario and provides a technology of a signaling control and a technology of forwarding without a loss of data during a handover, thereby realizing a normal handover operation without a loss of data under a multi-cell split scenario, and a supporting problem that basing on that one UE is served by one cell, a handover flow in the prior art can not support a handover without a loss of data under the multi-cell split scenario, is solved.

Embodiment 2

Figure 2:
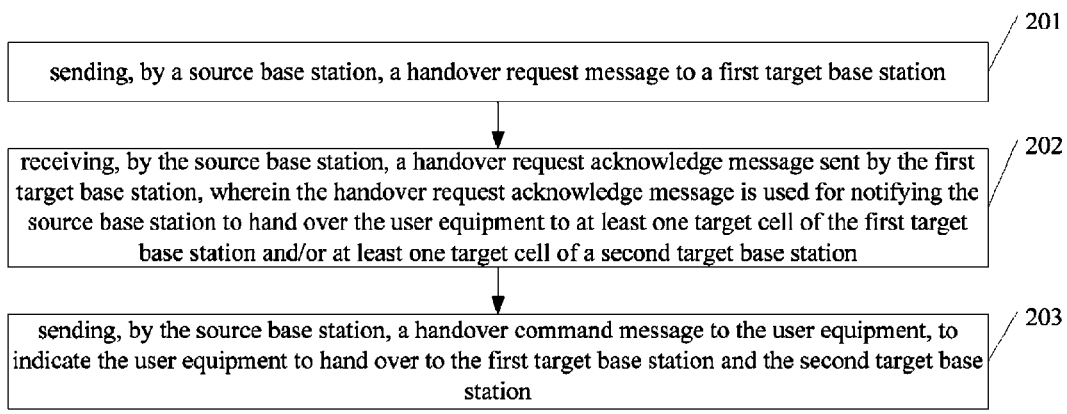
FIG. 2 is a flowchart of a handover processing method according to embodiment 2 of the present invention.

FIG. 2 is a flowchart of a handover processing method according to the embodiment 2 of the present invention, as shown in FIG. 2, the method includes:

step 201, sending, by a source base station, a handover request message to a first target base station;

step 202, receiving, by the source base station, a handover request acknowledge message sent by the first target base station, wherein the handover request acknowledge message is used for notifying the source base station to hand over the user equipment to at least one target cell of the first target base station and/or at least one target cell of a second target base station; and step 203, sending, by the source base station, a handover command message to the user equipment, to indicate the user equipment to hand over to the first target base station and the second target base station.

Preferably, the handover request message may include at least one of followings: information of at least one target cell of the second target base station, measurement report information of the user equipment, context information of the user equipment and information of a service of the user equipment, wherein the information of the service includes RAB information of the service.

Wherein, the information of the service may further include at least one of followings:

configuration coordination information of a radio resource of an RB, an identifier of an RB, an identifier of a radio access bear RAB, split indication information and GTP tunnel endpoint information, wherein, the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information, code domain information and space domain information; the split indication information includes data split information based on an RB or data split information based on a packet.

Preferably, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

Preferably, the handover request acknowledge message includes at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

Optionally, the first transparent container configuration includes at least one of followings:

configuration information of at least one RB, and information of a cell of the first target base station and/or the second target base station;

wherein the RB is an RB corresponding to at least one RAB accepted by the first target base station and/or the second target base station.

Optionally, the configuration information of the RB includes at least one of followings: configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

Optionally, the configuration information of the radio resource of the RB includes at least one of followings: a physical cell identifier, a logic cell identifier, a virtual cell identifier, frequency information, carrier information, radio resource block information, subcarrier information, sub-frame information, time slot information, time domain information, code domain information and space domain information.

Preferably, the source base station may receive the handover request acknowledge message sent by the first target base station, which is forwarded by a core network element.

Preferably, after the source base station receives the handover request acknowledge message sent by the first target base station, the source base station sends data and/or signaling of the user equipment to the first target base station and/or the second target base station.

In a preferable implementation manner of the embodiment, after the source base station sends the handover command message to the user equipment, the source base station sends data and/or signaling of the user equipment to the first target base station and/or the second target base station.

Preferably, the sending, by the source base station, the data and/or signaling of the user equipment to the first target base station and/or the second target base station, includes:

sending, by the source base station, the data and/or signaling of the user equipment to the first target base station, for enabling the first target base station to send corresponding part of the second target base station in the data and/or signaling of the user equipment to the second target base station; or sending, by the source base station, corresponding part of the first target base station in the data and/or signaling of the user equipment to the first target base station, and sending corresponding part of the second target base station in the data and/or signaling of the user equipment to the second target base station.

Preferably, the data and/or signaling of the user equipment includes at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

Optionally, the end marker packet is used for triggering the first target base station and/or the second target base station to receive data sent by a serving gateway in sequence.

In another preferable implementation manner of the embodiment, the source base station sends the handover request message to the first target base station through a core network node.

The embodiment provides a technology of a handover without a loss of data under a multi-cell split scenario and provides a technology of a signaling control and a technology of forwarding without a loss of data during a handover, thereby realizing a normal handover operation without a loss of data under a multi-cell split scenario, and a supporting problem that basing on that one UE is served by one cell, a handover flow in the prior art can not support a handover without a loss of data under the multi-cell split scenario, is solved.

Embodiment 3

The embodiment provides a method for handing over a UE to multi cells. In the embodiment, the UE is handed over from a base station to a target base station 1 (a first target base station) providing a cell aggregation service and a target auxiliary base station 2 (a second target base station), wherein there is a connecting interface between the auxiliary target base station 2 and a gateway.

Figure 3:
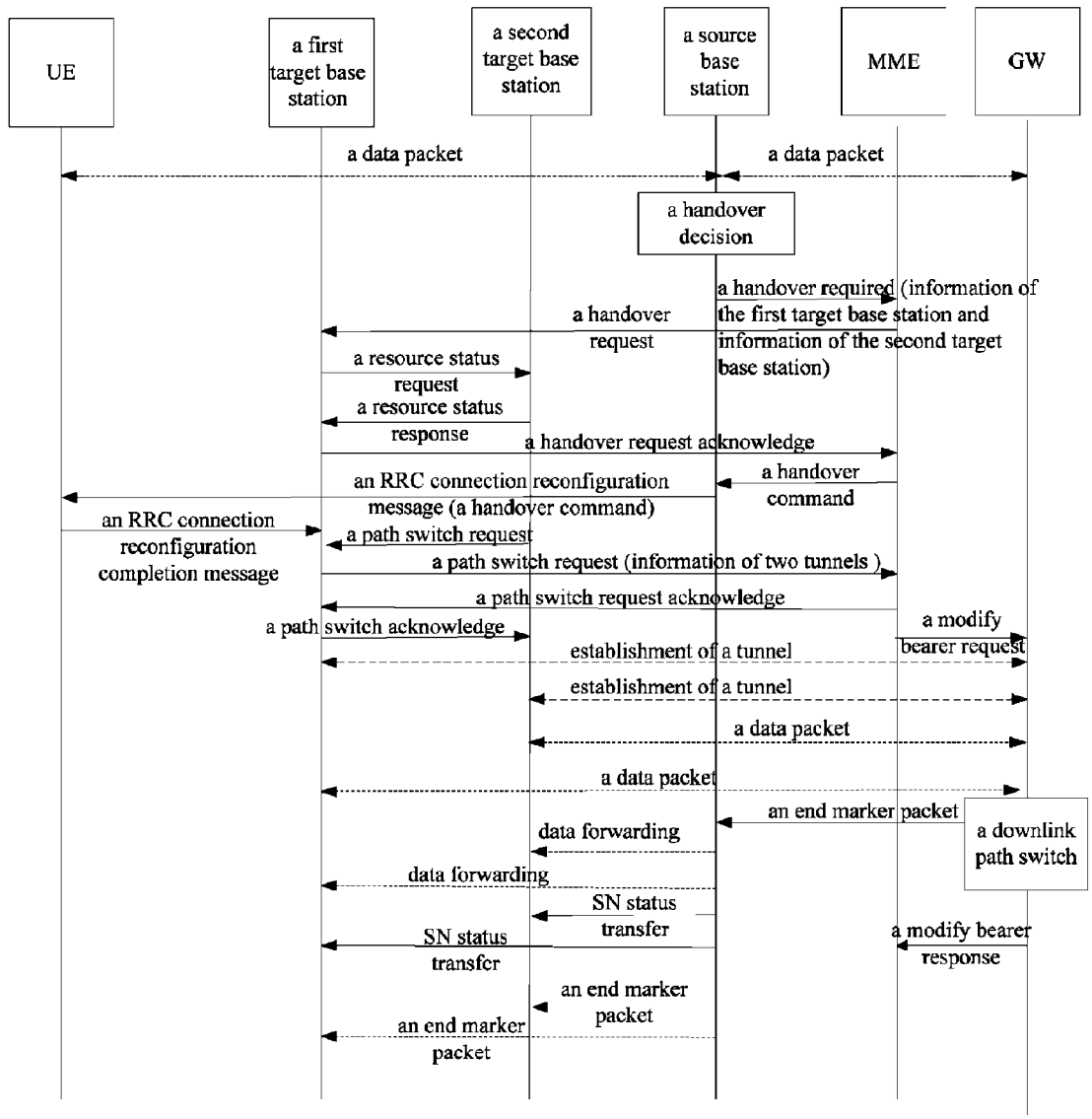
FIG. 3 is a schematic diagram of a handover processing method according to embodiment 3 of the present invention.

FIG. 3 is a schematic diagram of a handover processing method according to embodiment 3 of the present invention, as shown in FIG. 3, the method shown in the embodiment includes following steps:

Step 301, through a handover decision, the source base station determines to hand over the UE to the first target base station, and a basis of the decision may be a measurement report of the UE. And then, the source base station sends a first handover required (handover Required) message to an MME, and optional parameters carried in the message include: information of a recommended target cell group (such as information and cell information of the first target base station and the second target base station), a measurement report on cells of the two base stations, radio resource control (radio resource control, RRC for short) context information of the UE, context information of an S1 interface of the UE and information of a radio access bear (Radio Access Bear, RAB for short), and the like. In the step, the source base station may also determine to hand over the UE to the first target base station and the second target base station simultaneously. At this time, the first handover required message may include: information of a recommended target cell group (information and cell information of the first target base station and the second target base station), RRC context information of the UE, context information of an S1 interface of the UE and information of an RAB. Namely, there may be no measurement report on the cells of the two base stations in the first handover required message. If the source base station, according to the measurement report of the UE, determines to hand over the UE to the first target base station merely, a measurement report of a cell of the second target base station may be carried in the first handover required message, so that the first target base station determines, according to the measurement report, to hand over the UE to the first target base station and the second target base station simultaneously. At this time, the first handover required message may include: the information of the recommended target cell group (information and cell information of the first target base station), the measurement report on the cells of the two base stations, the RRC context information of the UE, the context information of the S1 interface of the UE and the information of the RAB.

In addition, the first handover required message may further include at least one of followings: an identifier of the user equipment allocated at the source base station, information of at least one target cell of the first target base station, a globally unique MME identifier (Globally Unique MME (Mobility Management Entity, mobility management entity) Identifier ID, GUMMEI for short) and context information of the user equipment, wherein the context information of the user equipment includes the combination of at least one item of followings: an identifier of at least one RAB of the user equipment, quality of service (Quality of Service, Qos for short) information corresponding to an RAB and the first type of GTP tunnel endpoint information corresponding to an RAB. The first type of GTP tunnel endpoint information is used for establishing a transmission bearer of an S1 interface between a base station (the first target base station and/or the second target base station) and an S-GW.

Step 302, after receiving the first handover required message, the MME sends a handover request message to the first target base station, and the optional parameters carried in the message include: a recommended target cell group, namely information and cell information of the first target base station and the second target base station, a measurement report on the cells of the two base stations, RRC context information of the UE, context information of an S1 interface of the UE, E-RAB information and the like. The parameters carried in the handover request message sent by the MME may be the same as the parameters carried in the handover request message sent by the source base station.

Step 303, after receiving the handover request message, the first target base station sends a first message (the message may be called as a resource status detection message) to the second target base station, in order to notify the second target base station of information of the above-mentioned UE (e.g., information of an E-RAB, an RAB) and information that the UE is about to be assigned to the second target base station.

A manner of determining the second target base station may include at least one of followings: determining, by the first target base station, according to a recommended target cell group (such as the first target base station and the second target base station) sent by the MME, determining, by the first target base station, according to a result of a measurement report of the UE on cells of the two base stations, and determining, by the first target base station, according to conditions of status of a resource, a load and the like of an auxiliary base station, known by itself, and RAB information of the UE.

Optionally, the resource status detection message may include radio bear configuration information corresponding to an E-RAB information of the UE, for example, if the allocation is perfomred by the first target base station actively, the resource status detection message may include following information: an identifier of the UE (for example, a cell radio network temporary identifier (Cell Radio Network Temporary Identifier, C-RNTI for short) or an XmAP (Xm is an interface between the first target base station and the second target base station) identifier) and split indication information, wherein the split indication information includes data split information based on an RB or data split information based on a packet.

The resource status detection message may further include service information (for example, information of a service to be handed over to the second target base station) of at least one service, wherein the service information includes quality information of a service and/or configuration information of an RB, and the resource status detection message instructs the second target base station to perform a resource configuration according to the service information of the at least one service.

Optionally, the data split information based on the RB means that the first target base station sends SDU data of a packet data convergence protocol (Packet Data Convergence Protocol, referred to as PDCP) layer of a service of the UE to the second target base station. At this time, after receiving the information of at least one service, the second target base station may perform corresponding resource configuration for the information of at least one service, to configure a PDCP layer, a radio link control (Radio Link Control, RLC for short) layer, a medium access control (Medium Access Control, MAC) layer and a physical layer (Physical layer, Phy for short) of an RB corresponding to the information of at least one service. The data split information based on the packet refers to SDU data of an RLC layer of a service of the UE sent from the first target base station to the second target base station. At this time, after receiving at least one service information, the second target base station may perform corresponding resource configuration for the at least one service information, to configure an RLC layer, an MAC layer and a physical layer of an RB corresponding to the at least one service information.

Optionally, when the split indication information includes the data split information based on the packet, the second target base station configures, according to information of at least one service, an RLC layer, an MAC layer and a physical layer of an RB corresponding to the at least one service, and the first target base station configures a PDCP layer, an RLC layer, an MAC layer and a physical layer of the RB.

Optionally, the configuration information of the RB includes: configuration information of a PDCP layer, an RLC layer, an MAC layer and a physical layer, or configuration information of an RLC layer, an MAC layer and a physical layer. In this way, the second target base station may configure the PDCP layer, the RLC layer, the MAC layer and the physical layer, or the RLC layer, the MAC layer and the physical layer of the RB corresponding to the service information of at least one service.

Optionally, the service information may further include at least one of followings: configuration coordination information of a radio resource of RB, an identifier of an RB, an identifier of an RAB and split indication information.

Optionally, the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information, code domain information and space domain information, wherein the frequency domain information may include but not limited to position information of a physical resource block, the space domain information may include but not limited to wave beam information, flow information and spatial encoding matrix information, and the code domain information may include but not limited to an address code, a scrambling code and a sequence initializing code.

Step 304, the second target base station replies a second message (the message may be called as a resource status detection response message) to the first target base station, wherein the message may carry information indicating whether the second target base station accepts the handover request message.

If the second target base station accepts the handover request message, namely, the second target base station accepts the handover of part or all of a service of the UE to the second target base station, the resource status detection response message includes a confirmation or a modification of a configuration content in the resource status detection message. For example, through a resource status detection message, the first target base station notifies the second target base station that the handover of multiple services of the UE to the second target base station is to be performed, the second target base station agrees the handover of part of services in the multiple services to the second target base station, and notified the first target base station, by a resource status detection response message, of handing over the part of services in the multiple services, which is agreed by the second target base station, to the second target base station.

Optionally, the resource status detection response message may include radio bear configuration information corresponding to E-RAB information of the UE, for example, if the allocation is performed by the second target base station actively, the message may include following information:

an identifier of the UE (such as a C-RNTI or an XmAP identifier); and split indication information, wherein the split indication information includes data split information based on an RB or data split information based on a packet.

The resource status detection response message may further include service information of at least one service, wherein the service information includes quality information of a service and/or configuration information of an RB.

The resource status detection response message may further include at least one of followings:

first information and indication information, wherein the first information includes one of followings: information on refusing a handover of part or all of a service of the user equipment to the second target base station, information on accepting the handover of part or all of a service of the user equipment to the second target base station, or information on modifying the first message, and the indication information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

The resource status detection response message may further include at least one of followings:

fourth type of GTP tunnel endpoint information corresponding to an identifier of an RAB accepted by the second target base station (for example, the third GTP tunnel endpoint information), wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station (for example, sixth GTP tunnel endpoint information), wherein the second type of GTP tunnel endpoint information is used for establishing a transmission bearer for forwarding data between the second target base station and the source base station;

third type of GTP tunnel endpoint information corresponding to an identifier of an RAB accepting by the second target base station, wherein the third type of GTP tunnel endpoint information is used for requesting a core network node to convert a GTP tunnel endpoint.

Optionally, the configuration information of the RB includes: configuration information of a PDCP layer, an RLC layer, an MAC layer and a physical layer, or configuration information of an RLC layer, an MAC layer and a physical layer. In this way, the second target base station may configure the PDCP layer, the RLC layer, the MAC layer and the physical layer, or the RLC layer, the MAC layer and the physical layer of an RB corresponding to the service information of at least one service.

Optionally, the service information may further include at least one of following items: configuration coordination information of a radio resource of an RB, an identifier of an RB, an identifier of an RAB and split indication information.

Optionally, the configuration coordination information of the radio resource of the RB includes at least one of following items: a physical cell identifier, a logic cell identifier, a virtual cell identifier, frequency information, carrier information, radio resource block information, sub-carrier information, sub-frame information, time domain information, code domain information and space domain information, wherein the frequency domain information may include but not limited to position information of a physical resource block; the space domain information may include but not limited to wave beam information, flow information and spatial encoding matrix information; the code domain information may include but not limited to an address code, a scrambling code and a sequence initializing code.

A PDCP entity of the UE is logically corresponding to a PDCP entity of the first target base station, a first RLC entity and a second RLC entity of the UE are logically corresponding to RLC entities of the first target base station and the second target base station respectively, a first MAC entity and a second MAC entity of the UE are logically corresponding to MAC entities of the first target base station and the second target base station respectively.

If the second target base station rejects the handover request message, the resource status detection response message includes a refusal to a configuration content in the resource status detection message, for example, the resource status detection response message includes information on refusing the handover of the UE to the second target base station.

Step 305, the first target base station replies a handover request acknowledge (Handover Request ACK) message to a core network element (an MME is taken as an example below), the message may include at least one of followings: a UE identifier, E-RAB information, radio bear information, uplink and/or downlink GTP tunnel endpoint information of the first target base station (including a transport layer address and a GTP TEID), and uplink and/or downlink GTP tunnel endpoint information of the second target base station (including a transport layer address and a GTP TEID), wherein the radio bear information includes a content of the resource status detection response message in step 304.

The handover request acknowledge message may include at least one of followings:

an identifier of the UE allocated at the source base station, an identifier of the UE allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information (for example, fourth GTP tunnel endpoint information) is used for establishing a transmission bearer for data forwarding between the first target base station and the source base station; the sixth type of GTP tunnel endpoint information (for example, fifth GTP tunnel endpoint information) is used for establishing a transmission bearer for forwarding data between the first target base station and the source base station; and the second type of GTP tunnel endpoint information is used for establishing a transmission bearer for data forwarding between the second target base station and the source base station.

Preferably, the first transparent container configuration may include at least one of followings:

configuration information of at least one RB, and information of a cell of the first target base station and/or the second target base station;

wherein the RB is an RB corresponding to at least one RAB accepted by the first target base station and/or the second target base station.

Preferably, the configuration information of the RB includes at least one of following: configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio source corresponding to the RB.

The configuration information of the radio source corresponding to the RB includes at least one of following:

a physical cell identifier, a logic cell identifier, a virtual cell identifier, frequency information, carrier information, radio resource block information, subcarrier information, sub-frame information, time slot information, time domain information, code domain information and space domain information, wherein the frequency domain information may include but not limited to position information of a physical resource block; the space domain information may include but not limited to wave beam information, flow information and spatial encoding matrix information; the code domain information may include but not limited to an address code, a scrambling code and a sequence initializing code.

Step 306, after receiving the Handover Request ACK (HANDOVER REQUEST ACKNOWLEDGE) message replied by the first target base station, the MME sends a handover command (handover command) message to the source base station, to notify the source base station of a resource allocation condition of the target base station. The handover command message includes: a UE identifier, E-RAB information, radio bear information. An uplink and/or downlink GTP tunnel endpoint of the first target base station includes a transport layer address (Transport Layer Address) and a GTP TEID, and an uplink and/or downlink GTP tunnel endpoint includes a transport layer address (Transport Layer Address) and a GTP TEID of the second target base station, wherein the radio bear information includes a content of the resource status detection response message in step 304.

Step 307, after receiving the handover command message of the MME, the source base station sends a handover command message (for example, sending in a form of an RRC connection reconfiguration message) to the UE, and the handover command message includes configuration list information of the RB and/or information of a cell of the second target base station, so as to enable the UE to configure a corresponding RB according to the configuration message. The handover command message may further include: information of a target cell group (for example, information and cell information of the first target base station and the second target base station), configuration information of a service in the two base stations (the configuration information may be radio bear information and may include a content of the resource status detection response message in step 304), security information and the like. Then, step 310 is implemented.

It should be noted that, as long as the source base station receives the HANDOVER REQUEST ACKNOWLEDGE, or as long as the source base station starts to send the handover command to the UE, a forwarding of data from the source base station to the target base station begins, so that a data plane transmission as shown in step 308 and step 309 may be performed. Since in step 307, the source base station begins to send the handover command to the UE, step 308 and step 309 may be performed after step 307, for example, a downlink transmission in step 308, or step 309 may be implemented, wherein a sequence of an implementation of step 308 and step 309 is not limited.

Step 308, in a downlink direction, the source base station forwards, according to conditions of servies undertaken by cells in the first target base station and the second target base station, data, through a core network, to the first target base station and the second target base station respectively, the data include a PDCP SDU of data of a corresponding service, which has been sent without receiving an ACK or with a NACK received (type 1), or data of a service data unit (Service Data Unit, SDU for short) (i.e., without a PDCP SN) (type 2); or the source base station forwards a PDCP SDU of data corresponding to all services being handed over, an ACK of which is not received or a NACK of which is received (type 1), or data of an SDU (i.e., without a PDCP SN) (type 2) to the first target base station, and then the first target base station forwards a PDCP SDU of data corresponding to a service of the second target base station, an ACK of which is not received or a NACK of which is received (type 1), or data of SDU (i.e., without PDCP SN) (type 2) to the second target base station.

In an uplink direction, the UE, starting from a first PDCP SDU packet of each service, an acknowledgement of which is not received, resends an uplink PDCP SDU without receiving an ACK to the corresponding first target base station and the second target base station. When receiving a bitmap, the UE may determine, according to a presentation of the bitmap, an ACK with an acknowledgement received, and send data without receiving an ACK to corresponding first target base station and the second target base station. The UE may also send, starting from a first PDCP SDU packet without receiving an acknowledgement, all latter data to the corresponding first target base station and the second target base station.

Step 309, the source base station forwards, according to conditions of service undertaken by cells in the first target base station and the second target base station, SN STATUS TRANSFER (SN status transfer information) of corresponding services, through the core network, to the first target base station and the second target base station respectively, and indicates a receiving status of uplink data and/or a sending status of downlink data of a corresponding RAB in the SN status transfer information, for example, notifying of a serial number (Serial Number, SN for short) of a first packet of type 2, an SN number of a first lost UL data packet and a bitmap of a UL data packet of the target base station; or the source base station, through the core network, forwards the SN STATUS TRANSFER (SN status transfer information) corresponding to all services being handed over to the first target base station; after receiving the SN STATUS TRANSFER corresponding to all services being handed over, the first target base station forwards SN status transfer information of the services corresponding to the second target base station to the second target base station, and indicates a receiving status of uplink data and/or a sending status of downlink data of corresponding RAB in the SN status transfer information, for example, notifying of an SN number of a first packet of type 2, an SN number of a first lost UL data packet and a bitmap of a UL data packet of the target base station.

Step 310, after receiving the handover command message, the UE establishes, according to information in the message mentioned in step 307, a PDCP layer entity, an RLC layer entity, an MAC layer entity and a physical layer entity corresponding to a cell protocol stack of the first target base station, and establishes a PDCP layer entity (optional), an RLC layer entity, an MAC layer entity and a physical layer entity corresponding to the cell protocol stack of the second target base station. After a radio bear is configured successfully, the UE forwards a PDCP SDU to a PDCP layer of the newly established cell protocol stack of the first target base station and/or the second target base station, wherein the PDCP SDU is an unordered PDCP SDU of a reordering buffer region in the PDCP entity in the UE protocol stack corresponding to the source base station. After the forwarding is completed, the UE may release each layer entity corresponding to the protocol stack of the source base station in the UE. The UE completes a downlink synchronization with the cell of the first target base station and the cell of the second target base station. According to a preamble code of a random access and RACH resource information in the handover command message, the UE initiates a random access process to the first target base station to complete an uplink synchronization, and/or initiates a random access process to the second target base station to complete an uplink synchronization. And then, the UE replies an RRC connection reconfiguration completion message (HO confirm, handover confirm) to the first target base station.

Step 311, after receiving the RRC connection reconfiguration completion message replied by the UE, the first target base station sends a handover notify (handover notify) message to the MME and establishes a connection with the UE. At this time, the data transmission in the uplink direction in step 308 may be implemented.

Step 312, after receiving the RRC connection reconfiguration completion message replied by the UE, the first target base station sends service configuration information of the UE or a handover indication message of the UE to the second target base station.

Step 313, after receiving the service configuration information of the UE or the handover indication message of the UE, the second target base station sends a path switch request to the first target base station. The step is an optional step, and step 314 may be directly implemented after step 312.

Step 314, the first target base station sends a path switch request (Path Switch Request) message to the MME, wherein the message includes: uplink and/or downlink GTP tunnel endpoint information of the first target base station, uplink and/or downlink GTP tunnel endpoint information of the second target base station and a corresponding identifier of an RAB, wherein the GTP tunnel endpoint information includes a transport layer address and a GTP TEID.

Step 315, the MME sends a modify bearer request (MODIFY BEARER REQUEST) message to a gateway (GW, for example, a serving gateway (Serving Gateway, S-GW for short), the message includes uplink and/or downlink GTP tunnel endpoint information of the first target base station, uplink and/or downlink GTP tunnel endpoint information of the second target base station and a corresponding identifier of an RAB, wherein the GTP tunnel endpoint information includes a transport layer address and a GTP TEID.

Step 316, after receiving the MODIFY BEARER REQUEST message sent by the MME, the Serving Gateway switches an RAB, in need of a path switching, to the corresponding first target base station and/or the second target base station respectively. And then, the Serving Gateway sends an end marker packet (end marker packet) to the source base station and releases a path with the source base station.

Step 317, after receiving the end marker packet, the source base station respectively forwards, according to conditions of services undertaken by cells of a main base station and an auxiliary base station, an end marker packet of a corresponding service to the first target base station and the second target base station; or the source base station sends end marker packets corresponding to all services being handed over to the first target base station, and then the first target base station forwards an end marker packet of a service corresponding to the second target base station to the second target base station.

Step 318, after detecting an end marker packet, the first target base station and/or the second target base station sequentially receives data sent by the Serving Gateway and data forwarded by the source base station.

Step 319, the Serving Gateway sends a modify bearer response (MODIFY BEARER RESPONSE) to the MME.

Step 320, after receiving the modify bearer response message sent by the Serving Gateway, the MME sends a UE context deletion command message to the source base station.

Step 321, after receiving the UE context deletion command message sent by the MME, the source base station deletes the context of the UE in the source base station and replies a UE context deletion completion message to the MME.

Step 322, the MME sends a path switch request acknowledge (PATH SWITCH REQUEST ACKNOWLEDGE) message to the first target base station.

Step 323, the first target base station sends a path switch request acknowledge (PATH SWITCH REQUEST ACKNOWLEDGE) message to the second target base station.

Step 314 to step 323 belong to a transmission of a data plane.

By means of the embodiment, the UE is handed over from the source base station to the first target base station and the second target base station.

Embodiment 4

The embodiment further provides a method for handing over a UE to multi cells. In the embodiment, the UE is handed over from a base station to a target base station 1 (first target base station) providing a cell aggregation service and an auxiliary target base station 2 (second target base station).

Figure 4:
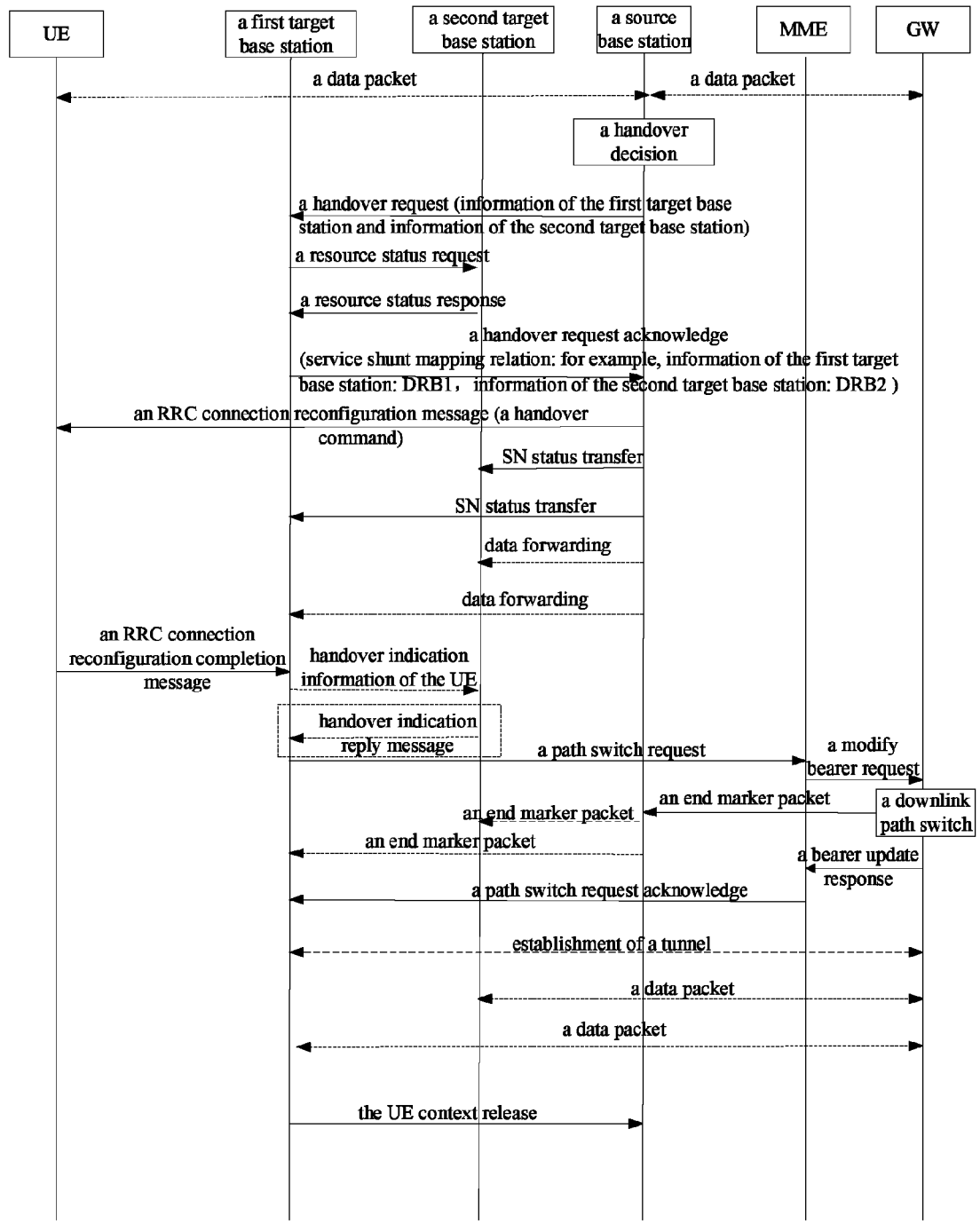
FIG. 4 is a schematic diagram of a handover processing method according to embodiment 4 of the present invention.

FIG. 4 is a schematic diagram of a handover processing method according to the embodiment 4 of the present invention. As shown in FIG. 4, the method as shown in the embodiment includes following steps.

Step 401, through a handover decision, the source base station determines to hand over the UE to the first target base station, and a basis of the decision may be a measurement report of the UE. And then, the source base station sends a handover request message to the first target base station, wherein optional parameters carried in the handover request message include at least one of followings: information of a recommended target cell group (for example, information and cell information of the first target base station and/or the second target base station), a measurement report of cells of the adjacent base stations, RRC context information of the UE, context information of an S1 interface of the UE, E-RAB information and the like.

In the step, the source base station may also determine to hand over the UE to the first target base station and/or the second target base station simultaneously. At this time, the handover request message may include: information of a recommended target cell group (information and cell information of the first target base station and/or the second target base station), RRC context information of the UE, context information of an S1 interface of the UE and information of an RAB, namely, the handover request message may include no measurement report on cells of the two base stations. If the source base station merely determines, according to the measurement report on the UE, to hand over the UE to the first target base station, the measurement report on the cell of the second target base station may be carried in the handover request message, for enabling the first target base station to determine, according to the measurement report, to hand over the UE to the first target base station and the second target base station simultaneously. At this time, the handover request message may include: information of a recommended target cell group (information and cell information of the first target base station), measurement report on cells of the two base stations, RRC context information of the UE, context information of an S1 interface of the UE and information of an RAB.

Step 402, after receiving the handover request message, the first target base station sends a first message (the message may be called as a resource status detection message) to the second target base station according to at least one of following contents, notifying the second target base station of the handover of part or all of a service of the UE to the second target base station is to be performed (a content notified may include: service information, split information, information of the UE to be allocated to the second target base station (for example, E-RAB information) and the like), a recommended target cell group (namely, the first target base station and the second target base station), a result of a measurement report of the UE on cells of the two base stations, according a condition of a resource of an auxiliary base station known by the first target base station and RAB information of the UE.

Optionally, the resource status detection message may include radio bear configuration information corresponding to E-RAB information of the UE, for example, if the allocation is performed by first target base station actively, the message may include following information:

an identifier of the UE (for example, a C-RNTI or an XmAP identifier); and split indication information, wherein the split indication information includes data split information based on an RB or data split information based on a packet.

The resource status detection message may further include service information of at least one service. The service information includes quality information of a service and/or configuration information of an RB. The resource status detection message instructes the second target base station to perform a resource configuration according to service information of the at least one service, wherein the second target base station is at least one base station in a base station providing a service to the UE (such as the first target base station and the second target base station).

Optionally, the data split information based on the RB means that the first target base station sends SDU data of a PDCP layer of a service of the UE to the second target base station. At this time, after receiving the information of at least one service, the second target base station may perform corresponding resource configuration for the information of at least one service, to configure a PDCP layer, an RLC layer, an MAC layer and a physical layer of an RB corresponding to the information of at least one service. The data split information based on the packet refers to SDU data of an RLC layer of a service of the UE sent from the first target base station to the second target base station. At this time, after receiving at least one service information, the second target base station may perform corresponding resource configuration for the at least one service information, to configure an RLC layer, an MAC layer and a physical layer of an RB corresponding to the at least one service information.

Optionally, when the split indication information includes the data split information based on the packet, the second target base station configures, according to information of at least one service, an RLC layer, an MAC layer and a physical layer of an RB corresponding to the at least one service, and the first target base station configures a PDCP layer, an RLC layer, an MAC layer and a physical layer of the RB.

A configuration message is sent to the UE, for enabling the UE to configure a corresponding RB according to the configuration message, wherein the configuration message includes configuration list information of the RB and/or information of a cell of the second target base station.

Optionally, the configuration information of the RB includes: the configuration information of a PDCP layer, an RLC layer, an MAC layer and a physical layer, or configuration information of an RLC layer, an MAC layer and a physical layer.

In this way, the second target base station may configure the PDCP layer, the RLC layer, the MAC layer and the physical layer, or the RLC layer, the MAC layer and the physical layer of the RB corresponding to the service information of at least one service.

Optionally, the service information may further include at least one of following items: configuration coordination information of a radio resource of RB, an identifier of RB, an identifier of RAB and split indication information.

Optionally, the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information and space domain information, wherein the frequency domain information may include but not limited to position information of a physical resource block, the space domain information may include but not limited to wave beam information, flow information and spatial encoding matrix information, and the code domain information may include but not limited to an address code, a scrambling code and a sequence initializing code.

Step 403, the second target base station sends a resource status detection response message to the first target base station.

If the second target base station accepts the handover request, namely, the second target base station accepts the handover of part or all of a service of the UE to the second target base station, the resource status detection response message includes a confirmation or a modification of a configuration content in the resource status detection message. For example, through a resource status detection message, the first target base station notifies the second target base station that the handover of multiple services of the UE to the second target base station is to be performed, the second target base station agrees the handover of part of services in the multiple services to the second target base station, and notified the first target base station, by a resource status detection response message, of handing over the part of services in the multiple service, which is agreed by the second target base station, to the second target base station.

Optionally, the resource status detection response message may include radio bear configuration information corresponding to E-RAB information of the UE, for example, if the allocation is performed by the second target base station actively, the message may include following information:

an identifier of the UE (for example, a C-RNTI or an XmAP identifier); and split indication information, wherein the split indication information includes data split information based on an RB or data split information based on a packet.

The resource status detection response message may further include service information of at least one service, wherein the service information includes quality information of a service and/or configuration information of an RB.

The resource status detection response message may further include at least one of followings:

first information and indication information, wherein the first information includes at least one of followings: information on refusing a handover of part or all of a service of the user equipment to the second target base station, information on accepting the handover of part or all of a service of the user equipment to the second target base station, or information on modifying the first message, and the indication information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

The resource status detection response message may further include at least one of followings:

fourth type of GTP tunnel endpoint information corresponding to an identifier of an RAB accepted by the second target base station (for example, the third GTP tunnel endpoint information), wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station (for example, sixth GTP tunnel endpoint information), wherein the second type of GTP tunnel endpoint information is used for establishing a transmission bearer for forwarding data between the second target base station and the source base station;

third type of GTP tunnel endpoint information corresponding to an identifier of an RAB accepting by the second target base station, wherein the third type of GTP tunnel endpoint information is used for requesting a core network node to convert a GTP tunnel endpoint.

Optionally, the configuration information of the RB includes: configuration information of a PDCP layer, an RLC layer, an MAC layer and a physical layer, or configuration information of an RLC layer, an MAC layer and a physical layer. In this way, the second target base station may configure the PDCP layer, the RLC layer, the MAC layer and the physical layer, or the RLC layer, the MAC layer and the physical layer of an RB corresponding to the service information of at least one service.

Optionally, the service information may further include at least one of the following items: configuration coordination information of a radio resource of an RB, an identifier of an RB, an identifier of an RAB and split indication information.

Optionally, the configuration coordination information of the radio resource of the RB includes at least one of following items: a physical cell identifier, a logic cell identifier, a virtual cell identifier, frequency information, carrier information, radio resource block information, sub-carrier information, sub-frame information, time domain information and space domain information; wherein the frequency domain information may include but not limited to position information of a physical resource block; the space domain information may include but not limited to wave beam information, flow information and spatial encoding matrix information; the code domain information may include but not limited to an address code, a scrambling code and a sequence initializing code.

A PDCP entity of the UE is logically corresponding to a PDCP entity of the first target base station, a first RLC entity and a second RLC entity of the UE are logically corresponding to RLC entities of the first target base station and the second target base station respectively, a first MAC entity and a second MAC entity of the UE are logically corresponding to MAC entities of the first target base station and the second target base station respectively.

If the second target base station rejects the handover request message, the resource status detection response message includes a refusal to a configuration content in the resource status detection message, for example, the resource status detection response message includes information on refusing the handover of the UE to the second target base station.

Step 404, the first target base station sends a Handover Request ACK message to the source base station, and the message includes: a UE identifier, E-RAB information, radio bear information, uplink and/or downlink GTP tunnel endpoint information of the first target base station (including a transport layer address and a GTP TEID), and uplink and/or downlink GTP tunnel endpoint information of the second target base station (including a transport layer address and a GTP TEID), wherein the radio bear information includes a content of the message in step 403. A step is implemented after this step.

The handover request acknowledge message may include at least one of followings:

an identifier of the UE allocated at the source base station, an identifier of the UE allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information (for example, fourth GTP tunnel endpoint information) is used for establishing a transmission bearer for data forwarding between the first target base station and the source base station; the sixth type of GTP tunnel endpoint information (for example, fifth GTP tunnel endpoint information) is used for establishing a transmission bearer for forwarding data between the first target base station and the source base station; and the second type of GTP tunnel endpoint information is used for establishing a transmission bearer for data forwarding between the second target base station and the source base station.

Preferably, the first transparent container configuration may include at least one of followings:

configuration information of at least one RB, and information of a cell of the first target base station and/or the second target base station;

wherein the RB is an RB corresponding to at least one RAB accepted by the first target base station and/or the second target base station.

Preferably, the configuration information of the RB includes at least one of the following items: configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio source corresponding to the RB.

The configuration information of the radio source corresponding to the RB includes at least one of followings:

a physical cell identifier, a logic cell identifier, a virtual cell identifier, frequency information, carrier information, radio resource block information, subcarrier information, sub-frame information, time slot information, time domain information and space domain information, wherein the frequency domain information may include but not limited to position information of a physical resource block; the space domain information may include but not limited to wave beam information, flow information and spatial encoding matrix information; the code domain information may include but not limited to an address code, a scrambling code and a sequence initializing code.

Step 405, after receiving the HANDOVER REQUEST ACKNOWLEDGE, the source base station sends a handover command message (for example, sending in the form of an RRC connection reconfiguration message) to the UE, and the handover command message includes: information of a target cell group (for example, information and cell information of the first target base station and the second target base station), configuration information of a service in the two base stations (the radio bear information includes a content of the message in step 403), security information and the like.

It should be noted that, as long as the source base station receives the Handover Request ACK (HANDOVER REQUEST ACKNOWLEDGE), or as long as the source base station starts to send the handover command to the UE, a forwarding of data begins. Therefore, in this step, after receiving the HANDOVER REQUEST ACKNOWLEDGE, the source base station may execute a data transmission in a downlink direction in step 406 and step 407, wherein the executing sequence of step 406 and step 407 is not limited.

Step 406, in a downlink direction, the source base station sends, according to conditions of servies undertaken by cells in the first target base station and the second target base station, a PDCP SDU of data of a corresponding service, which has been sent without receiving an ACK or with a NACK received (type 1), to the first target base station and/or the second target base station corresponding to the service respectively, and forwards data of an SDU (i.e., without PDCP SN) (type 2) to the first target base station and/or the second target base station corresponding to the service; or the source base station forwards a PDCP SDU of data corresponding to all services being handed over, an ACK of which is not received or a NACK of which is received (type 1) or data of an SDU (i.e., without PDCP SN) (type 2) to the first target base station. After receiving these data, the first target base station forwards a PDCP SDU corresponding to a service of the second target base station, an ACK of which is not received or a NACK of which is received (type 1), or data of SDU (i.e., without PDCP SN) (type 2) to the second target base station.

In an uplink direction, the UE, starting from a first PDCP SDU packet of each service, an acknowledgement of which is not received, resends an uplink PDCP SDU without receiving an ACK to the corresponding first target base station and the second target base station.

Step 407, the source base station sends, according to conditions of service undertaken by cells in the first target base station and the second target base station, SN STATUS TRANSFER (SN status transfer information) of corresponding services to the first target base station and the second target base station respectively, and indicates a receiving status of uplink data and/or a sending status of downlink data of a corresponding RAB in the SN status transfer information, for example, notifying of an SN number of a first packet of type 2, an SN number of a first lost UL data packet and a bitmap of a UL data packet of the target base station (the first target base station and/or the second target base station); or the source base station sends the SN STATUS TRANSFER (SN status transfer information) corresponding to all services being handed over to the first target base station; after receiving the SN STATUS TRANSFER corresponding to all services being handed over, the first target base station forwards SN status transfer information of the services corresponding to the second target base station to the second target base station, and indicates a receiving status of uplink data and/or a sending status of downlink data of the corresponding RAB in the SN status transfer information, for example, notifying of an SN number of a first packet of type 2, an SN number of a first lost UL data packet and a bitmap of a UL data packet of the target base station.

Step 408, after receiving the handover command message, the UE respectively establishes, according to a configuration parameter of a service in the message, a new PDCP layer entity, RLC layer entity, MAC layer entity and physical layer entity for a bearer corresponding to a cell protocol stack of the first target base station, and establishes a new PDCP layer entity (optional), RLC layer entity, MAC layer entity and physical layer entity for a bearer corresponding to the UE and a cell protocol stack of the second target base station. After a radio bear is configured successfully, the UE forwards an unordered PDCP SDU in a reordering buffer region in the PDCP entity in the protocol stack corresponding to the source base station to a newly established PDCP layer of the cell protocol stack of the first target base station and/or the cell protocol stack of the second target base station. After the forwarding is completed, the UE may release each layer entity corresponding to the protocol stack of the source base station in the UE. The UE completes a downlink synchronization with the cell of the first target base station and the cell of the second target base station. According to a preamble code of a random access and random access channel (Random Access Channel, RACH for short) resource information in the handover command message, the UE initiates a random access process to the first target base station to complete an uplink synchronization, and/or initiates a random access process to the second target base station to complete an uplink synchronization. And then, the UE sends an RRC connection reconfiguration completion message to the first target base station.

Step 409, after receiving the RRC connection reconfiguration completion message sent by the UE, the first target base station sends service configuration information of the UE or handover indication information of the UE to the second target base station, to instruct the second target base station to start to use a resource it configured for the UE.

Step 410, after receiving the service configuration information of the UE or the handover indication information of the UE, the second target base station sends a handover indication reply message to the first target base station. This step is an optional step.

Step 411, the first target base station sends a path switch request message to an MME, wherein the message includes: uplink and/or downlink GTP tunnel endpoint information of the first target base station (including a transport layer address and a GTP TEID) and a corresponding identifier of an RAB, uplink and/or downlink GTP tunnel endpoint information of the second target base station (including a transport layer address and a GTP TEID) and a corresponding identifier of an RAB.

Step 412, the MME sends a MODIFY BEARER REQUEST message to a Serving Gateway, and the message includes: uplink and/or downlink GTP tunnel endpoint information of the first target base station (including a transport layer address and a GTP TEID) and a corresponding identifier of an RAB, uplink and/or downlink GTP tunnel endpoint information of the second target base station (including a transport layer address and a GTP TEID) and a corresponding identifier of an RAB.

Step 413, after receiving the MODIFY BEARER REQUEST message sent by the MME, the Serving Gateway switches an RAB, in needing of a path switching, to the corresponding first target base station and/or the second target base station respectively. And then, the Serving Gateway sends an end marker packet (end marker packet) to the source base station and releases a path with the source base station.

Step 414, after receiving the end marker packet, the source base station respectively forwards, according to conditions of services undertaken by cells of the first target base station and the second target base station, an end marker packet of a corresponding service to the first target base station and the second target base station; or the source base station sends end marker packets corresponding to all services being handed over to the first target base station, and then the first target base station forwards end marker packets of a service corresponding to the second target base station to the second target base station.

Step 415, after detecting an end marker packet, the first target base station and/or the second target base station sequentially receives data sent by the Serving Gateway and data forwarded by the source base station.

Step 416, the Serving Gateway sends a MODIFY BEARER RESPONSE to the MME.

Step 417, the MME sends a PATH SWITCH REQUEST ACKNOWLEDGE message to the first target base station.

Step 418, the first target base station sends a PATH SWITCH REQUEST ACKNOWLEDGE message to the second target base station.

By means of the embodiment, the UE is handed over from the source base station to the first target base station and the second target base station.

Embodiment 5

The embodiment provides a handover processing method. The method may be used for a handover without a loss of data under a multi-cell split scenario, for example, handing over a UE from multiple source base stations to a target base station.

Figure 5:
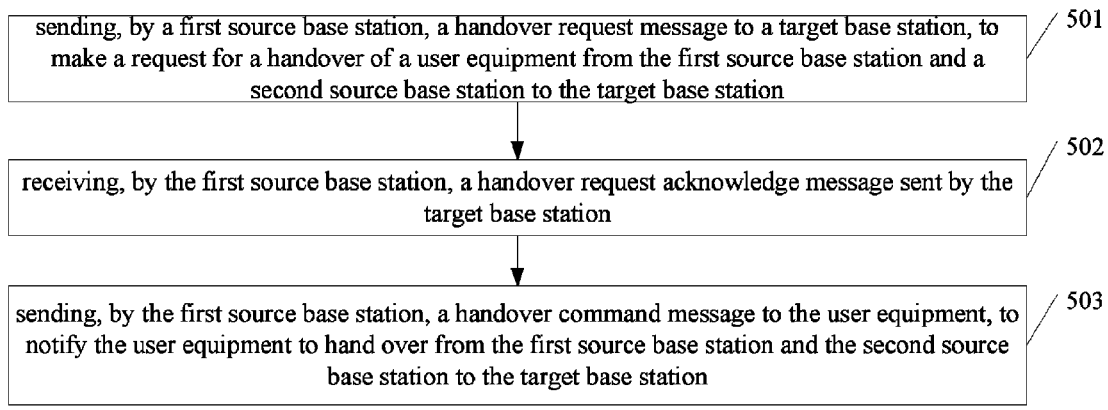
FIG. 5 is a flowchart of a handover processing method according to embodiment 5 of the present invention.

FIG. 5 is a flowchart of a handover processing method according to the embodiment 5 of the present invention, as shown in FIG. 5, the method includes:

step 501, sending, by a first source base station, a handover request message to a target base station, to make a request for a handover of a user equipment from the first source base station and a second source base station to the target base station;

step 502, receiving, by the first source base station, a handover request acknowledge message sent by the target base station; and step 503, sending, by the first source base station, a handover command message to the user equipment, to notify the user equipment to hand over from the first source base station and the second source base station to the target base station.

In the solution, through the handover request message, the first source base station notifies the target base station that the UE is handed over from the first source base station and the second source base station to the target base station, so that the UE may be handed over from multiple source base stations to one target base station, a normal handover operation without a loss of data under a multi-cell split scenario is achieved, and the supporting problem that the handover without the loss of data under the multi-cell split scenario could not be supported in the prior art that is solved Preferably, before the first source base station sends the handover request message to the target base station, the first source base station sends a handover initiation request message to the second source base station, to make a request for a handover of the user equipment from the second source base station to the target base station; the first source base station receives a handover initiation response message from the second source base station, and generates the handover request message according to the handover initiation response message.

Preferably, before the first source base station sends the handover request message to the target base station, the first source base station may send a handover initiation request message to the second source base station through a local gateway; the second source base station sends the handover initiation response message to the local gateway, and then, the local gateway generates the handover request message according to a handover initiation response message and sends the handover request message to the first source base station.

After the first source base station receives the handover request acknowledge message sent by the target base station, the first source base station may send a handover execution notification message to the second source base station, for notifying the second source base station to start executing a handover operation. The handover execution notification message may be a command message, for commanding the second source base station to perform the handover and it may also be a request message, for requesting the second source base station to perform the handover.

Preferably, after the first source base station sends the handover execution notification message to the second source base station, the first source base station receives a handover execution notification response message from the second source base station, wherein the handover execution notification response message includes: SN status transfer information corresponding to at least one RAB served by the second source base station, and/or a data packet, in need of forwarding, corresponding to at least one RAB served by the second source base station.

Preferably, after the first source base station receives the handover request acknowledge message sent by the target base station, the first source base station and/or the second source base station sends data and/or signaling of the user equipment to the target base station. Therefore, the handover request acknowledge message may be used for triggering the first source base station and/or the second source base station to send data and/or signaling of the user equipment to the target base station. In the handover process of the embodiment, the first source base station and/or the second source base station send(s) data and/or signaling of the user equipment to the target base station, in order to realize a handover without a loss of data.

In a preferable implementation manner of the embodiment of the present invention, the sending, by the first source base station and/or the second source base station, the data and/or signaling of the user equipment to the target base station, includes:

sending, by the first source base station, data and/or signaling of the user equipment in the first source base station and the second source base station to the target base station; or sending, by the first source base station, data and/or signaling of the user equipment in the first source base station to the target base station, and sending, by the second source base station, data and/or signaling of the user equipment in the second source base station to the target base station, wherein the data and/or signaling of the user equipment include(s) at least one of followings: data of a service corresponding to the user equipment, which has been sent without receiving a reply ACK, data of a service corresponding to the user equipment with a NACK received, SDU data, serial number SN status transfer information and an end marker packet, wherein, the first source base station and the second source base station may send the end marker packet to the target base station after sending the data of the UE therein to the target base station.

Preferably, before the first source base station sends the end marker packet to the target base station, the first source base station may receive the end marker packet sent by an S-GW, wherein, the first source base station may send the handover request message to the target base station through a local gateway, wherein the second source base stations may be more than one.

In the embodiment, when there exist multiple source base stations of the UE, one source cell therein (namely, the first source cell) sends a request to the target base station to make a request for a handover of the UE from multiple source cells to a target cell, thereby realizing the handover of the UE from multiple source cells to one target cell.

Embodiment 6

The embodiment provides a handover processing method, and the method may be used for a handover without a loss of data under a multi-cell split scenario, for example, a handover of a UE from multiple source base stations to a target base station.

Figure 6:
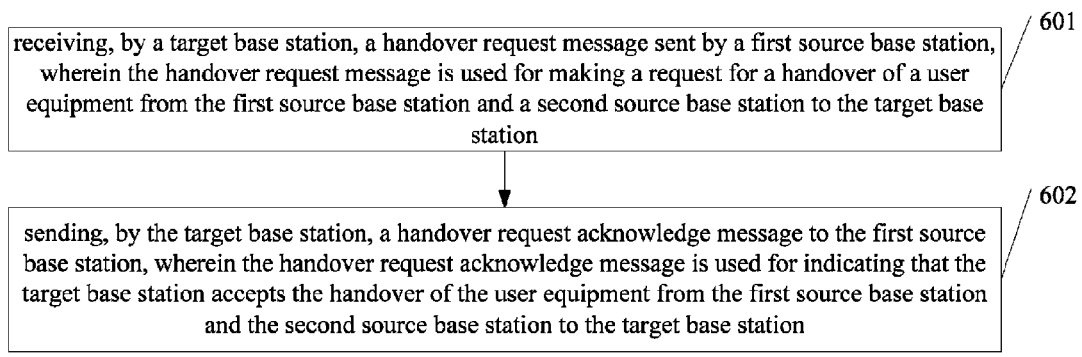
FIG. 6 is a flowchart of a handover processing method according to embodiment 6 of the present invention.

FIG. 6 is a flowchart of a handover processing method according to the embodiment 6 of the present invention. As shown in FIG. 6, the method includes:

step 601, receiving, by a target base station, a handover request message sent by a first source base station, wherein the handover request message is used for making a request for a handover of a user equipment from the first source base station and a second source base station to the target base station; and step 602, sending, by the target base station, a handover request acknowledge message to the first source base station, wherein the handover request acknowledge message is used for indicating that the target base station accepts the handover of the user equipment from the first source base station and the second source base station to the target base station.

Preferably, after the target base station sends the handover request acknowledge message to the first source base station, the target base station receives data and/or signaling of the user equipment sent by the first source base station and/or the second source base station.

The receiving, by the target base station, the data and/or signaling of the user equipment sent by the first source base station and/or the second source base station, may include:

receiving, by the target base station, the data and/or signaling of the user equipment sent by the first source base station, and/or receiving the data and/or signaling of the user equipment sent by the second source base station; or receiving, by the target base station, the data and/or signaling of the user equipment corresponding to the first source base station and/or the second source base station, sent by the first source base station.

Preferably, the data and/or signaling of the user equipment include(s) at least one of followings: data of a service corresponding to the user equipment, which has been sent without receiving a reply ACK, data of a service corresponding to the user equipment which a NACK received, SDU data, serial number SN status transfer information and an end marker packet.

Optionally, the target base station may receive the handover request message, which comes from the first source base station, forwarded by a local gateway.

wherein, after the target base station sends the handover request acknowledge message to the first source base station, the method may further include: receiving, by the target base station, a radio resource control RRC connection reconfiguration completion message sent by the user equipment, and establishing a connection with the user equipment.

In the embodiment, when there exist multiple source base stations of the UE, one source cell therein (namely, the first source cell) sends a request to the target base station to make a request for a handover of the UE from multiple source cells to a target cell, thereby realizing the handover of the UE from multiple source cells to one target cell.

Embodiment 7

In the embodiment, a UE is handed over from a source base station 1 (namely, the first source base station) providing a cell aggregation service and an auxiliary source base station 2 (namely, the second source base station) to a target base station, wherein there is a connecting interface between the target base station and a gateway.

Figure 7:
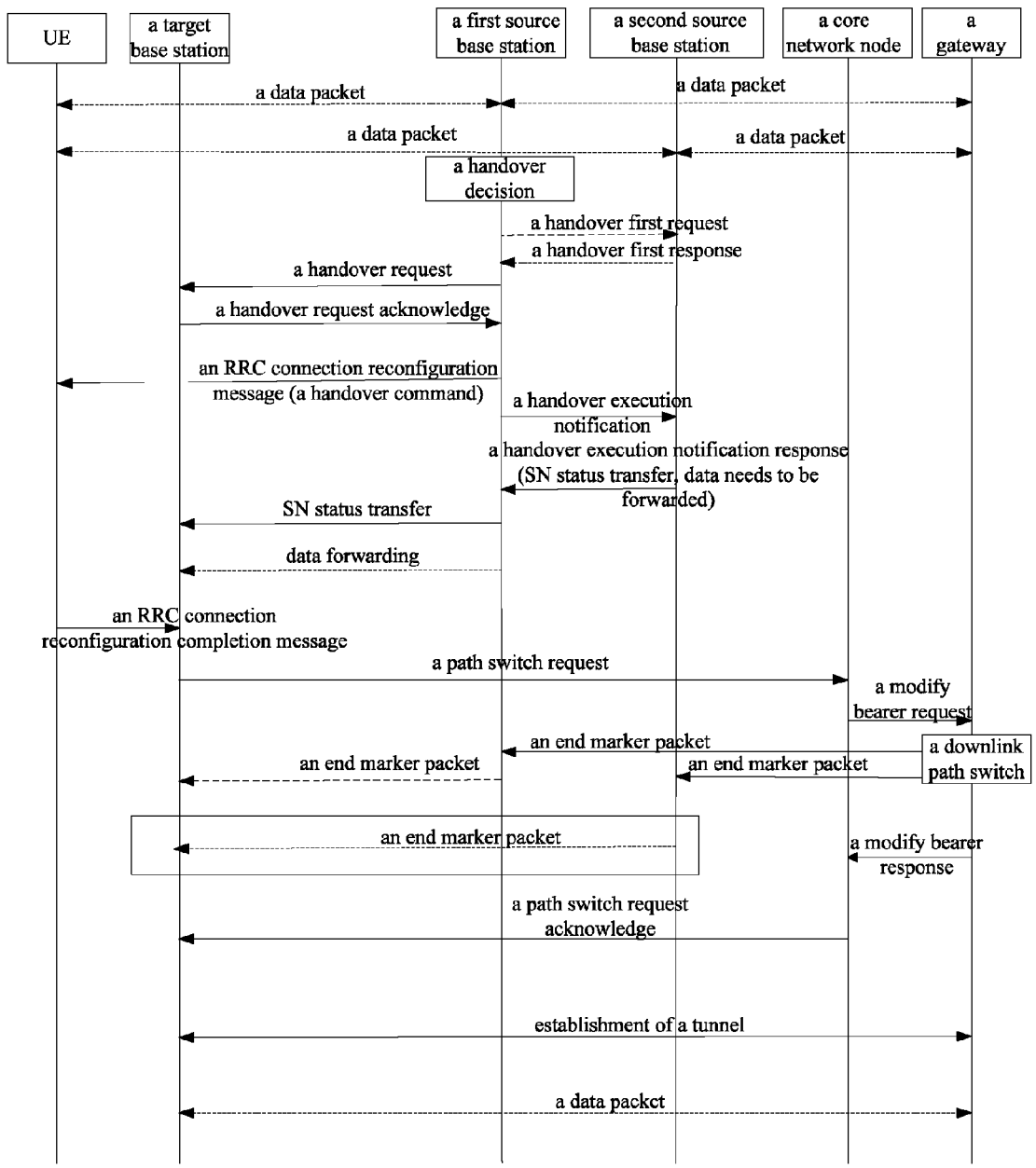
FIG. 7 is a schematic diagram of a handover processing method according to embodiment 7 of the present invention.

FIG. 7 is a schematic diagram of a handover processing method according to embodiment 7 of the present invention, as shown in FIG. 7, the method includes following steps.

Step 701, through a handover decision, the first source base station determines to hand over UE from the first source base station and the second source base station to the target base station, and sends a handover request message to the target base station, wherein parameters carried in the message may include: information and cell information of the first source base station, RRC context information of the UE, context information of an S1 interface of the UE and E-RAB information, and optional parameters carried in the message may further include at least one of followings: information and cell information of the second source base station, and recpective radio bear configuration and measurement configuration information of the UE in the first source base station and the second source base station.

Preferably, before sending the handover request message to the target base station, the first source base station may also implement following steps.

The first source base station sends a message (the message may be called as a handover initiation request message) to the second source base station, to notify that a handover is to be initiated, for example, notifying of a handover of the user equipment from the second source base station to the target base station, wherein the handover initiation request message carries cell information of the target base station.

The second source base station sends a message (the message may be called as a handover initiation response message) to the first source base station, for notifying the first source base station of the information which is used by the second source base station to serve the UE, for example, the message may carry following parameters: configuration information of the UE, and these parameters may be used for creating a handover request message.

In addition, if the first source base station contains service information of the second source base station, the handover request message may be created directly without sending the handover initiation request message to the second source base station.

Step 702, after the target base station successfully accepts the handover request message, namely, the target base station accepts the handover of a service of the UE to the target base station, the target base station sends a Handover Request ACK message to the first source base station, wherein the Handover Request ACK message includes: a UE identifier, E-RAB information, radio bear information, uplink and/or downlink GTP tunnel endpoint information of the target base station (including a transport layer address (Transport Layer Address) and a GTP TEID).

Step 703, after receiving the Handover Request ACK message, the first source base station sends a message (the message may be called as a handover execution notification message) to the second source base station, to notify the second source base station to start to execute a handover operation.

It should be noted that, as long as the first source base station receives the Handover Request ACK (HANDOVER REQUEST ACKNOWLEDGE), or as long as the first source base station starts to send a handover command to the UE, a forwarding of data begins. Therefore, after this step, a data transmission in step 705 and step 706 may be executed.

In addition, when the handover execution notification message is a command message, step 704 does not need to be implemented. At this time, the executing sequence of step 703 and step 707 is not limited. When the handover execution notification message is a request message, a confirmation of the second target base station is needed, namely, after step 703, step 704 is executed, and then step 707 is executed.

Step 704, after receiving the handover execution notification message, the second source base station sends a message (the message may be called as a handover execution notification response message) to the first source base station. The message includes data of a service corresponding to the second source base station, which is in need of being forwarded: a PDCP SDU of data which has been sent without receiving an ACK or with a NACK received (type 1), or data of an SDU (i.e., without a PDCP SN) (type 2); and SN STATUS TRANSFER (SN status transfer information) of a service corresponding to the second source base station. A receiving status of uplink data and/or a sending status of downlink data of a corresponding RAB is indicated in the SN status transfer information, for example, notifying of an SN number of a first packet of type 2, an SN number of a first lost UL data packet and a bitmap of a UL data packet of the target base station. (Step 704 is optional)

Step 705, the first source base station sends SN STATUS TRANSFER (SN status transfer information) corresponding to all services being handed over to the target base station, and may indicate a receiving status of uplink data and/or a sending status of downlink data of a corresponding RAB in the SN status transfer information for example, notifying of an SN number of a first packet of type 2, an SN number of a first lost UL data packet and a bitmap of a UL data packet of the target base station.

Step 706, in a downlink direction, the first source base station sends a PDCP SDU of data corresponding to all services being handed over, an ACK of which is received or a NACK of which is received (type 1) to the target base station, and forwards the data of an SDU (i.e., without PDCP SN) (type 2) to the target base station.

In an uplink direction, the UE, starting from a first PDCP SDU packet of each service, an acknowledgement of which is not received, resends an uplink PDCP SDU to the corresponding target base station.

Step 707, after receiving a handover request response message (HANDOVER REQUEST ACKNOWLEDGE), the first source base station sends a handover command message (for example, sending in the form of an RRC connection reconfiguration message) to the UE, and the message includes: information of a target cell (namely, information of the target base station and a cell), configuration information of a service, security information and the like.

Step 708, after receiving the handover command message, the UE respectively establishes, according to a configuration parameter of a service in the message, a new PDCP layer entity, RLC layer entity, MAC layer entity and physical layer entity for a bearer corresponding to a protocol stack of a target cell. After a radio bear is configured successfully, the UE forwards an unordered PDCP SDU in a reordering buffer region in a PDCP entity in a protocol stack corresponding to source main and auxiliary base stations to a newly established PDCP layer of the protocol stack of the target cell; after the forwarding is completed, the UE may release each layer entity corresponding to the protocol stack of the source base station therein. The UE completes downlink synchronization with a cell of the target base station. According to a preamble code of a random access and RACH resource information in the handover command message, the UE initiates a random access process to the target base station to complete uplink synchronization. And then, the UE replies an RRC connection reconfiguration completion message to the target base station.

Step 709, after receiving the RRC connection reconfiguration completion message replied by the UE, the target base station sends a Path Switch Request message to a core network node (an MME is taken as an example for illustration below).

Step 710, the MME sends a MODIFY BEARER REQUEST message to a gateway (a Serving Gateway is taken as an example for illustration below), and the message includes uplink and/or downlink GTP tunnel endpoint information, which includes a transport layer address (Transport Layer Address) and a GTP TEID of the target base station, and a corresponding identifier of an RAB.

Step 711, after receiving the MODIFY BEARER REQUEST message sent by the MME, the Serving Gateway switches an RAB, which needs a path switch, from the corresponding first source base station and/or second source base station respectively to the target base station. And then, the Serving Gateway sends an "end marker" packet (an end marker packet) to the first source base station and the second source base station respectively, and releases paths with the first source base station and the second source base station.

Step 712, after receiving the end marker packet, the second source base station forwards the received end marker packet to the first source base station. Then, the first source base station sends an end marker packet corresponding to all bearers being handed over to the target base station.

Step 713, after receiving an end marker packet, the target base station sequentially receives data sent by the Serving Gateway and data forwarded by the source base stations.

Step 714, the Serving Gateway sends MODIFY BEARER RESPONSE to the MME.

Step 715, the MME sends a PATH SWITCH REQUEST ACKNOWLEDGE message to the target base station.

Through the embodiment, a handover of the user equipment from multiple source cells to one target cell is realized.

Embodiment 8

Figure 8:
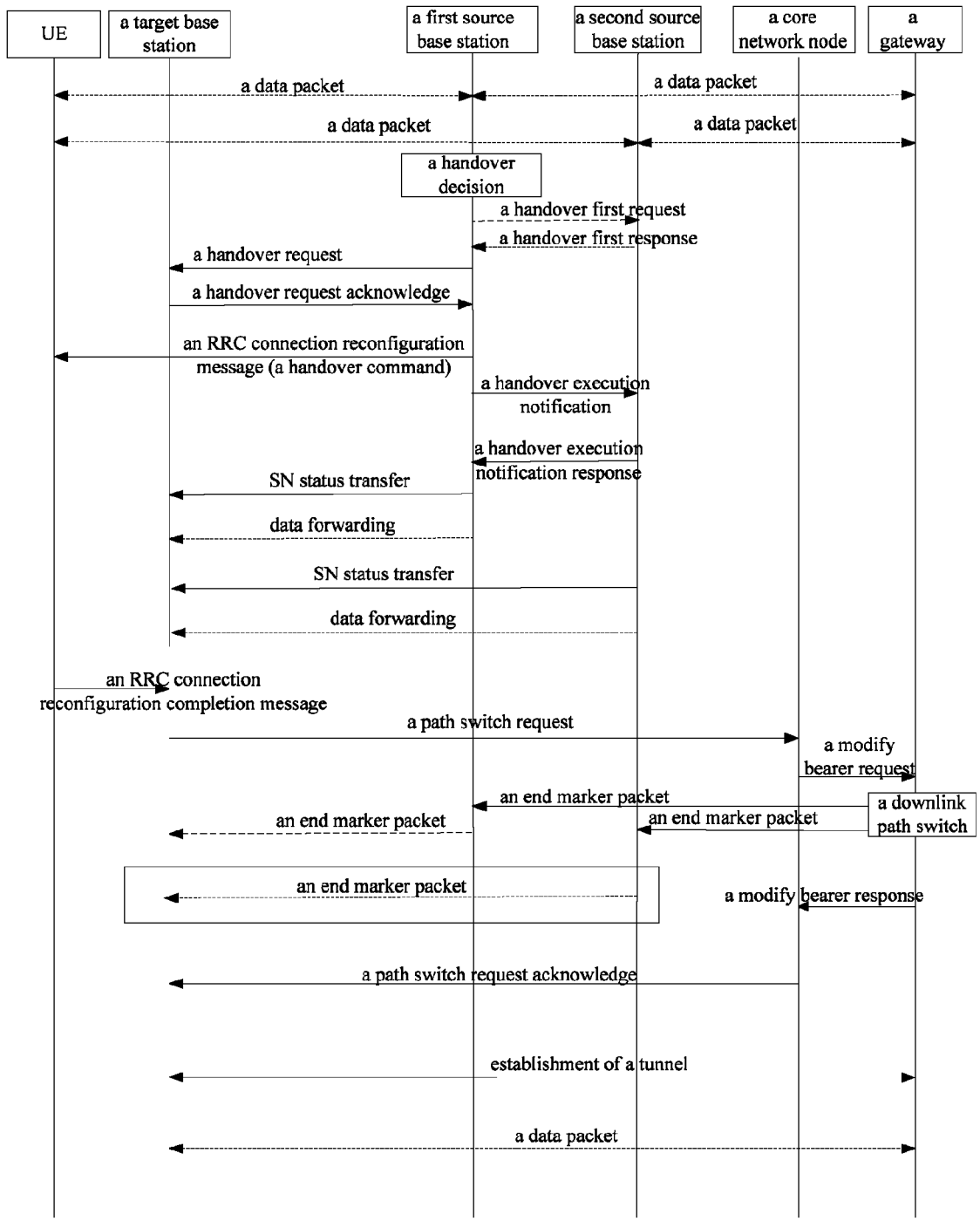
FIG. 8 is a schematic diagram of a handover processing method according to embodiment 8 of the present invention.

FIG. 8 is a schematic diagram of a handover processing method according to the embodiment 8 of the present invention. As shown in FIG. 8, the method includes following steps.

Step 801 to step 803, which are the same as step 701 to step 703.

Step 804, a second source base station sends a message (the message may be called as a handover execution notification response message) to the first source base station, to notify the first source base station that the user equipment may be handed over from the second source base station to a target base station.

It should be noted that, as long as the first source base station receives HANDOVER REQUEST ACKNOWLEDGE, or as long as the first source base station starts to send a handover command to the UE, a forwarding of data begins. Therefore, after step 803, step 805, step 806 and step 807 may be executed, wherein the executing sequence of step 805 to step 807 is not limited.

Step 805, the first source base station sends SN STATUS TRANSFER (SN status transfer information), which is carried by a service it corresponds, to the target base station, and indicates a receiving status of uplink data and/or a sending status of downlink data of a corresponding RAB in the SN status transfer information, for example, notifying of an SN number of a first packet of type 2, an SN number of a first lost UL data packet and a bitmap of a UL data packet of the target base station.

Step 806, in a downlink direction, the first source base station sends a PDCP SDU of data of a service it corresponds, an ACK of which is received or a NACK of which is received (type 1), to the target base station, and forwards data of an SDU (i.e., without a PDCP SN) (type 2) to the target base station.

In an uplink direction, the UE, starting from a first PDCP SDU packet of each service, an acknowledgement of which is not received, resends an uplink PDCP SDU to the corresponding target base station.

Step 807, the second source base station sends SN STATUS TRANSFER (SN status transfer information), which is carried by a service it corresponds, to the target base station, and indicates a receiving status of uplink data and/or a sending status of downlink data of a corresponding RAB in the SN status transfer information, for example, notifying of an SN number of a first packet of type 2, an SN number of a first lost UL data packet and a bitmap of a UL data packet of the target base station.

The second source base station may send the SN STATUS TRANSFER (SN status transfer information) carried by the service it corresponds to the target base station by the triggering of indication information of the first source base station.

Step 808, in a downlink direction, the second source base station sends a PDCP SDU of data carried by a service it corresponds, which has been sent without receiving an ACK or with a NACK received (type 1), to the target base station, and forwards data of an SDU (i.e., without a PDCP SN) (type 2) to the target base station.

In an uplink direction, the UE, starting from a first PDCP SDU packet of a service, an acknowledgement of which is not received, resends an uplink PDCP SDU to a corresponding target base station.

Step 809, after receiving the HANDOVER REQUEST ACKNOWLEDGE, the first source base station sends a handover command message (for example, sending in a form of an RRC connection reconfiguration message) to the UE. The message includes: information of a target cell (for example, information of the target base station and a cell), configuration information of a service, security information and the like.

Step 810, after receiving the handover command message, the UE respectively establishes, according to a configuration parameter of the service in the message, a PDCP layer entity, an RLC layer entity, an MAC layer entity and a physical layer entity corresponding to a protocol stack of a target cell. After a radio bear is configured successfully, the UE forwards an unordered PDCP SDU in a reordering buffer region in a PDCP entity in a protocol stack corresponding to the first source base station and the second source base station to a newly established PDCP layer of a cell protocol stack of the target base station. After the forwarding is completed, the UE may release each layer entity corresponding to the protocol stack of the source base station. The UE completes downlink synchronization with a cell of the target base station. According to a preamble code of a random access and RACH resource information in the handover command message, the UE initiates a random access process to the target base station to complete uplink synchronization. And then, the UE sends an RRC connection reconfiguration completion message to the target base station.

Step 811, after receiving the RRC connection reconfiguration completion message sent by the UE, the target base station sends a Path Switch Request (path switch request) message to a core network node (an MME is taken as an example for illustration below).

Step 812, the MME sends a MODIFY BEARER REQUEST (modify bearer request) message to the gateway (a Serving Gateway is taken as an example for illustration below), and the message includes uplink and/or downlink GTP tunnel endpoint information (including a transport layer address and a GTP TED) of the target base station and a corresponding identifier of an RAB.

Step 813, after receiving the MODIFY BEARER REQUEST message sent by the MME, the Serving Gateway switches an RAB, which needs a path switch, from the corresponding first source base station and/or second source base station respectively to the target base station. The Serving gateway respectively sends an "end marker" packet (an end marker packet) to the first source base station and the second source base station respectively, and then releases paths between it and the first source base station, the second source base station.

Step 814, after the first source base station and the second source base station receive the end marker packet sent by the Serving gateway, the second source base station forwards the received end marker packet to the first source base station. Then, the first source base station sends an end marker packets corresponding to all bearers being handed over to the target base station.

Step 815, after receiving an end marker packet, the target base station sequentially receives data sent by the Serving GW and data forwarded by the source base stations.

Step 816, the Serving Gateway sends a MODIFY BEARER RESPONSE (modify bearer response) message to the MME.

Step 817, the MME sends a PATH SWITCH REQUEST ACKNOWLEDGE (path switch request acknowledge) message to the target base station.

Through the embodiment, a handover of the user equipment from multiple source cells to one target cell is realized.

Embodiment 9

Figure 9:
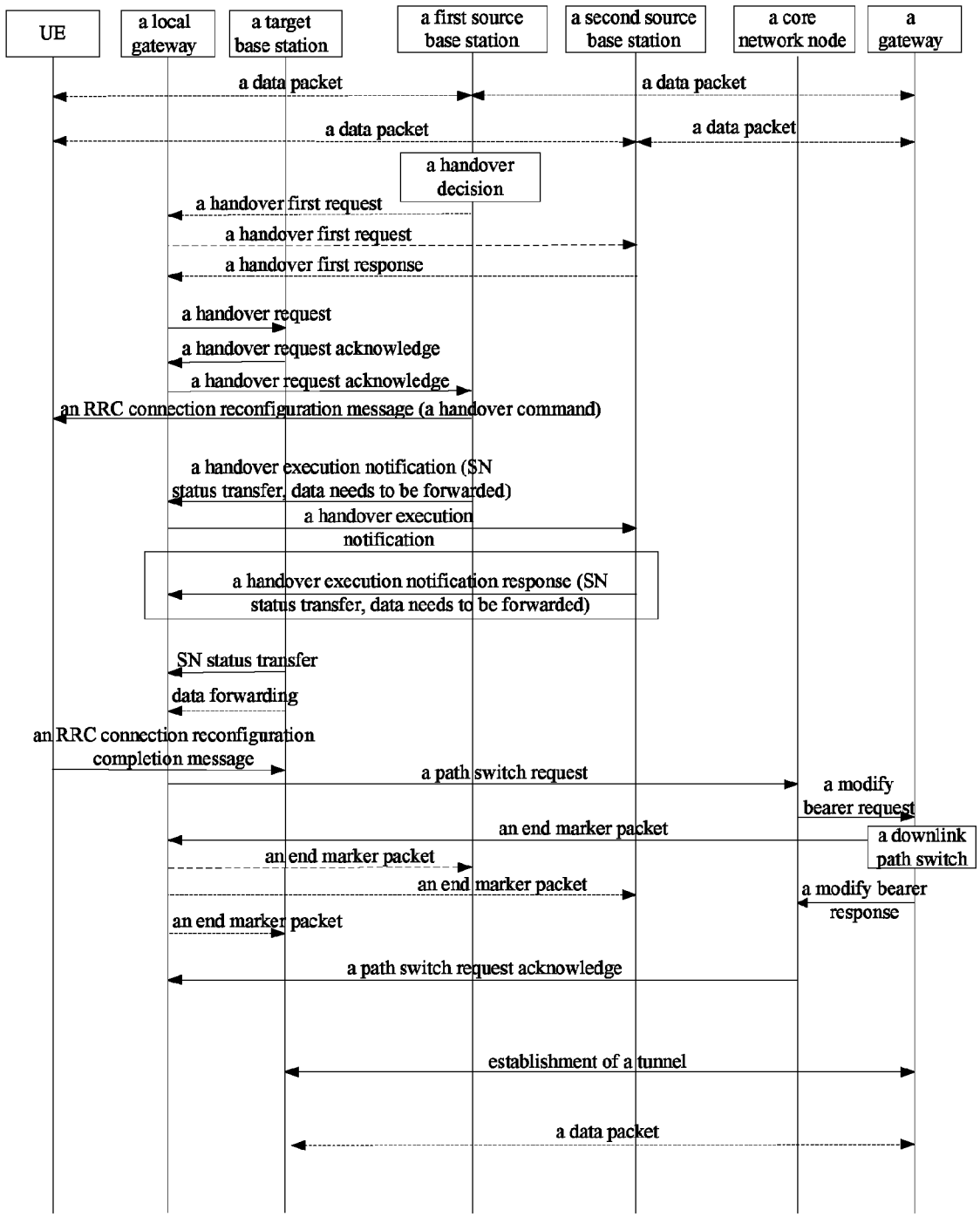
FIG. 9 is a schematic diagram of a handover processing method according to embodiment 9 of the present invention.

FIG. 9 is a schematic diagram of a handover processing method according to the embodiment 9 of the present invention. As shown in FIG. 9, the method shown in the embodiment includes following steps.

Step 901, a local gateway (a residential gateway) in a source network side sends a handover request message to a target base station. Parameters carried in the message include: information and cell information of a first source base station, RRC context information of UE, context information of an S1 interface of the UE and E-RAB information. Preferably, the message may also carry at least one of following parameters: information and cell information of a second source base station and radio bear configuration, and respecitve measurement configuration information of the UE in the first source base station and the second source base station.

Optionally, before the local gateway in the source network side sends the handover request message to the target base station, the above-mentioned method may further include followings.

Through a handover decision, a handover to the target base station is determined by the first source base station. Then the first source base station sends an handover first request message to the local gateway, to notify that a handover of user equipment from the second source base station to the target base station is to be initiated. The handover first message carries information of the target base station and a cell. The local gateway forwards the message to the second source base station.

The second source base station replies an handover first response message to the local gateway, wherein it may carry a parameter: configuration information of the UE, and the handover first response message may be used for generating a handover request message.

Step 902, after receiving the handover request message, if the target base station can accept the UE, the target base station sends a Handover Request ACK message to the local gateway in the source network side. The message includes: a UE identifier, E-RAB information, radio bear information, uplink and/or downlink GTP tunnel endpoint information including a transport layer address (Transport Layer Address) and a GTP TED of the target base station.

Step 903, after receiving the Handover Request ACK message, the local gateway in the source network side forwards the message to the first source base station.

Step 904, after receiving the Handover Request ACK message, the first source base station sends a handover command message (RRC connection reconfiguration message) to the UE, and sends a handover execution notification message to the local gateway. The handover command message includes at least one of followings: information of a target cell (namely, information of the target base station and cell information of the target base station), configuration information of a service and security information. The execution notification message includes data of a service corresponding to the first source base station, which is in need of being forwarded. The data include: a PDCP SDU of sent data which has been sent without receiving an ACK or with a NACK received (type 1), data of an SDU (i.e., without a PDCP SN) (type 2), and SN STATUS TRANSFER (SN status transfer information) of a service corresponding to the first source base station. A receiving status of uplink data and/or a sending status of downlink data of a corresponding RAB is indicated in the SN status transfer information, for example, notifying of an SN number of a first packet of type 2, an SN number of a first lost UL data packet and a bitmap of a UL data packet of the target base station. And then, the local gateway in the source network side forwards the handover execution notification message to the second source base station, to notify the second source base station to start to execute a handover operation.

Step 905, the second source base station replies a handover execution notification response message to the local gateway, the message includes: data of a service corresponding to the second source base station, which is in need of being forwarded. The data include: a PDCP SDU of data which has been sent without receiving an ACK or with a NACK received (type 1), data of an SDU (i.e., without a PDCP SN) (type 2), and SN STATUS TRANSFER (SN status transfer information) of a service corresponding to the second source base station, wherein the SN status transfer information may indicate a receiving status of uplink data and/or a sending status of downlink data of a corresponding RAB, for example, notifying of an SN number of a first packet of type 2, an SN number of a first lost UL data packet and a bitmap of a UL data packet of the target base station.

Step 906, as long as the first source base station receives HANDOVER REQUEST ACKNOWLEDGE, or as long as the source base station starts to send handover command to the UE, a forwarding of data begins.

The local gateway in the source network side sends SN STATUS TRANSFER (SN status transfer information) corresponding to all services being handed over to the target base station, and indicates a receiving status of uplink data and/or a sending status of downlink data of a corresponding RAB in the SN status transfer information, for example, notifying of an SN number of a first packet of type 2, an SN number of a first lost UL data packet and a bitmap of a UL data packet of the target base station.

The local gateway in the source network side sends a PDCP SDU of data corresponding to all services being handed over, which has been sent without receiving an ACK or with a NACK received, to the target base station (type 1), and forwards data of an SDU (i.e., without a PDCP SN) (type 2) to the target base station.

In an uplink direction, the UE, starting from a first PDCP SDU packet without receiving an acknowledgement (ACK) of each service, resends an uplink PDCP SDU without receiving an acknowledgement to the corresponding target base station.

Step 907, after receiving the handover command message, the UE respectively establishes, according to a configuration parameter of a service in the handover command message, a PDCP layer entity, an RLC layer entity, an MAC layer entity and a physical layer entity corresponding to the protocol stack of a target cell. After a radio bear is configured successfully, the UE forwards an unordered PDCP SDU in a reordering buffer region in a PDCP entity in a protocol stack corresponding to the first source base station and the second source base station to a newly established PDCP layer of the cell protocol stack of the target base station. After the forwarding is completed, the UE may release each layer entity corresponding to a protocol stack of the source base station in the UE. According to a 1 preamble code of a random access and a random access channel (Random Access Channel, RACH for short) resource information in the handover command message, the UE initiates a random access process to the target base station to complete an uplink synchronization, and sends an RRC connection reconfiguration completion message to the target base station.

Step 908, after the target base station receives the RRC connection reconfiguration completion message, the local gateway may send a Path Switch Request message to the MME.

Step 909, an MME sends a MODIFY BEARER REQUEST message to the Serving Gateway, and the message includes uplink and/or downlink GTP tunnel endpoint information, which includes a transport layer address (Transport Layer Address) and a GTP TEID of the target base station, and a corresponding identifier of an RAB.

Step 910, after receiving the MODIFY BEARER REQUEST message sent by the MME, the Serving Gateway switches an RAB, which needs a path switch, from the corresponding first source base station and the second source base station respectively to the corresponding target base station. The Serving Gateway respectively sends an "end marker" packet (an end marker packet) to the local gateway in the source network side and releases paths betweem it and the first source base station, the second source base station.

Step 911 (optional), the local gateway in the source network side forwards an "end marker" packet to the first source base station and a second source auxiliary base station.

Step 912, after receiving an end marker packet, the local gateway in the source network side sends an end marker packet corresponding to all bearers being handed over to the target base station.

Step 913, after receiving the end marker packet, the target base station sequentially receives data sent by the Serving Gateway and data forwarded by the source base stations (the first source base station and/or the second source base station).

Step 914, the Serving Gateway sends MODIFY BEARER RESPONSE to the MME.

Step 915, the MME sends a PATH SWITCH REQUEST ACKNOWLEDGE message to the local gateway.

Through the embodiment, a handover of a user equipment from multiple source cells to one target cell is realized.

Embodiment 10

The embodiment of the present invention further provides a base station, and the base station may be taken as a first target base station to achieve embodiments 1 to 4 of the above-mentioned method.

Figure 10:
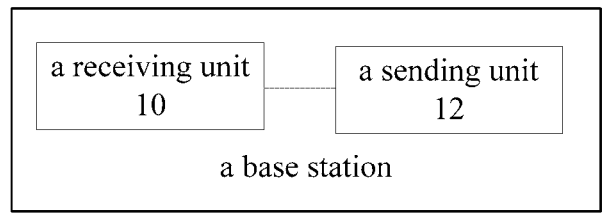
FIG. 10 is a block diagram of a structure of a base station according to embodiment 10 of the present invention.

FIG. 10 is a block diagram of a structure of a base station according to the embodiment 10 of the present invention. As shown in FIG. 10, the base station includes a receiving unit 10 and a sending unit 12, wherein the receiving unit is configured to receive a handover request message sent by a source base station or a core network node;

the sending unit is configured to send, according to the handover request message, a first message to a second target base station, to notify the second target base station that a handover of part or all of a service of a user equipment to the second target base station is to be performed; and the sending unit is further configured to send a handover request acknowledge message to the source base station or the core network node, wherein the handover request acknowledge message is used for notifying the source base station or the core network node to hand over the user equipment to at least one target cell of the first target base station and/or at least one target cell of the second target base station.

Preferably, the sending unit is configured to realize the sending, according to the handover request message, the first message to the second target base station in a following manner:

determining, according to a measurement report of the user equipment and/or radio access bear RAB information of the user equipment in the handover request message, that the handover of the part or all of the service of the user equipment to a target cell of the second target base station; or determining, according to information of a target cell of the second target base station in the handover request message, that the handover of the part or all of the service of the user equipment to the second target base station; and sending the first message to the second target base station.

The handover request message may include at least one of followings: information of at least one target cell of the second target base station, measurement report information of the user equipment, context information of the user equipment and information of a service of the user equipment, wherein the information of the service includes RAB information of the service.

Optionally, the first message includes: information of at least one service of the user equipment, wherein the information of the service includes RAB information of the service and/or configuration information of a radio bear RB.

Optionally, the information of the service further includes at least one of followings:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, subframe information, time domain information, code domain information and space domain information; the split indication information includes data split information based on an RB or data split information based on a packet.

Preferably, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

Preferably, the configuration information of the RB includes:

configuration information of a packet data convergence protocol PDCP layer, a radio link control RLC layer, a medium access control MAC layer and a physical layer; or configuration information of an RLC layer, an MAC layer and a physical layer.

In one preferable implementation manner of the embodiment of the present invention, the receiving unit is further configured to receive a second message sent by the second target base station after the first target base station sends the first message to the second target base station, wherein the second message is used for indicating information regarding whether the handover of the part or all of the service of the user equipment to the second target base station is accepted by the second base station.

Preferably, the second message includes at least one of followings:

an identifier of the user equipment, first information and indication information, wherein the indication information includes at least one of followings: indication information of refusing the handover of the part or all of the service of the user equipment to the second target base station, indication information of accepting the handover of the part or all of the service of the user equipment to the second target base station, and indication information of modifying the first message;

the first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

Preferably, the second message further includes at least one of followings:

fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station, wherein the second type of GTP tunnel endpoint information is used for establishing a transmission bearer for data forwarding between the second target base station and the source base station; and third type of GTP tunnel endpoint information corresponding to an identifier of an RAB accepted by the second target base station, wherein the third type of GTP tunnel endpoint information is used for requesting a core network node to convert a GTP tunnel endpoint.

The handover request acknowledge message may further include at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

Optionally, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

Optionally, the configuration information of the RB includes at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

Preferably, the configuration information of the radio resource corresponding to the RB includes at least one of followings:

a physical cell identifier, a logic cell identifier, a virtual cell identifier, frequency information, carrier information, radio resource block information, subcarrier information, sub-frame information, time slot information, time domain information, code domain information and space domain information.

In another preferable implementation manner of the embodiment of the present invention, the sending unit is configured to realize the sending the handover request acknowledge message to the source base station or the core network node in a following manner:

sending the handover request acknowledge message to the source base station to trigger the source base station to send a handover command message to the user equipment, so as to enable the user equipment to establish connections with the first target base station and the second target base station; or sending the handover request acknowledge message to the core network node to trigger the core network node to send the handover request acknowledge message to the source base station, thereby triggering the source base station to send a handover command message to the user equipment, so as to enable the user equipment to establish connections with the first target base station and the second target base station.

Preferably, the receiving unit is further configured to receive a radio resource control RRC connection reconfiguration completion message sent by the user equipment, and control the first target base station to establish a connection with the user equipment.

The sending unit is further configured to send, after the first target base station receives the RRC connection reconfiguration completion message sent by the user equipment, a handover indication message of the user equipment to the second target base station, for indicating that the second target base station starts to use a resource configured to the user equipment.

Preferably, the receiving unit is further configured to receive, after the first target base station sends the handover indication message of the user equipment to the second target base station, a handover indication reply message of the user equipment sent by the second target base station, wherein the handover indication reply message of the user equipment comprises: third type of GTP tunnel endpoint information corresponding to an identifier of an RAB accepted by the second target base station, wherein the third type of GTP tunnel endpoint information is used for requesting the core network node to switch a GTP tunnel endpoint.

Optionally, the sending unit is further configured to send, after the first target base station receives the RRC connection reconfiguration completion message sent by the user equipment, a path switch request message to the core network node to request to hand over a service corresponding to the user equipment in the core network node to the first target base station and/or the second target base station.

The sending unit is configured to realize the sending the handover request acknowledge message to the source base station or the core network node in a following manner:

sending the handover request acknowledge message to the source base station or the core network node to trigger the source base station to send data and/or signaling of the user equipment in the source base station to the first target base station and/or the second target base station.

Optionally, the receiving unit is further configured to receive the data and/or signaling of the user equipment sent by the source base station; and the sending unit is further configured to send corresponding part of the second target base station in the data and/or signaling of the user equipment to the second target base station.

Optionally, t the triggering the source base station to send the data and/or signaling of the user equipment in the source base station to the first target base station and/or the second target base station, comprises:

triggering the source base station to send corresponding part of the first target base station in the data and/or signaling of the user equipment to the first target base station, and to send corresponding part of the second target base station in the data and/or signaling of the user equipment to the second target base station.

Preferably, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

Optionally, the end marker packet is used for triggering the first target base station and/or the second target base station to receive data sent by a serving gateway in sequence.

In a preferable implementation manner of the embodiment of the present invention, the receiving unit is configured to realize the receiving the handover request message sent by the source base station in a following manner: receiving the handover request message, which comes from the source base station, forwarded by the core network node.

Embodiment 11

The embodiment of the present invention further provides a base station, and the base station may be taken as a first source base station to achieve embodiments 5 to 9 of the above-mentioned method.

Figure 11:
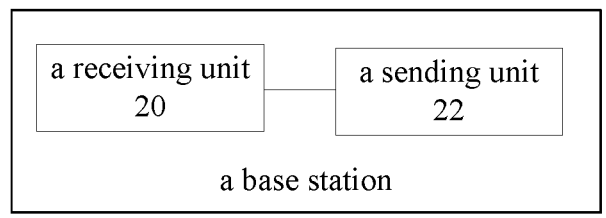
FIG. 11 is a block diagram of a structure of a base station according to embodiment 11 of the present invention.

FIG. 11 is a block diagram of a structure of a base station according to the embodiment 11 of the present invention. As shown in FIG. 11, the base station includes a receiving unit 20 and a sending unit 22, wherein the sending unit is configured to send a handover request message to a target base station, to make a request for a handover of a user equipment from the first source base station and a second source base station to the target base station;

the receiving unit is configured to receive a handover request acknowledge message sent by the target base station, wherein the sending unit is further configured to send a handover command message to the user equipment, to notify the user equipment to hand over from the first source base station and the second source base station to the target base station.

Preferably, the sending unit is further configured to send, before the first source base station sends the handover request message to the target base station, a handover initiation request message to the second source base station, to make a request for a handover of the user equipment from the second source base station to the target base station; and the receiving unit is further configured to receive a handover initiation response message from the second source base station, and generating the handover request message according to the handover initiation response message.

Optionally, the sending unit is further configured to send, before the first source base station sends the handover request message to the target base station, a handover initiation request message to the second source base station through a local gateway; and the receiving unit is further configured to receive the handover request message from the local gateway, wherein the handover request message is generated by the local gateway according to a handover initiation response message from the second source base station.

In a preferable implementation manner of the embodiment of the present invention, the sending unit is further configured to send, after the first source base station receives the handover request acknowledge message sent by the target base station, a handover execution notification message to the second source base station, for notifying the second source base station to start executing a handover operation.

Optionally, the receiving unit is further configured to receive a handover execution notification response message sent by the second source base station, wherein the handover execution notification response message comprises: SN status transfer information corresponding to at least one RAB served by the second source base station, and/or a data packet, in need of forwarding, corresponding to at least one RAB served by the second source base station.

Preferably, the receiving unit is further configured to receive the handover request acknowledge message sent by the target base station for triggering the first source base station and/or the second source base station to send data and/or signaling of the user equipment to the target base station.

Optionally, the triggering the first source base station and/or the second source base station to send the data and/or signaling of the user equipment to the target base station comprises:

triggering the first source base station to send data and/or signaling of the user equipment in the first target base station and the second target base station to the target base station; or triggering the first source base station to send the data and/or signaling of the user equipment in the first source base station to the target base station, and triggering the second source base station to send data and/or signaling of the user equipment in the second source base station to the target base station.

Preferably, the data and/or signaling of the user equipment comprise(s) at least one of followings: data of a service corresponding to the user equipment which has been sent without receiving a reply ACK, data of the service corresponding to the user equipment with a NACK received, SDU data, serial number SN status transfer information and an end marker packet.

The receiving unit is further configured to receive, before the first source base station sends the end marker packet to the target base station, the end marker packet sent by an S-GW.

Preferably, the sending unit is further configured to send the handover request message to the target base station through a local gateway.

Embodiment 12

The embodiment of the present invention further provides a base station, and the base station may be taken as a source base station to achieve embodiments 1 to 4 of the above-mentioned method.

Figure 12:
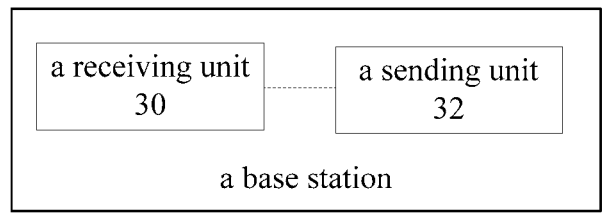
FIG. 12 is a block diagram of a structure of a base station according to embodiment 12 of the present invention.

FIG. 12 is a block diagram of a structure of a base station according to the embodiment 12 of the present invention. As shown in FIG. 12, the base station includes a receiving unit 30 and a sending unit 32, wherein a sending unit is configured to send a handover request message to a first target base station;

a receiving unit is configured to receive a handover request ackowledge message sent by the first target base station, wherein the handover request ackowledge message is used for notifying the source base station to hand over the user equipment to at least one target cell of the first target base station and/or at least one target cell of the second target base station; and the sending unit is further configured to send a handover command message to the user equipment, to indicate the user equipment to hand over to the first target base station and the second target base station.

Preferably, the handover request message includes at least one of followings: information of at least one target cell of the second target base station, measurement report information of the user equipment, context information of the user equipment and information of a service of the user equipment, wherein the information of the service includes RAB information of the service.

The information of the service may further include at least one of followings:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information, code domain information and space domain information; the split indication information includes data split information based on an RB or data split information based on a packet.

Preferably, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

Optionally, the handover request acknowledge message comprises at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; the second type of GTP tunnel endpoint information is used for establishing a transmission bearer for data forwarding between the second target base station and the source base station.

Preferably, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

Optionally, the configuration information of the RB includes at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

Preferably, the configuration information of the radio resource corresponding to the RB includes at least one of followings:

a physical cell identifier, a logic cell identifier, a virtual cell identifier, frequency information, carrier information, radio resource block information, subcarrier information, sub-frame information, time slot information, time domain information, code domain information and space domain information.

In a preferable implementation manner of the embodiment of the present invention, the receiving unit is configured to realize the receiving the handover request acknowledge message sent by the first target base station in a following manner: receiving the handover request acknowledge message from the first target base station, which is forwarded by a core network element.

Preferably, the sending unit is configured to send, after the source base station receives the handover request acknowledge message sent by the first target base station, data and/or signaling of the user equipment to the first target base station and/or the second target base station.

Optionally, the sending unit is configured to send, after the source base station sends the handover command message to the user equipment, data and/or signaling of the user equipment to the first target base station and/or the second target base station.

In another preferable implementation manner of the embodiment of the present invention, the sending unit is configured to realize the sending the data and/or signaling of the user equipment to the first target base station and/or the second target base station in a following manner:

sending the data and/or signaling of the user equipment to the first target base station, for enabling the first target base station to send corresponding part of the second target base station in the data and/or signaling of the user equipment to the second target base station; or sending corresponding part of the first target base station in the data and/or signaling of the user equipment to the first target base station, and sending corresponding part of the second target base station in the data and/or signaling of the user equipment to the second target base station.

Preferably, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

Optionally, the end marker packet is used for triggering the first target base station and/or the second target base station to receive data sent by a serving gateway in sequence.

Preferably, the sending unit is configured to realize the sending the handover request message to the first target base station in a following manner: sending the handover request message to the first target base station through a core network node.

Embodiment 13

The embodiment of the present invention further provides a base station, and the base station may be taken as a target base station to achieve embodiments 5 to 9 of the above-mentioned method.

Figure 13:
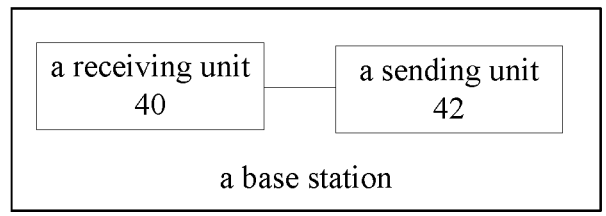
FIG. 13 is a block diagram of a structure of a base station according to embodiment 13 of the present invention.

FIG. 13 is a block diagram of a structure of a base station according to the embodiment 13 of the present invention. As shown in FIG. 13, the base station includes a receiving unit 40 and a sending unit 42, wherein the receiving unit is configured to receive a handover request message sent by a first source base station, wherein the handover request message is used for making a request for a handover of a user equipment from the first source base station and a second source base station to the target base station; and the sending unit is configured to send a handover request acknowledge message to the first source base station, wherein the handover request acknowledge message is used for indicating that the handover of the user equipment from the first source base station and the second source base station to the target base station is accepted.

Preferably, the sending unit is further configured to receive, after the target base station sends the handover request acknowledge message to the first source base station, data and/or signaling of the user equipment sent by the first source base station and/or the second source base station.

Optionally, the receiving unit is configured to realize that the target base station receives the data and/or signaling of the user equipment sent by the first source base station and/or the second source base station in a following manner:

receiving the data and/or signaling of the user equipment sent by the first source base station, and/or receiving the data and/or signaling of the user equipment sent by the second source base station; or receiving the data and/or signaling of the user equipment corresponding to the first source base station and/or the second source base station, sent by the first source base station.

Preferably, the data and/or signaling of the user equipment comprises at least one of followings: data of a service corresponding to the user equipment, which has been sent without receiving a reply ACK, data of a service corresponding to the user equipment with a NACK received, SDU data, serial number SN status transfer information and an end marker packet.

Optionally, the receiving unit is configured to realize the receiving the handover request message sent by the first source base station in a following manner: receiving the handover request message, which comes from the first source base station, forwarded by a local gateway.

Preferably, the receiving unit is further configured to receive, after the target base station sends the handover request acknowledge message to the first source base station, a radio resource control RRC connection reconfiguration completion message sent by the user equipment, and control the target base station to establish connection with the user equipment.

Embodiment 14

The embodiment of the present invention further provides a base station, and the base station may be taken as a first target base station to achieve embodiments 1 to 4 of the above-mentioned method.

Figure 14:
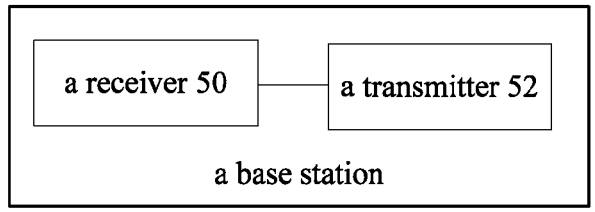
FIG. 14 is a block diagram of a structure of a base station according to embodiment 14 of the present invention.

FIG. 14 is a block diagram of a structure of a base station according to the embodiment 14 of the present invention. As shown in FIG. 14, the base station includes a receiver 50 and a transmitter 52, wherein the receiver is configured to receive a handover request message sent by a source base station or a core network node;

the transmitter is configured to send, according to the handover request message, a first message to a second target base station to notify the second target base station that a handover of part or all of a service of a user equipment to the second target base station is to be performed; and the transmitter is further configured to send a handover request acknowledge message to the source base station or the core network node, wherein the handover request acknowledge message is used for notifying the source base station or the core network node to hand over the user equipment to at least one target cell of the first target base station and/or at least one target cell of the second target base station.

Figure 15:
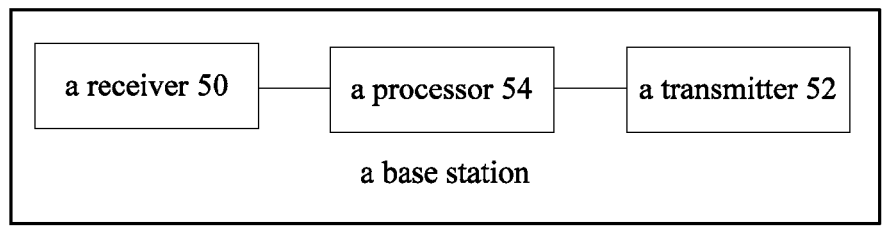
FIG. 15 is a block diagram of a specific structure of a base station according to embodiment 14 of the present invention.

FIG. 15 is a block diagram of a specific structure of a base station according to the embodiment 14 of the present invention. As shown in FIG. 15, the first target base station may further include: a processor 54, wherein the processor is configured to determine, according to a measurement report of the user equipment and/or radio access bear RAB information of the user equipment in the handover request message, that the handover of the part or all of the service of the user equipment to a target cell of the second target base station; or determine, according to information of a target cell of the second target base station in the handover request message, that the handover of the part or all of a service of the user equipment to the second target base station; and the transmitter is further configured to send the first message to the second target base station.

Preferably, the handover request message includes at least one of followings: information of at least one target cell of the second target base station, measurement report information of the user equipment, context information of the user equipment and information of a service of the user equipment, wherein the information of the service includes RAB information of the service.

Optionally, the first message includes: information of at least one service of the user equipment, wherein the information of the service includes RAB information of the service and/or configuration information of a radio bear RB.

The information of the service further comprises at least one of followings:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, subframe information, time domain information, code domain information and space domain information; the split indication information includes data split information based on an RB or data split information based on a packet.

Preferably, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

Optionally, the configuration information of the RB comprises:

configuration information of a packet data convergence protocol PDCP layer, a radio link control RLC layer, a medium access control MAC layer and a physical layer; or configuration information of an RLC layer, an MAC layer and a physical layer Preferably, the receiver is further configured to receive a second message sent by the second target base station after the first target base station sends the first message to the second target base station, wherein the second message is used for indicating information regarding whether the handover of the part or all of the service of the user equipment to the second target base station is accepted by the second target base station.

Optionally, the second message includes at least one of followings:

an identifier of the user equipment, first information and indication information, wherein the indication information includes at least one of followings: indication information of refusing the handover of the part or all of the service of the user equipment to the second target base station, indication information of accepting the handover of the part or all of the service of the user equipment to the second target base station, and indication information of modifying the first message;

the first information includes at least one of followings: an identifier of an RB accepted by the second target base station, configuration information of an RB accepted by the second target base station, an identifier of an RAB corresponding to an RB accepted by the second target base station, an identifier of an RB whose resource configuration is rejected by the second target base station, and an identifier of an RAB corresponding to an RB whose resource configuration is rejected by the second target base station.

Optionally, the second message further includes at least one of followings:

fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station;

second type of GTP tunnel endpoint information corresponding to an identifier of an RAB accepted by the second target base station, wherein the second type of GTP tunnel endpoint information is used for establishing a transmission bearer for data forwarding between the second target base station and the source base station; and third type of GTP tunnel endpoint information corresponding to an identifier of an RAB accepted by the second target base station, wherein the third type of GTP tunnel endpoint information is used for requesting a core network node to convert a GTP tunnel endpoint.

Preferably, the handover request acknowledge message includes at least one of followings:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation of at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

Optionally, the first transparent container configuration includes at least one of followings:

configuration information of at least one RB, and information of a cell of the first target base station and/or the second target base station, wherein the RB is an RB corresponding to at least one RAB accepted by the first target base station and/or the second target base station.

Optionally, the configuration information of the RB includes at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

Preferably, the configuration information of the radio resource corresponding to the RB includes at least one of followings:

a physical cell identifier, a logic cell identifier, a virtual cell identifier, frequency information, carrier information, radio resource block information, subcarrier information, sub-frame information, time slot information, time domain information, code domain information and space domain information.

Optionally, the transmitter is configured to realize the sending the handover request acknowledge message to the source base station or the core network node in a following manner:

sending the handover request acknowledge message to the source base station to trigger the source base station to send a handover command message to the user equipment, so as to enable the user equipment to establish connection with the first target base station and the second target base station; or sending the handover request acknowledge message to the core network node to trigger the core network node to send the handover request acknowledge message to the source base station, thereby triggering the source base station to send the handover command message to the user equipment, so as to enable the user equipment to establish connections with the first target base station and the second target base station.

Preferably, the receiver is further configured to receive a radio resource control RRC connection reconfiguration completion message sent by the user equipment;

the first target base station further comprises: a processor, wherein the processor is configured to establish a connection between the first target base station and the user equipment after the first target base station receives the radio resource control RRC connection reconfiguration completion message sent by the user equipment.

Preferably, the transmitter is further configured to send, after the first target base station receives the RRC connection reconfiguration completion message sent by the user equipment, a handover indication message of the user equipment to the second target base station, for indicating that the second target base station to starts use a resource configured to the user equipment.

Optionally, the receiver is further configured to receive, after the first target base station sends the handover indication message of the user equipment to the second target base station, a handover indication reply message of the user equipment sent by the second target base station, wherein the handover indication reply message of the user equipment comprises: third type of GTP tunnel endpoint information corresponding to an identifier of an RAB accepted by the second target base station, wherein the third type of GTP tunnel endpoint information is used for requesting the core network node to switch a GTP tunnel endpoint.

Optionally, the transmitter is further configured to send, after the first target base station receives the RRC connection reconfiguration completion message sent by the user equipment, a path switch request message to the core network node to request to hand over a service corresponding to the user equipment in the core network node to the first target base station and/or the second target base station.

Optionally, the transmitter is configured to realize the sending the handover request acknowledge message to the source base station or the core network node in a following manner:

sending the handover request acknowledge message to the source base station or the core network node to trigger the source base station to send data and/or signaling of the user equipment in the source base station to the first target base station and/or the second target base station.

Preferably, the receiver is further configured to receive the data and/or signaling of the user equipment sent by the source base station; and the transmitter is further configured to send corresponding part of the second target base station in the data and/or signaling of the user equipment to the second target base station.

Preferably, the triggering the source base station to send the data and/or signaling of the user equipment in the source base station to the first target base station and/or the second target base station, comprises: triggering the source base station to send corresponding part of the first target base station in the data and/or signaling of the user equipment to the first target base station, and to send corresponding part of the second target base station in the data and/or signaling of the user equipment to the second target base station.

Preferably, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN state transfer information and an end marker packet.

Optionally, the end marker packet is used for triggering the first target base station and/or the second target base station to receive data sent by a serving gateway in sequence.

Preferably, the receiver is configured to realize the receiving the handover request message sent by the source base station in a following manner: receiving the handover request message, which comes from the source base station, forwarded by the core network node.

Embodiment 15

The embodiment of the present invention further provides a base station, and the base station may be taken as a first source base station to achieve embodiments 5 to 9 of the above-mentioned method.

Figure 16:
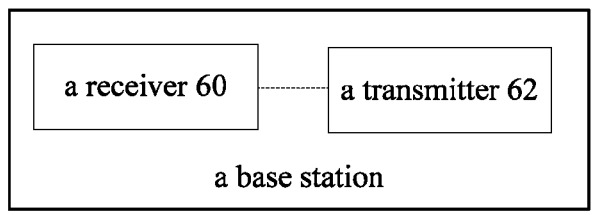
FIG. 16 is a block diagram of a structure of a base station according to embodiment 15 of the present invention.

FIG. 16 is a block diagram of a structure of a base station according to the embodiment 15 of the present invention. As shown in FIG. 16, the base station includes a receiver 60 and a transmitter 62, wherein the transmitter is configured to send a handover request message to a target base station, to make a request for a handover of a user equipment from the first source base station and a second source base station to the target base station;

the receiver is configured to receive a handover request acknowledge message sent by the target base station; and the transmitter is further configured to send a handover command message to the user equipment, to notify the user equipment to hand over from the first source base station and the second source base station to the target base station.

Preferably, the transmitter is further configured to send, before the first source base station sends the handover request message to the target base station, a handover initiation request message to the second source base station, to make a request for a handover of the user equipment from the second source base station to the target base station; and the receiver is further configured to receive a handover initiation response message from the second source base station, and generating the handover request message according to the handover initiation response message.

Optionally, the transmitter is further configured to send, before the first source base station sends the handover request message to the target base station, a handover initiation request message to the second source base station through a local gateway; and the receiver is further configured to receive the handover request message from the local gateway, wherein the handover request message is generated by the local gateway according to a handover initiation response message from the second source base station.

In a preferable implementation manner of the embodiment of the present invention, the transmitter is further configured to send, after the first source base station receives the handover request acknowledge message sent by the target base station, a handover execution notification message to the second source base station, for notifying the second source base station to start executing a handover operation.

In another preferable implementation manner of the embodiment of the present invention, the receiver is further configured to receive a handover execution notification response message sent by the second source base station, wherein the handover execution notification response message comprises: SN status transfer information corresponding to at least one RAB served by the second source base station, and/or a data packet, in need of forwarding, corresponding to at least one RAB served by the second source base station.

Preferably, the receiver is further configured to receive the handover request acknowledge message sent by the target base station for triggering the first source base station and/or the second source base station to send data and/or signaling of the user equipment to the target base station.

Preferably, the triggering the first source base station and/or the second source base station to send the data and/or signaling of the user equipment to the target base station comprises:

triggering the first source base station to send data and/or signaling of the user equipment in the first target base station and the second target base station to the target base station; or triggering the first source base station to send the data and/or signaling of the user equipment in the first source base station to the target base station, and triggering the second source base station to send the data and/or signaling of the user equipment in the second source base station to the target base station.

Optionally, the data and/or signaling of the user equipment comprises at least one of followings: data of a service corresponding to the user equipment which has been sent without receiving a reply ACK, data of the service corresponding to the user equipment with a NACK received, SDU data, serial number SN status transfer information and an end marker packet.

Preferably, the receiver is further configured to receive, before the first source base station sends the end marker packet to the target base station, the end marker packet sent by an S-GW.

Optionally, the transmitter is further configured to send the handover request message to the target base station through a local gateway.

Embodiment 16

The embodiment of the present invention further provides a base station, and the base station may be taken as a source base station to achieve embodiments 1 to 4 of the above-mentioned method.

Figure 17:
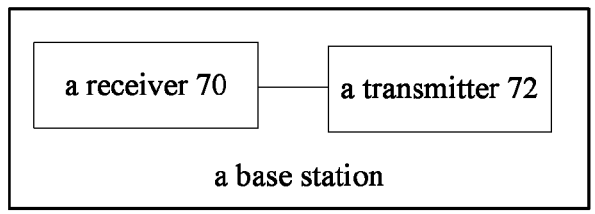
FIG. 17 is a block diagram of a structure of a base station according to embodiment 16 of the present invention.

FIG. 17 is a block diagram of a structure of a base station according to the embodiment 16 of the present invention. As shown in FIG. 17, the base station includes a receiver 70 and a transmitter 72, wherein the transmitter is configured to send a handover request message to a first target base station;

the receiver is configured to receive a handover request ackowledge message sent by the first target base station, wherein the handover request ackowledge message is used for notifying the source base station to hand over the user equipment to at least one target cell of the first target base station and/or at least one target cell of a second target base station; and the transmitter is further configured to send the handover command message to the user equipment, to indicate the user equipment to hand over to the first target base station and the second target base station.

Preferably, the handover request message includes at least one of followings: information of at least one target cell of the second target base station, measurement report information of the user equipment, context information of the user equipment and information of a service of the user equipment, wherein the information of the service includes RAB information of the service.

Optionally, the information of the service further comprises at least one of followings:

configuration coordination information of a radio resource of an RB, an identifier of an RB, an identifier of a radio access bear RAB, split indication information and GTP tunnel endpoint information, wherein the configuration coordination information of the radio resource of the RB includes at least one of followings: a physical cell identifier, a logic cell identifier, a virtual cell identifier, frequency information, carrier information, radio resource block information, subcarrier information, sub-frame information, time domain information, code domain information and space domain information; the split indication information includes data split information based on an RB or data split information based on a packet.

Preferably, the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

Optionally, the handover request reply message comprises at least one of the following items:

an identifier of the user equipment allocated at the source base station, an identifier of the user equipment allocated at the first target base station and/or the second target base station, a first transparent container configuration, an identifier of at least one RAB rejected by the first target base station and/or the second target base station, an identifier of at least one RAB accepted by the first target base station, fifth type of GTP tunnel endpoint information corresponding to an identifier of at least one RAB accepted by the first target base station, an identifier of at least one RAB accepted by the second target base station, sixth type of GTP tunnel endpoint information corresponding to an identifier of at least one RAB accepted by the second target base station, second type of GTP tunnel endpoint information corresponding to an identifier of an RAB accepted by the second target base station, and a corresponding relation between of at least one RAB accepted by the first target base station and/or the second target base station and the first target base station and/or the second target base station, wherein the fifth type of GTP tunnel endpoint information is used for establishing a transmission bearer for data forwarding between the first target base station and the source base station; the sixth type of GTP tunnel endpoint information is used for establishing a transmission bearer for forwarding data between the first target base station and the source base station; and the second type of GTP tunnel endpoint information is used for establishing a transmission bearer for data forwarding between the second target base station and the source base station.

Optionally, the first transparent container configuration comprises at least one of followings:

configuration information of at least one RB, and information of a cell of the first target base station and/or the second target base station, wherein the RB is an RB corresponding to at least one RAB accepted by the first target base station and/or the second target base station.

Preferably, the configuration information of the RB comprises at least one of followings:

configuration information of a PDCP entity corresponding to the RB, configuration information of at least one RLC entity corresponding to the RB, MAC configuration information corresponding to each RLC entity corresponding to the RB, logic channel configuration message, physical layer configuration information, an identifier of a service, split indication information and configuration information of a radio resource corresponding to the RB.

Preferably, the configuration information of the radio resource corresponding to the RB includes at least one of followings:

a physical cell identifier, a logic cell identifier, a virtual cell identifier, frequency information, carrier information, radio resource block information, subcarrier information, sub-frame information, time slot information, time domain information, code domain information and space domain information.

Optionally, the receiver is configured to realize the receiving the handover request acknowledge message sent by the first target base station in a following manner:

receiving the handover request acknowledge message from the first target base station, which is forwarded by a core network element.

In a preferable implementation manner of the embodiment of the present invention, the transmitter is configured to send, after the source base station receives the handover request acknowledge message sent by the first target base station, data and/or signaling of the user equipment to the first target base station and/or the second target base station.

In another preferable implementation manner of the embodiment of the present invention, the transmitter is configured to send, after the source base station sends the handover command message to the user equipment, data and/or signaling of the user equipment to the first target base station and/or the second target base station.

Preferably, the transmitter is configured to realize the sending the data and/or signaling of the user equipment to the first target base station and/or the second target base station in a following manner:

sending the data and/or signaling of the user equipment to the first target base station, for enabling the first target base station to send corresponding part of the second target base station in the data and/or signaling of the user equipment to the second target base station; or sending corresponding part of the first target base station in the data and/or signaling of the user equipment to the first target base station, and sending corresponding part of the second target base station in the data and/or signaling of the user equipment to the second target base station.

Preferably, the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN status transfer information and an end marker packet.

The end marker packet is used for triggering the first target base station and/or the second target base station to receive data sent by a serving gateway in sequence.

Preferably, the transmitter is configured to realize the sending the handover request message to the first target base station in a following manner: sending the handover request message to the first target base station through a core network node.

Embodiment 17

The embodiment of the present invention further provides a base station, and the base station may be taken as a target base station to achieve embodiments 5 to 9 of the above-mentioned method.

Figure 18:
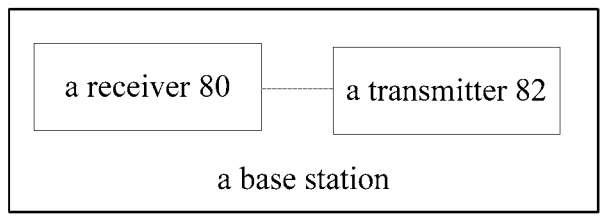
FIG. 18 is a block diagram of a structure of a base station according to embodiment 17 of the present invention.

FIG. 18 is a block diagram of a structure of a base station according to the embodiment 17 of the present invention. As shown in FIG. 18, the base station includes a receiver 80 and a transmitter 82, wherein the receiver is configured to receive a handover request message sent by a first source base station, wherein the handover request message is used for making a request for a handover of a user equipment from the first source base station and a second source base station to the target base station; and the transmitter is configured to send a handover request acknowledge message to the first source base station, wherein the handover request acknowledge message is used for indicating that the handover of the user equipment from the first source base station and the second source base station to the target base station is accepted.

Preferably, the transmitter is further configured to receive, after the target base station sends the handover request acknowledge message to the first source base station, data and/or signaling of the user equipment sent by the first source base station and/or the second source base station.

In a preferable implementation manner of the embodiment of the present invention, the receiver is configured to realize that the target base station to receives the data and/or signaling of the user equipment sent by the first source base station and/or the second source base station in a following manner: receiving the data and/or signaling of the user equipment sent by the first source base station, and/or receiving the data and/or signaling of the user equipment sent by the second source base station; or receiving the data and/or signaling of the user equipment corresponding to the first source base station and/or the second source base station, sent by the first source base station.

Preferably, the data and/or signaling of the user equipment comprise(s) at least one of followings: data of a service corresponding to the user equipment which has been sent without receiving a reply ACK, data of a service corresponding to the user equipment with a NACK received, SDU data, serial number SN status transfer information and an end marker packet.

Optionally, the receiver is configured to realize the receiving the handover request message sent by the first source base station in a following manner: receiving the handover request message, which comes from the first source base station, forwarded by a local gateway.

Preferably, the receiver is further configured to receive, after the target base station sends the handover request acknowledge message to the first source base station, a radio resource control RRC connection reconfiguration completion message sent by the user equipment, and control the target base station to establish connection with the user equipment.

Through an embodiment of the present invention, after receiving the handover request message, the first target base station notifies the second target base station that a handover of the user equipment thereon is to be performed, and sends the handover request acknowledge message to the source base station, for notifying the source base station of handing over the user equipment to the first target base station and the second target base station, so that a handover can be realized when there exists a target cell. When there exist multiple source cells of the UE, one source cell therein (namely, the first source cell) sends a request to the target base station to make a request for a handover the UE from multiple source cells to a target cell, thereby realizing the handover of the UE from multiple source cells to one target cell.

The processor 54 in an above-mentioned embodiment of the present invention may be an integrated circuit chip having a signal processing capacity, and may also be a hardware processor, such as a CPU and the like. In an implementation process, each step of the above-mentioned method may be completed by an integrated logic circuit of hardware or instructions in a software form in the processor. These instructions may be cooperatively achieved and controlled by a processor therein. For implementing a method disclosed in an embodiment of the present invention, the above-mentioned processor may be a universal processor, a digital signal processor (DSP), an application-specific integrated circuit (ASIC), a field programmable gate array (FPGA) or other programmable logic devices, a discrete gate or a transistor logic device and a discrete hardware component, which realizes or implements each method, step and logic block diagram disclosed in an embodiment of the present invention. The universal processor may be a microprocessor or the processor may also be any common processor, decoder or the like. A step of a method disclosed in an embodiment of the present invention may be directly executed by a hardware processor, or executed by a combination of a hardware and a software module in a processor. The software module may be located in a mature storage media in the art, such as a random access memory, a flash memory, a read-only memory, a programmable read-only memory or an electrically erasable programmable memory, a register.

Through a description in an above-mentioned embodiment, those skilled in the art to which the present invention pertains may clearly understand that the present invention may be achieved by hardware, firmware or a combination thereof. When being achieved by a software, an above-mentioned function may be stored in a computer readable medium or transmitted as one or multiple instructions or codes on a computer readable medium. The computer readable medium includes a computer storage medium and a communication medium, wherein the communication medium includes any medium which is convenient to transmit a computer program from one place to another place. The storage medium may be any available medium capable of being accessed by a computer, such as but not limited to the computer readable medium may include an RAM, an ROM, an EEPROM, a CD-ROM, or other optical disk storage, magnetic disk storage media or other magnetic storage devices, or any other media capable of being used for carrying or storing expected program codes with instructions or in data structure forms and capable of being accessed by the computer. In addition, any connection may properly become a computer readable medium. For example, if software is transmitted from a website, a server or other remote sources by a coaxial cable, optical fiber and cable, a twisted pair, a digital subscriber line (DSL) or such wireless technologies as infrared, radio and microwave, then the coaxial cable, the optical fiber and cable, the twisted pair, the DSL or such wireless technologies as infrared, radio and microwave are included in the photographic fixing of the affiliated medium. For example, the disk (Disk) and disc (disc) adopted in the present invention include a compact disc (CD), a laser disc, an optical disc, a digital universal disc (DVD), a floppy disk and a Blu-ray disc, wherein the disk is generally used for magnetically copying data and the disc is used for optically copying data by using laser. The above-mentioned combination should be included in the protection scope of the computer readable medium.

To sum up, the foregoing description is merely a preferred embodiment of the technical solutions of the present invention, rather than limiting the protection scope of the present invention. Any modification, equivalent substitution, improvement or the like, made within the essence and principle of the present invention, are still encompassed in the protection scope of the present invention.

What is claimed is:

1. A handover processing method, comprising:
   receiving, by a first target base station, a handover request message sent by a source base station or a core network node;
   sending, by the first target base station, a first message, according to the handover request message, to a second target base station to notify the second target base station that a handover of part or all of a service of a user equipment to the second target base station is to be performed; and
   sending, by the first target base station, a handover request acknowledge message to the source base station or the core network node, wherein the handover request acknowledge message is used for notifying the source base station or the core network node to hand over the user equipment to at least one target cell of the first target base station and at least one target cell of the second target base station.

2. The method of claim 1, wherein the first message comprises: information of at least one service of the user equipment, wherein the information of the service comprises radio access bear RAB information of the service,
   wherein the information of the service further comprises at least one of:
   configuration coordination information of a radio resource of an RB, an identifier of a radio access bear RAB, split indication information and GTP tunnel endpoint information,
   wherein the configuration coordination information of the radio resource of the RB comprises at least one of: a physical cell identifier, a logic cell identifier, and carrier information; the split indication information comprises data split information based on an RB or data split information based on a packet, and
   wherein the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

3. The method of claim 1, wherein the handover request message comprises at least one of: context information of the user equipment and information of a service of the user equipment, wherein the information of the service comprises RAB information of the service.

4. The method of claim 1, wherein after the sending, by the first target base station, the first message to the second target base station, the method further comprises:
   receiving, by the first target base station, a second message sent by the second target base station, wherein the second message is used for indicating information regarding whether the handover of the part or all of the service of the user equipment to the second target base station is accepted by the second target base station, wherein the second message comprises at least one of:
   an identifier of the user equipment, first information and indication information,
   wherein the indication information includes at least one of: indication information of rejecting the handover of the part or all of the service of the user equipment to the second target base station and indication information of accepting the handover of the part or all of the service of the user equipment to the second target base station;
   wherein the first information includes at least one of: an identifier of an RAB corresponding to an RB accepted by the second target base station, and an identifier of an RAB corresponding to an RB whose resource configuration is rejected by the second target base station, wherein the second message further comprises at least one of:
   fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station;
   third type of GTP tunnel endpoint information corresponding to an identifier of an RAB accepted by the second target base station, wherein the third type of GTP tunnel endpoint information is used for requesting a core network node to convert a GTP tunnel endpoint.

5. The method of claim 1, wherein the handover request acknowledge message comprises at least one of:
   an identifier of the user equipment allocated at the source base station, an identifier of the user equipment allocated at the first target base station and/or the second target base station, a first transparent container configuration, and fifth type of GTP tunnel endpoint information corresponding to an identifier of at least one RAB accepted by the first target base station,
   wherein the fifth type of GTP tunnel endpoint information is used for establishing a transmission bearer for data forwarding between the first target base station and the source base station;
   wherein the first transparent container configuration comprises at least one of:
   configuration information of at least one RB, and information of a cell of the first target base station and/or the second target base station,
   wherein the RB is an RB corresponding to at least one RAB accepted by the first target base station and/or the second target base station,
   wherein the configuration information of the RB comprises at least one of:
   configuration information of a PDCP entity corresponding to the RB, configuration information of at least one RLC entity corresponding to the RB, MAC configuration information corresponding to each RLC entity corresponding to the RB, logic channel configuration message, and physical layer configuration information, wherein the configuration information of the radio resource corresponding to the RB comprises at least one of:

a physical cell identifier and a logic cell identifier.

6. The method of claim 1, wherein the sending, by the first target base station, the handover request acknowledge message to the source base station or the core network node comprises:

sending, by the first target base station, the handover request acknowledge message to the source base station to trigger the source base station to send a handover command message to the user equipment, so as to enable the user equipment to establish connections with the first target base station and the second target base station.

7. The method of claim 1, wherein after the sending, by the first target base station, the handover request acknowledge message to the source base station or the core network node, the method further comprises:

receiving, by the first target base station, a radio resource control RRC connection reconfiguration completion message sent by the user equipment, and establishing a connection with the user equipment.

8. The method of claim 7, wherein after the receiving, by the first target base station, the RRC connection reconfiguration completion message sent by the user equipment, the method further comprises:

sending, by the first target base station, a handover indication message of the user equipment to the second target base station, for indicating that the second target base station starts to use a resource configured to the user equipment.

9. The method of claim 8, wherein after the sending, by the first target base station, the handover indication message of the user equipment to the second target base station, the method further comprises:

receiving, by the first target base station, a handover indication reply message of the user equipment sent by the second target base station, wherein the handover indication reply message of the user equipment comprises: third type of GTP tunnel endpoint information corresponding to an identifier of an RAB accepted by the second target base station, wherein the third type of GTP tunnel endpoint information is used for requesting the core network node to switch a GTP tunnel endpoint.

10. The method of claim 8, wherein after the receiving, by the first target base station, the RRC connection reconfiguration completion message sent by the user equipment, the method further comprises:

sending, by the first target base station, a path switch request message to the core network node to request to hand over a service corresponding to the user equipment in the core network node to the first target base station and/or the second target base station.

11. The method of claim 1, wherein the sending, by the first target base station, a handover request acknowledge message to the source base station or the core network node, comprises:

sending, by the first target base station, the handover request acknowledge message to the source base station or the core network node to trigger the source base station to send data and/or signaling of the user equipment in the source base station to the first target base station and/or the second target base station.

12. The method of claim 11, wherein the first target base station receives the data and/or signaling of the user equipment sent by the source base station, and sends corresponding part of the second target base station in the data and/or signaling of the user equipment to the second target base station.

13. The method of claim 11, wherein the triggering the source base station to send the data and/or signaling of the user equipment in the source base station to the first target base station and/or the second target base station, comprises:

triggering the source base station to send corresponding part of the first target base station in the data and/or signaling of the user equipment to the first target base station, and to send corresponding part of the second target base station in the data and/or signaling of the user equipment to the second target base station.

14. The method of claim 11, wherein the data and/or signaling of the user equipment comprises at least one of: data of a service corresponding to the user equipment, which has been sent without receiving a reply ACK, data of a service corresponding to the user equipment, of which a response of non-acknowledgement NACK is received, data of service data unit SDU, serial number SN status transfer information and an end marker packet.

15. The method of claim 14, wherein the end marker packet is used for triggering the first target base station and/or the second target base station to receive data sent by a serving gateway in sequence.

16. The method of claim 1, wherein the receiving, by the first target base station, the handover request message sent by the source base station comprises:

receiving, by the first target base station, the handover request message, which comes from the source base station, forwarded by the core network node.

17. A base station, wherein the base station is a first target base station, and the first target base station comprises:

a receiver, configured to receive a handover request message sent by a source base station or a core network node; and a transmitter, configured to send, according to the handover request message, a first message to a second target base station to notify the second target base station that a handover of part or all of a service of a user equipment to the second target base station is to be performed, wherein the transmitter is further configured to send a handover request acknowledge message to the source base station or the core network node, wherein the handover request acknowledge message is used for notifying the source base station or the core network node to hand over the user equipment to at least one target cell of the first target base station and at least one target cell of the second target base station.

18. The base station of claim 17, wherein the first target base station further comprises: a processor, wherein the processor is configured to determine, according to a measurement report of the user equipment and/or radio access bear RAB information of the user equipment in the handover request message, that the handover of the part or all of the service of the user equipment to a target cell of the second target base station; or determine, according to information of a target cell of the second target base station in the handover request message, that the handover of the part or all of a service of the user equipment to the second target base station; and the transmitter is further configured to send the first message to the second target base station.

19. The base station of claim 17, wherein the handover request message comprises at least one of: context information of the user equipment and information of a service of the user equipment, wherein the information of the service includes RAB information of the service.

20. The base station of claim 19, wherein the first message comprises: information of at least one service of the user equipment, wherein the information of the service comprises RAB information of the service and/or configuration information of a radio bear RB.

21. The base station of claim 17, wherein the information of the service further comprises at least one of followings:
configuration coordination information of a radio resource of an RB, an identifier of a radio access bear RAB, split indication information and GTP tunnel endpoint information,
wherein the configuration coordination information of the radio resource of the RB includes at least one of following: a physical cell identifier and a logic cell identifier; wherein the split indication information includes data split information based on an RB or data split information based on a packet.

22. The base station of claim 21, wherein the GTP tunnel endpoint information is first type of GTP tunnel endpoint information or fourth type of GTP tunnel endpoint information, wherein the first type of GTP tunnel endpoint information is used for establishing a transmission bearer of an S1 interface between a serving gateway S-GW and the first target base station and/or the second target base station, and the fourth type of GTP tunnel endpoint information is used for establishing a transmission bearer for forwarding data between the first target base station and the second target base station.

23. The base station of claim 21, wherein the configuration information of the RB comprises:
configuration information of a packet data convergence protocol PDCP layer, a radio link control RLC layer, a medium access control MAC layer and a physical layer; or
configuration information of an RLC layer, an MAC layer and a physical layer.

24. The base station of claim 17, wherein
the receiver is further configured to receive a second message sent by the second target base station after the first target base station sends the first message to the second target base station, wherein the second message is used for indicating information regarding whether the handover of the part or all of the service of the user equipment to the second target base station is accepted by the second target base station.

25. The base station of claim 24, wherein the second message comprises at least one of:
an identifier of the user equipment, first information and indication information,
wherein the indication information includes at least one of followings: indication information of refusing the handover of the part or all of the service of the user equipment to the second target base station and indication information of accepting the handover of the part or all of the service of the user equipment to the second target base station;
the first information includes at least one of following: an identifier of an RAB corresponding to an RB accepted by the second target base station and an identifier of an RAB corresponding to an RB whose resource configuration is rejected by the second target base station.

26. The base station of claim 24, wherein the second message further comprises at least one of:
fourth type of GTP tunnel endpoint information corresponding to an identifier of an RAB accepted by the second target base station, wherein the fourth type of GTP tunnel endpoint information is used for establishing a transmission bearer for forwarding data between the first target base station and the second target base station; and
third type of GTP tunnel endpoint information corresponding to an identifier of an RAB accepted by the second target base station, wherein the third type of GTP tunnel endpoint information is used for requesting a core network node to convert a GTP tunnel endpoint.

27. The base station of claim 17, wherein the handover request acknowledge message comprises at least one of:
an identifier of the user equipment allocated at the source base station, an identifier of the user equipment allocated at the first target base station and/or the second target base station, a first transparent container configuration, and fifth type of GTP tunnel endpoint information corresponding to an identifier of at least one RAB accepted by the first target base station,
wherein the fifth type of GTP tunnel endpoint information is used for establishing a transmission bearer for data forwarding between the first target base station and the source base station.

28. The base station of claim 27, wherein the first transparent container configuration comprises at least one of:
configuration information of at least one RB and information of a cell of the first target base station and/or the second target base station,
wherein the RB is an RB corresponding to at least one RAB accepted by the first target base station and/or the second target base station.

29. The base station of claim 28, wherein the configuration information of the RB comprises at least one of:
configuration information of a PDCP entity corresponding to the RB, configuration information of at least one RLC entity corresponding to the RB, MAC configuration information corresponding to each RLC entity corresponding to the RB, and logic channel configuration message, physical layer configuration information.

30. The base station of claim 29, wherein the configuration information of the radio resource corresponding to the RB comprises at least one of:
a physical cell identifier, a logic cell identifier.

31. The base station of claim 29, wherein:
the receiver is further configured to receive a radio resource control RRC connection reconfiguration completion message sent by the user equipment; and
the first target base station further comprises: a processor, wherein the processor is configured to establish a connection between the first target base station and the user equipment after the first target base station receives the radio resource control RRC connection reconfiguration completion message sent by the user equipment.

32. The base station of claim 31, wherein
the transmitter is further configured to send, after the first target base station receives the RRC connection reconfiguration completion message sent by the user equipment, a handover indication message of the user equipment to the second target base station, for indicating that the second target base station to starts use a resource configured to the user equipment.

33. The base station of claim 32, wherein
the transmitter is further configured to send, after the first target base station receives the RRC connection reconfiguration completion message sent by the user equipment, a path switch request message to the core network node to request to hand over a service corresponding to the user equipment in the core network node to the first target base station and/or the second target base station.

34. The base station of claim 17, wherein the transmitter is configured to send the handover request acknowledge message to the source base station or the core network node to trigger the source base station to send data and/or signaling of the user equipment in the source base station to the first target base station and/or the second target base station.

35. The base station of claim 34, wherein:
the receiver is further configured to receive the data and/or signaling of the user equipment sent by the source base station; and
the transmitter is further configured to send corresponding part of the second target base station in the data and/or signaling of the user equipment to the second target base station.

36. The base station of claim 34, wherein the triggering the source base station to send the data and/or signaling of the user equipment in the source base station to the first target base station and/or the second target base station, comprises:
triggering the source base station to send corresponding part of the first target base station in the data and/or signaling of the user equipment to the first target base station, and to send corresponding part of the second target base station in the data and/or signaling of the user equipment to the second target base station.

37. The base station of claim 34, wherein the data and/or signaling of the user equipment comprise(s) at least one of followings: data of a service corresponding to the user equipment, which has been sent without receiving a reply ACK, data of the service corresponding to the user equipment, of which a response of non-acknowledgement NACK is received, data of service data unit SDU, serial number SN state transfer information and an end marker packet.

38. A non-transitory computer readable storage medium, wherein the computer readable storage medium stores a program, characterized by, when program is executed by a processor, the following steps are performed:
receiving a handover request message sent by a source base station or a core network node;
sending a first message, according to the handover request message, to a second target base station to notify the second target base station that a handover of part or all of a service of a user equipment to the second target base station is to be performed; and
sending a handover request acknowledge message to the source base station or the core network node, wherein the handover request acknowledge message is used for notifying the source base station or the core network node to hand over the user equipment to at least one target cell of the first target base station and at least one target cell of the second target base station.

39. A device, comprising:
a processor; and
a non-transitory memory, wherein the memory stores an execution instruction; and
when the processor executes the execution instruction to enable the device to perform the following steps:
receiving a handover request message sent by a source base station or a core network node;
sending a first message, according to the handover request message, to a second target base station to notify the second target base station that a handover of part or all of a service of a user equipment to the second target base station is to be performed; and
sending a handover request acknowledge message to the source base station or the core network node, wherein the handover request acknowledge message is used for notifying the source base station or the core network node to hand over the user equipment to at least one target cell of the first target base station and at least one target cell of the second target base station.

* * * * *